United States Patent
Bhandari et al.

(10) Patent No.: US 7,110,998 B1
(45) Date of Patent: Sep. 19, 2006

(54) METHOD AND APPARATUS FOR FINDING HIDDEN PATTERNS IN THE CONTEXT OF QUERYING APPLICATIONS

(75) Inventors: Inderpal S. Bhandari, Scarsdale, NY (US); Rajiv Pratap, White Plains, NY (US); Krishnakumar Ramanujam, White Plains, NY (US)

(73) Assignee: Virtual Gold, Inc., Tarrytown, NY (US)

( * ) Notice: Subject to any disclaimer, the term of this patent is extended or adjusted under 35 U.S.C. 154(b) by 0 days.

(21) Appl. No.: 09/416,414

(22) Filed: Oct. 12, 1999

Related U.S. Application Data

(60) Provisional application No. 60/103,948, filed on Oct. 13, 1998.

(51) Int. Cl.
*G06F 17/30* (2006.01)
*G06K 9/36* (2006.01)

(52) U.S. Cl. ............... 707/4; 707/2; 707/3; 707/5; 382/229

(58) Field of Classification Search ............... 707/1–5, 707/7; 382/229; 705/5
See application file for complete search history.

(56) References Cited

U.S. PATENT DOCUMENTS

| | | | | |
|---|---|---|---|---|
| 4,490,811 | A | | 12/1984 | Yianilos et al. ............. 707/5 |
| 5,404,507 | A | * | 4/1995 | Bohm et al. ................. 707/4 |
| 5,564,058 | A | * | 10/1996 | Kaplan et al. ............... 707/6 |
| 5,584,024 | A | * | 12/1996 | Shwartz ..................... 707/4 |
| 5,659,724 | A | * | 8/1997 | Borgida et al. ............ 707/3 |
| 5,666,628 | A | * | 9/1997 | Fukai ...................... 399/340 |
| 5,692,107 | A | * | 11/1997 | Simoudis et al. .......... 706/12 |
| 5,706,496 | A | * | 1/1998 | Noguchi et al. ............ 707/3 |
| 5,761,389 | A | * | 6/1998 | Maeda et al. .............. 706/59 |
| 5,767,854 | A | * | 6/1998 | Anwar ..................... 345/848 |
| 5,774,588 | A | * | 6/1998 | Li .......................... 382/229 |
| 5,802,515 | A | | 9/1998 | Adar et al. ................. 707/5 |
| 5,826,260 | A | * | 10/1998 | Byrd et al. ................. 707/5 |
| 5,875,285 | A | * | 2/1999 | Chang ...................... 706/53 |
| 5,926,820 | A | * | 7/1999 | Agrawal et al. .......... 707/200 |
| 6,044,366 | A | * | 3/2000 | Graffe et al. .............. 707/2 |
| 6,119,120 | A | * | 9/2000 | Miller ...................... 707/101 |
| 6,240,411 | B1 | * | 5/2001 | Thearling .................. 707/5 |

OTHER PUBLICATIONS

Cipolla, Emil T,; "Data mining: techniques to gain insight into your data"; Technology Information; Enterprise Systems Journal; vol. 10, No. 13, Dec. 1995; pp. 1-5.*
Saarenvirta, Gary; "Mining Customer Data" ; DB2 Magazine; vol. 3; No. 3; Fall 1998; pp. 4 and 21-30.*
Pyle, Dorian; "Putting Data Mining in its Place"; Database Programming & Design; vol. 11, No. 3: Mar. 1998; pp. 33-36.*
Edelstein, Herb; "Data Mining: Let's Get Practical"; DB2 Magazine; vol. 3, No. 2; Summer 1998; pp. 38-40.*

(Continued)

*Primary Examiner*—Ella Colbert
(74) *Attorney, Agent, or Firm*—Fulbright & Jaworski LLP

(57) ABSTRACT

The querying application of the present invention provides method and apparatus to find related queries having the greatest-valued and/or least-valued results. Elements (or inputs) of the related queries overlap with the elements of the user query. Preferably, the querying application of the present invention enables the user to trace other queries having the greatest-valued and/or least-valued results that overlap other elements of the user query. In accordance with another aspect of the present invention, the querying application of the present invention provides method and apparatus to find non-related queries having the greatest-valued and/or least-valued results.

68 Claims, 19 Drawing Sheets

OTHER PUBLICATIONS

Herman, Gary; Gopal, Gita; Lee, K.C.; and Weinrib, Abel; "The Datacycle Architecture for Very High Throughput Database Systems"; 1987; ACM; pp. 97-103.*

Bowen, T.F.; Gopel, G.; Herman, G; Hickey, T.; Lee, K. C.: Mansfield, W.H.; Raitz, J.; and Weinrib, A.; "The Dtacycle Architecture"; Communications of the ACM/Dec. 1992; vol. 35, No. 12; pp. 71-81.*

Han, Jiawei; "Towards On-Line Anaiytical Mining in Large Database"; ACM; vol. 27; issue 1; Mar. 1998; pp. 1-10.*

Inderpal Bhandari et al., "Brief Application Description: Advanced Scout: Data Mining and Knowledge Discovery in NBA Data", *Data Mining and Knowledge Discovery*, 1:121-125 (1997).

Usama M. Fayyad et al., "From Data Mining to Knowledge Discovery: An Overview", *Advances in Knowledge Discovery and Data Mining*,1-33 (1996).

Jiawei Han, "Towards On-Line Analytical Mining in Large Databases", *ACM SIGMOD Record,* 27:97-107, (1998).

Jiawei Han et al., "Issues for On-Line Analytical Mining of Data Warehouses", *Proc. of 1998 SIGMOD Workshop on Research Issues on Data Mining and Knowledge Discovery* (DMKD '98) (1998), Seattle, Washington.

Jiawei Han, "OLAP Mining: An Integration of OLAP with Data Mining", *In Proc. 1997 IFIP Conf. Data Semantics,* pp. 1-11, Leysin, Switzerland (1997).

Greg Sandoval, "Letting Technology do the Shopping", *CNET News.Com,* 1-4 (1999).

Joseph A. Konstan et al., "Applying Collaborative Filtering to Usenet News", *Communications of the Acm,* 40:3:77-87 (1997).

Upendra Shardanand et al., Social Information Filtering: Algorithms for Automating "Word of Mouth", *Conference proceedings on Human factors in Computing Systems*,210-217 (1995).

Parsay, K., "OLAP and DataMining: Bridging the Gap", *Database Programing & Designing*,1-13 (1997).

Information Discovery, Inc., "The Knowledge Access Suite: Much More Than Just Data Mining", *www.datamining.com*,1-9.

Ask Jeeves, Inc., "What is Ask Jeeves?", *www.askjeeves.com,* 1-7.

* cited by examiner

Fig. 18
1801 — Get the contribution to points won and lost by Player 1 for forehands in the second set when up 1 break.
Answer to your question
1802 —
Contribution to Points Won : 11.0
Contribution to Points Lost : 18.9
Difference : -7.9

METHOD AND APPARATUS FOR FINDING HIDDEN PATTERNS IN THE CONTEXT OF QUERYING APPLICATIONS

This application is a continuation-in-part application of prior provisional patent application Ser. No. 60/103,948, filed Oct. 13, 1998.

FIELD OF THE INVENTION

The present invention relates to a query-based software system or an on-line analytical processing system, particularly to a software application that provides a front-end for a user to interact with the query based software system, e.g., a Structured Query Language (SQL) interface, a World Wide Web-enabled interface to databases. More particularly, the present invention relates to a computer implementation of a mathematical function which maps a finite set of strings to a set of numbers to alert the user to maximally-valued results that lie inside and outside of the line of the user's query.

BACKGROUND OF INVENTION

We live in an age of data. It pervades the lives of ordinary men and women—both at home and at work. The question arises: How should these people cope with this data explosion? The average person does not have a Ph.D. in statistics or any other data-analytic discipline. Yet, it is quite evident that such a person must be able to cope with the data explosion. For instance, is the day far off when employers will expect that their security guards be able to find patterns of break-ins in security logs?

The computer software industry has made progress in addressing the needs of non-technical users who must interact with data. Today, it is quite simple for even an inexperienced programmer to put together a user-friendly querying application for a new domain—be it banking, insurance, sports, entertainment or other domain—by making use of well-known tools and methodologies.

By way of illustrating those tools and methodologies, we show how easy it is to put together a querying application suitable for corporate security purposes. The application must provide a security guard with the means to ask questions about the incidents recorded in the on-line security log of a corporation. A logical model of the security log is generated by treating the log as a collection of incidents and by specifying attributes to describe those incidents. Typical attributes and their values for the security log application may include: type-of-incident, having values such as theft, assault, break-in, attempted-break-in, etc.; gravity-of-incident, having values such as minor, serious, etc.; location-of-incident, having values such as corporate-headquarters, region-x-headquarters, manufacturing-plant-a, etc.; shift-discovered, having values such as day, night, etc.; shift-occurred, having values such as day, night, unknown, etc.; year, having values such as 1998, 1997, etc.; quarter, having values such as first, second, third, or fourth; date-occurred, date-discovered, time-occurred, time-discovered, with sets of corresponding values such as 3/4/98 or 2300 hours, and so on.

After logically modeling the security log space, the next step is to define the actual computations that will be utilized by the querying application. Computations for the security log application may include: counting the number-of-incidents, determining the change-in-the-number of incidents in a year selected by the user (if the user does not select a year, the present year will be used) as compared with the previous year, determining the average-time-elapsed between the time of occurrence and the time of discovery of an incident, etc.

What makes it easy for even a novice programmer to produce such an application is that the programmer can use off-the-shelf systems. For instance, a relational database can be used to represent the logical model of the security log data. The programmer can create a table of incidents, the rows of the table representing specific incidents, and the columns of the table representing the attributes used to describe those incidents. A specific location in the table contains the value of the attribute which describes the incident.

It is also standard for such a database to include tools to define the computations to be executed on the table of incidents and to create a graphical user interface (GUI) to interact with the user. Simple computations such as sums, differences, averages, percentages, etc., may be easily generated and implemented using such tools. Consequently, the programmer can easily implement the computations required for the security log application.

The programmer can also use the tools to create a GUI that allows a user to ask questions about the security log data by selecting suitable values for the attributes and computations that are of interest. For instance, the interface can present the user with two lists, one for the attributes and one for the computations. The user can select one or more items in each of these lists. When the user selects an attribute, the user is presented with a further list of the possible values for that attribute. The user must-select at least one value for every attribute that is of interest to him.

The querying application allows even a non-technical user to ask questions about data without writing a single line of programming code. Instead, the user selects (i.e., points and clicks) items on a computer screen to obtain the desired information about the data. Those items have labels which correspond to physical events that the user is familiar with. For example, if the security guard wants to find out how many incidents have occurred in 1998 at the corporate headquarters during the night shift, the guard selects the computation number-of-incidents, and the values: night for the attribute shift-occurred, 1998 for the attribute year, and corporate-headquarters for the attribute location-of-incident (hereinafter referred to as the number-of-incident query).

After the user issues a query, the querying application computes a result for the present selection by processing the data in the security log. For the above example, the answer to the query will be an integer, such as 5, 10 or 151. It is appreciated that all computations supported by the security log querying application will output a number. For example, a positive integer for number-of-incidents, a positive or negative integer for change-in-the-number (of incidents in 1998 vs. 1997), and a real number for average-time-elapsed (between occurrence and discovery). Since the set of real numbers subsumes the set of integers, in general, we can say that computations in querying applications will map a string of attributes and their values to a real number.

Those skilled in the art will recognize that there are many methods of implementing the security log application that was described herein. For example, a user may have entered the values of the selected attributes instead of selecting the values from a list. However, the basic scheme—which is representative of the prior art in this field—remains unchanged.

The block diagram of the logical functioning of a querying application in accordance with the prior art is shown in FIG. 1. An input module 101 transmits a query 104 to a computation module 102. The computation module 102 executes the computations invoked by the query 104 and outputs the computation results 106 to an output module 103.

Those skilled in the art will understand the operation of the querying application in FIG. 1 from the workings of the security log querying application that was described earlier. The number-of-incident query example must be implemented by a stream of data that are logically partitioned into different fields. The query 104 may consist of two data fields, which contain information about the user's selections. One field specifies the set of attributes along with the values selected by the user for those attributes (hereinafter referred to as the attribute field), and the other field specifies the set of computations that will be presented with the selected values to the computation module 102 and executed to produce results. The contents of the attribute field may be further partitioned into sub-fields that correspond to the individual attributes selected by the user. The content of such a sub-field is the value selected for the corresponding attribute. In other words, the query 104 is a stream of bits that is partitioned logically into fields and sub-fields to identify the user's selections.

The input module 101 is primarily a number of computer storage locations, e.g., computer memory, disk storage, tape storage, etc., that are logically partitioned to capture the fields and sub-fields of the query 104, thus making it possible for it to receive and store the different selections of the user as well as to transmit the query 104 to the computation module 102 in a manner which preserves that differentiation. Similarly, the output module 103 is also primarily a number of computer storage locations that are logically partitioned into fields corresponding to the different computations that are supported by the querying application. The results of the computations invoked by the query 104 are stored in the appropriate fields.

Those skilled in the art understand that a variety of computations are used in querying applications. For example, the security log application employed three computations: a count of incidents (number-of-incidents), a difference between two counts (change-in-the-number), and the average value of a difference between two time intervals (average-time-elapsed). Other commonly used computations producing numeric results may include percentages, products (obtained by the multiplication of two or more numbers), etc.

Hence, for the purpose of capturing the prior art in FIG. 1, a computation is defined to be a computer implementation of a mathematical function that maps an n-tuple of attribute-value pairs, referred to as an attribute-valued string, to a real number, referred to as a computation result, where n is the number of attributes in the querying application. Thus, the number-of-incidents query has the attribute-value string shift-occurred=night, year=1998, location-of-incident=corporate-headquarters. The number-of-incidents computation maps that attribute-value-string to a number such as 5, 10 or 151.

Accordingly, the computation module 102 is a collection of a pre-specified number of computations (as defined above), each of which can be executed to produce a numeric result. Thus, the computation result 106 described in FIG. 1 is a stream of bits partitioned into fields that contain numeric results, a field for each computation in the set of computations.

There are some non-obvious issues that will be apparent to those skilled in the art. For example, the security guard did not specify a value for every attribute but only specified those attributes that the security guard was interested in. Although there was no value specified for the type-of-incident attribute, the number-of-incident query is still considered a well-defined query. The query requests that the number of incidents that occurred at night in 1998 at the corporate headquarters be computed. Those skilled in the art will recognize that there are several ways to handle such partial input. For example, a default value, namely, the "*" value, can be assigned to each attribute not specified by the user. Accordingly, the query 104 contains user-specified values in the data fields corresponding to the user-selected attributes and a "*" in the data fields corresponding to non-specified attributes. Alternatively, the query 104 may contain a special field that specifies the number of attribute-value pairs, so that the computation module 102 can interpret the query 104, even though only some of the attributes are specified. Logically, these two schemes are equivalent. It is appreciated that the "*" value implementation is used without any loss of generality.

The computation module 102 represents (or implements) a computation (using a computer program, a computer chip or some other comparable device) as a mathematical function, $F: \{v_1, \ldots, v_k\} \rightarrow R$, where k is an integer greater than or equal to 1; $v_i$ is either an element of the finite set of distinct values of an attribute, or $v_i$ is the default element *; $1 <= i <= k$; R is the set of real numbers.

Although it is straightforward for someone skilled in the art to create a query that can be used by a non-technical user, such as a security guard, such querying applications have a serious limitation, namely, they are limited by the user's imagination. For instance, if the security guard does not think about asking a specific question, the answer, no matter how interesting it may be, will lie hidden in the data. Furthermore, there is an argument to be made that the truly useful information in the data will lie only in such hidden patterns. After all, users would have already addressed situations that they were aware of. That is, if the security guard felt that a particular point of entry was vulnerable to a burglar, the security guard would have already taken preventive measures to counter such weakness. Consequently, the security logs would reflect the counter measures and querying the security log about the number of break-ins at that point of entry would likely return an answer of zero. Instead, it would be desirable to analyze the security logs to identify vulnerable points of entry that are unknown to the security guard.

Computer programs for such analysis do exist but historically the computer software industry has focused on the needs of the trained analyst with regard to finding such hidden patterns in data. There are numerous computer programs for this kind of user, who is skilled in the arts of computer programming and statistical analysis. Statistical packages allow such skilled user to produce a parametric model, e.g., a regression model, to predict when a theft might occur. Alternatively, such a skilled user can use a data mining program, e.g., a neural network, to produce a non-parametric model to predict when a theft might occur.

It is appreciated that such computer programs are beyond the reach of most users. Of late, there have been efforts to simplify these programs for the business analyst, who is usually someone with an MBA. While such users are not trained analysts, they have undergone a sophisticated schooling. While they may not know how to write a computer program for factor analysis, a program for analysis of influences, or a program that is a test for statistical significance, their schooling prepares them for how and when such programs, analyses and tests should be used. In other words, they are trained in the process of data analysis even if they are not prepared to write computer programs for data analysis.

But the average person does not possess an MBA. Such a person is truly a non-technical user with neither programming nor data analysis background. To the best of our knowledge, existing data mining programs are not suitable for use by such non-technical users barring the exception of programs such as IBM® Advanced Scout™ program that is used by coaches of the National Basketball Association (NBA™). The NBA™ coach does indeed fit the description of an average user. The principles that underlie the development of Advanced Scout™ suggest an approach to the development of data mining programs for non-technical users, specifically, the approach of using so-called general questions. Unlike the specific questions that were exemplified in the security log querying application, general questions do not require the user to specify all the circumstances of interest. Instead, it is the computer program that finds the circumstances of interest. For example, a general question may read "Under what conditions does Team 1 outscore Team 2"? Those conditions, which would include which player is playing what position on the court, which player is guarding whom, and so on, are left unspecified by the user. The computer program will find the conditions that are meaningful and call them to the attention of the user.

The problem with the above approach is that the developer of the data mining application must anticipate the general questions that the user is interested in, express and answer those questions in terms the user will understand, and finally, code that knowledge into the data mining application. This is only possible if the developer invests a lot of time in understanding a particular application of the data mining program. Consequently, this approach is costly and time consuming, as becomes evident if it is applied to the security log querying application discussed herein.

To add a capability of finding hidden patterns in the data to the hypothetical security log application, the programmer must understand what general questions are meaningful for the security guard and then develop a separate computer program to answer those meaningful questions. Perhaps even more troublesome, the user has to learn about two interfaces, one for the querying application and another for the data mining program. It would be desirable to avoid these extra steps.

It is therefore not surprising that computer software theorists and developers have lately begun to experiment with integrating querying applications and data mining programs. To the best of our knowledge, such integration has followed three approaches.

The first approach permits the users to link a querying application to a data mining application. A user asks questions in a querying application, and uses the knowledge of the answers to generate a subset of the data. The data mining program operates only on that subset of the data. Alternatively, a user reviews the results of a data mining program and generates a query based on the knowledge of that review. The user then employs the querying application to issue the query on the data. In the literature, those skilled in the art will appreciate that this type of linking is known as bundling of querying applications with data mining applications.

The second approach pre-computes data structures that are useful for certain querying applications and data mining applications. The common data structures provide a link between the querying application and the data mining application. Those skilled in the act will appreciate that this type of linking is known as On-line Analytical Mining (OLAM).

In the third approach, a user utilizes a querying application to ask questions about the result of a data mining program. Since the results of computations used in data mining programs are often numeric in nature and every result often refers to a specific selection of attributes, a querying application can be designed that allows a user to ask questions about those results. The difference between such a querying application for analysts and a typical querying application for non-technical users is that the former employs mathematically sophisticated computations, e.g., determining correlation between attributes, finding factors that influence an attribute, etc.

The above three approaches do not eliminate the extra step of having to learn about a new computer program, which is fundamentally distinct from the querying application, to find hidden patterns in the data. Nor do they address the intrinsic complexity of data mining programs.

Bundling a data mining program with a querying application simply packages two different programs together. Therefore, it does nothing to simplify the complex computations of the data mining program. Also, the user still must learn two interfaces, one for the querying application and one for the data mining program. In fact, the user may have to learn a third interface as well, which links the data mining program to the querying application.

Similarly, pre-computing and reusing data structures to support data mining computations which compute factors, influences or correlation does not simplify the mathematical primitives for the non-technical user. The non-technical user will still be expected to understand these statistical concepts.

Finally, designing a point-and-click interface to allow the user to ask questions about the results of data mining programs also does not simplify the mathematical primitives. The point-and-click applications simplify traditional querying applications such as the security-log querying application because the non-technical user does not have to write programming code to ask questions and the questions generally pertain to simple mathematical primitives such as sums, averages and percentages, that are simple and easy to relate to physical events that the non-technical user understands, e.g., number-of-incidents. If the mathematical primitives were complicated, such as correlation or influences, the point-and-click interfaces do not provide a mechanism to simplify that intrinsic complexity for the non-technical user.

Consequently, data mining programs even with point-and-click querying interfaces remain far too complex for non-technical users. It is not clear that such an interface is even desirable for analysts or sophisticated-business users. Such an approach does not guarantee that the user will become aware of all data mining results, since in a querying application the user must select all attributes of interest. This would defeat the whole purpose of having a data mining program to find hidden patterns in the data. Hence, it is more desirable to have a point-and-click interface to a data mining program that steps the user through all results as opposed to a querying application where the user makes the decision on what should be reviewed.

The above discussion will now be illustrated in the context of the security log querying application. The security log querying application must now find hidden patterns in the data as well as answer the security guard's questions. The above approaches suggest that the security log querying application must now support new, mathematically sophisticated queries too.

An example is a query to find the circumstances that correlated with large numbers of thefts or to determine the statistically significant factors in predicting a likelihood of theft. In keeping with the number-of-incident query format (computation=number-of-incidents, shift-occurred=night, year=1998, location-of-incident=corporate-headquarters) a new correlation query is defined as (computation=correlation, shift-occurred=night, year=1998). The output of the correlation query is a real number between 0 and 1 indicating the correlation between the incidents that occurred in 1998 and the incidents that occurred at night. But this approach has two drawbacks.

First, the correlation query is quite distinct from the original queries, since the correlation query involves a much more complex computation. In other words, the programmer has to implement a completely different computer program to support the new correlation computation, because such a complex computation is generally not provided (packaged) with traditional databases. Further, the user has to understand the interface to this new computer program.

Second, correlation is an abstract mathematical concept (as are the prediction of likelihood and determination of statistical significance). Unlike the simpler number-of-incidents computations, the security guard is no longer dealing with familiar concepts that he or she can immediately relate to physical events. In other words, the mathematical primitive used in this computation, namely, correlation, is not easy to explain to a non-technical user. It would be far more desirable if the security guard had to interpret only the simpler computations, which the security guard uses on a daily basis.

OBJECTS OF THE INVENTION

Therefore, it is an object of the present invention to provide a data mining technique that can be incorporated easily into the traditional querying applications represented by FIG. 1.

It is another object of this invention to provide data mining programs that are simple to use even for non-technical users and that make it easy for the database querying application developers to add data mining capabilities to their offerings.

It is a further object of this invention to provide a technique of developing querying applications for analysts to review the results of data mining programs in a way that lets the user decide what should be reviewed but still alerts the user to important results that may be overlooked.

SUMMARY OF THE INVENTION

In accordance with the present invention, a method and apparatus are provided to find the greatest-valued and/or least-valued results that are related to the queries issued by a user of a class of querying applications. Such a querying application includes means for the user to issue a query, namely, to select a computation, to specify the values of attributes that are input to that computation and to receive the numeric result of that computation for that input. Such a model fits the mould of easy-to-use, point-and-click querying applications that use computations such as counts, sums, averages, percentages, etc., to map the user's input into a number.

In the invention, the greatest-valued and/or least-valued results corresponding to inputs that overlap with the user's input are also computed and made available to the user in the form of alerts, along with the numeric result for the user query. Further, the user is alerted to whether the inputs corresponding to these greatest-valued and/or least-valued results overlap with still other inputs that yield even greater and/or lesser results respectively. The user is given the means to learn about those other inputs, should they exist. The user is also provided with the means to identify other greatest-valued and/or least-valued results whose corresponding inputs did not overlap with any input that was provided by the user or that was presented to the user in the form of an alert during the querying session, and which are greater than and/or lesser than (respectively) the results of all other inputs that overlap with said corresponding inputs.

By focusing on such maximally-valued results, the invention increases the likelihood that these results will be of interest to the user. After all, these results are more extreme than the result of the user's original query. By relating the maximally-valued results to the user's queries by making sure that there are common elements in the user's query and the queries that yield the maximally-valued results, the invention increases the likelihood that the results will be of relevance to the user and that the user will understand the results.

We note that the invention is not limited to applications for the non-technical user. It also applies to more complicated computations that map attribute-values to numbers, such as measures of correlation, influence of factors and statistical significance. Our invention suggests a new way to develop a querying application for analysts to review the results of data mining programs in a way that lets the user decide what should be reviewed but still manages to alert the user to important results that may be in danger of being overlooked.

Various other objects, advantages and features of this invention will become readily apparent from the ensuing detailed description and the appended claim.

BRIEF DESCRIPTION OF THE DRAWINGS

The following detailed description, given by way of example, and not intended to limit the present invention solely thereto, will best be understood in conjunction with the accompanying drawings in which:

FIG. 18 describes a specific implementation of the output module, for use in a tennis data querying application utilizing an alert generator and a computation module, in accordance with the present invention.

DETAILED DESCRIPTION OF PREFERRED EMBODIMENTS

Figure 1:
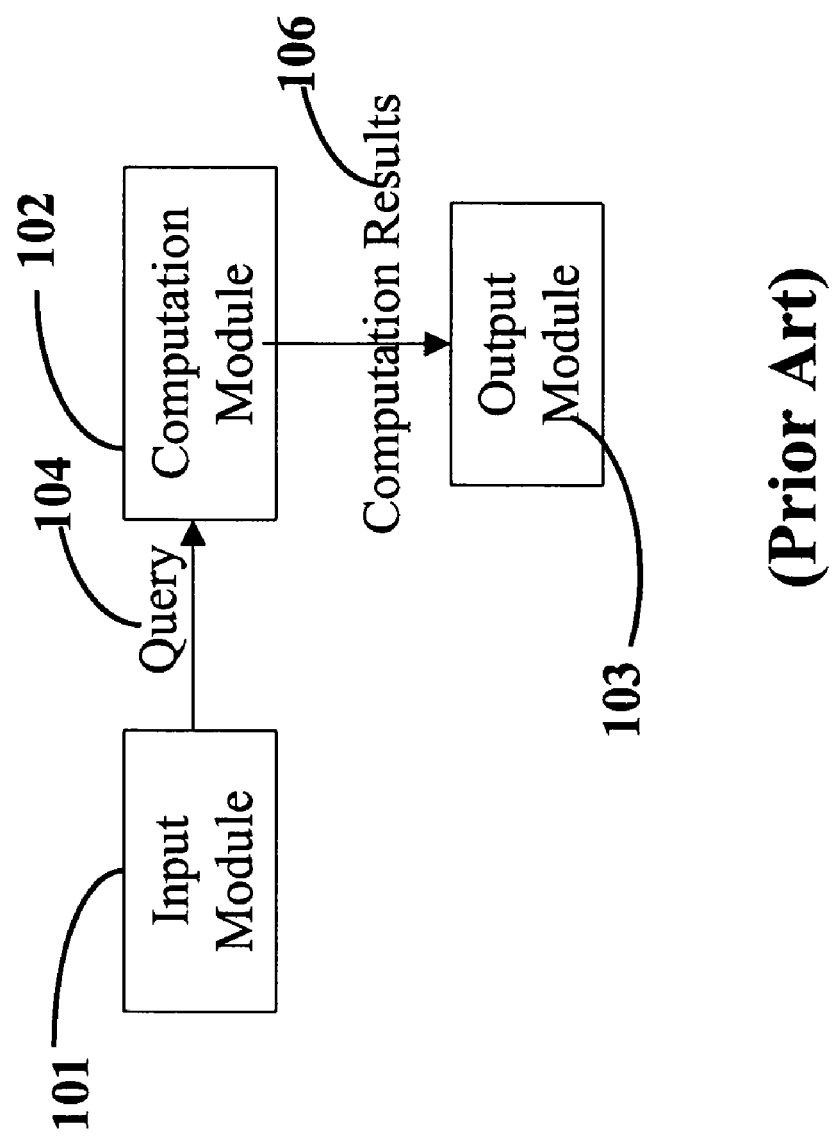
FIG. 1 is a block diagram of the logical functioning of a typical querying application, in accordance with the prior art.

The present invention enables the user to find hidden patterns in the data using only the simple computations (such as counts, sums, percentages, averages, etc.) supported by the computation module 102 of FIG. 1. It is not necessary to use mathematically-sophisticated computations involving correlation, factors, influences, etc. to find hidden patterns in the data. Consequently, the non-technical user can also utilize the advanced functionality found in the sophisticated querying application since he or she is never exposed to computations that they are not already familiar with.

The following is an illustration of how the present invention adds the capability of finding hidden patterns in the data to the security log querying application in a manner that does not overwhelm the non-technical user (i.e., the security guard). It is appreciated that the security-log example is used only for the purpose of illustration and the present invention has a wide range of applicability.

The security guard dealing with only the simple computations, (e.g., number-of-incidents, change-in-number), and average-time-elapsed is able to find hidden patterns using the present invention.

For example, the security guard issues the number-of-incident query (computation=number-of-incidents, shift-occurred=night, year=1998, location-of-incident=corporate-headquarters) and the security log querying application outputs a result of 10. In addition to displaying this result, the querying application of the present invention alerts the security guard to the fact that the result of a modified query (computation=number-of-incidents, shift-occurred=night, year=1998, location-of-incident=corporate-headquarters, type-of-incident=theft) is also 10.

The querying application of the present invention alerts the security guard to the fact that this modified query is identical to his original query except for the extra condition type-of-incident=theft, thereby informing the security guard that all of the ten incidents involved theft. This is a hidden pattern, in that the security guard was not concerned with the type of incident when he issued the query. However, the result of the modified query is clearly relevant to any conclusions that the security guard may reach regarding the ten incidents. In fact, not knowing that these incidents involved theft may mislead the security guard, since the ten thefts at corporate-headquarters may pose a serious problem while other types of incidents may not be as serious.

The above examples also demonstrate why the present invention simplifies the data analysis and motivates a user to make use of such data analysis. The querying application of the present invention presents the mathematically-sophisticated concept of correlation (e.g., thefts are clearly correlated with the conditions in the user's query, such as, night, 1998, corporate-headquarters, but the user does not need to formally understand the mathematical concept of correlation to appreciate the significance of the result. This is because the querying application of the present invention advantageously presents (or expresses) the correlation in terms of the physical events that the user (i.e., the security guard) is familiar with, i.e., all of the specific events were thefts. Thus, the present technique of juxtaposing the result of the user's query with the answer to a related query (as defined by the present invention) makes it possible to convey the sophisticated mathematical concepts in terms of physical events that the user understands.

The present technique also provides a more accurate data analysis, thereby encouraging more users to utilize data analysis. In the above security log example, the security guard reaches an erroneous conclusion if he or she is not alerted to the fact that all the events pertaining to his or her query were thefts. Hence, the present invention advantageously minimizes the probability that the user makes an erroneous decision. Therefore, the user will be motivated to review the results of a related query that may potentially uncover hidden patterns in the data along with the result of his or her query.

The present invention provides a rule or mechanism to find such hidden patterns automatically by computing the attribute-value strings that overlap with the user's query completely, i.e., they are longer than and contain the attribute-value string of the user's query. Along with the result of the user's query, the present invention informs the user of the attribute-value string that has the greatest-valued result (i.e., the most interesting or informative result) for the number-of-incidents computation. This rule allows the present invention to add conditions to the user's query that enables the user to interpret the data in a more informative manner than just based on the user's original query.

The following is an illustration of how a similar rule for the change-in-number computation leads to the identification of other hidden patterns in the data. Assume that the user's query now is (computation=change-in-number, shift-occurred=night, year=1998, location-of-incident=corporate-headquarters) and the result of this change-in-number query is −10 (20 such incidents in 1997 but only 10 in 1998). Along with the result, the querying application of the present invention alerts the security guard to two additional facts (i.e., results of the modified queries). The results of the modified queries (computation=change-in-number, shift-occurred=night, year=1998) is 20 and (computation=change-in-number, shift-occurred=night, year=1998, location-of-incident=corporate-headquarters, quarter=first) is −15. Although the number of incidents that occurred at night decreased by 10 at the corporate headquarters, the result of the modified queries indicate that most of the decrease occurred in the first quarter of 1998. In fact, the number incidents increase by 20 in 1998 across all locations.

Again, these hidden patterns in the data are relevant to any conclusion that the security guard may reach about the decrease in the number of incidents at the corporate headquarters in 1998. If the security guard relies solely on the result of his original query, the security guard will receive an incomplete picture of the data. The security guard may incorrectly assume that the number of incidents is on the decline even though the number of incidents actually increased over all locations in 1998.

For the change-in-number query illustrated above, the present invention provides a rule or mechanism to find such hidden patterns automatically by computing the attribute-value strings that overlap with the user's query completely to find the greatest-valued result and the attribute-value strings that are overlapped completely by the user's query to find the least-valued result. Along with the result of user's query, the present invention informs the user to the existence of two attribute-value strings that have elements in common with the user's query and that have the greatest-valued and least-valued results for the change-in-number computation. It is appreciated that the greatest-valued and least-valued results provide the most interesting information in the data that is also pertinent to the user's query.

In general, the present invention builds further on the above idea of identifying the greatest-valued and least-valued queries that overlap with the user's query in three ways.

In the first extension, the present invention presents the user with all queries that overlap with the user query and have greatest-valued and/or least-valued results (hereinafter referred to as overlapping queries). For example, using the security log application described herein, the security guard issues the query Q1=(computation=average-time-elapsed, shift-occurred=night, year=1998). The result of the query Q1 is 4.25 hours (the average time for discovering incidents that occurred at night in 1998). In addition, the result of the query Q2=(computation=average-time-elapsed, shift-occurred=night), which overlaps the query Q1, is 5 hours and no other query overlaps with the user's query Q1 having a result greater than 5 hours. The result of the query Q3=(computation=average-time-elapsed, shift-occurred=night, quarter=second), which overlaps with the query Q2, is 5.5 hours. The result of the query Q4=(computation average-time-elapsed, quarter=second), which overlaps Q3 is 6 hours; and no other query overlaps with the query Q4 having a result greater than 6 hours.

Along with the result of the user's query, the present invention alerts the user (i.e., security guard) to the existence of query Q2, which has the greatest-valued result of all queries that overlap the user's query. Also, the present invention provides the security guard with the means to trace all overlapping queries to find a maximally-valued query Q4. The maximally-valued query has the greatest-valued result of all overlapping queries. The present invention also provides the means to trace all overlapping queries to find a minimally-valued query. The minimally-valued query has the least-valued result of all overlapping queries.

In the second extension, the present invention alerts the user to other queries that have the following two properties: the alerted queries are not related to the user's query (i.e., the alerted queries do not overlap with the user's query and cannot be traced from the user's query as described above) and the alerted queries have the greatest-valued (or least-valued) result of all queries that overlap with them. In other words, the present invention alerts the user to other maximally-valued (or minimally-valued) queries.

In the third extension, if the user's query specifies more than one computation, for each computation, the present invention alerts the user to the queries having the greatest-valued and/or least-valued results. It is appreciated that only one of the specified computations may actually yield queries having the greatest-valued and least-valued results. For instance, in our examples above, if the security guard issues the query (computation=number-of-incidents, computation=change-in-number, shift-occurred=night, year=1998, location-of-incident=corporate-headquarters), the present invention alerts the security guard to the query (computation=number-of-incidents, shift-occurred=night, year=1998, location-of-incident=corporate-headquarters, type-of-incident=theft) and the query (computation=change-in-number, shift-occurred=night, year=1998, location-of-incident=corporate-headquarters, type-of-incident=theft), even though only the number-of-incident query yields the greatest value that overlaps with the security guard's query.

Those skilled in the art will recognize that there are obvious variations to the above extensions. For example, the querying application adds a computation to the computations in the user query and presents the results of that added-computation in addition to the computations selected by the user.

It is appreciated that the user (e.g., the security guard) is never exposed explicitly to abstract mathematical relationships in the data. Instead, the present invention alerts the user to queries having results that are greater than (or less than) the user's queries. The alerts ensure the user gains information about these abstract relationships implicitly when he compares the attribute-value strings of his queries to the attribute-value strings of the alerted queries to find results that are greater than or less than the results of his original query. The present invention alerts the user to the maximally-valued (or minimally-valued) results providing more insightful information about the data without subjecting the user to abstract, complex mathematical primitives. The user still deals with the computations that he or she can associate a physical event with, e.g., number-of-incidents, etc. Therefore, the interface for the querying application of the present invention is no more complex than the interface for the traditional querying application.

As shown herein, the querying application of the present invention is effective in finding and alerting the user to meaningful hidden patterns in the data for three different types of computations. The querying application of the present invention can be used with any computation that maps an attribute-value string to a number. The present invention is generally applicable to all querying applications defined by the logical functioning of FIG. 1.

Figure 2:
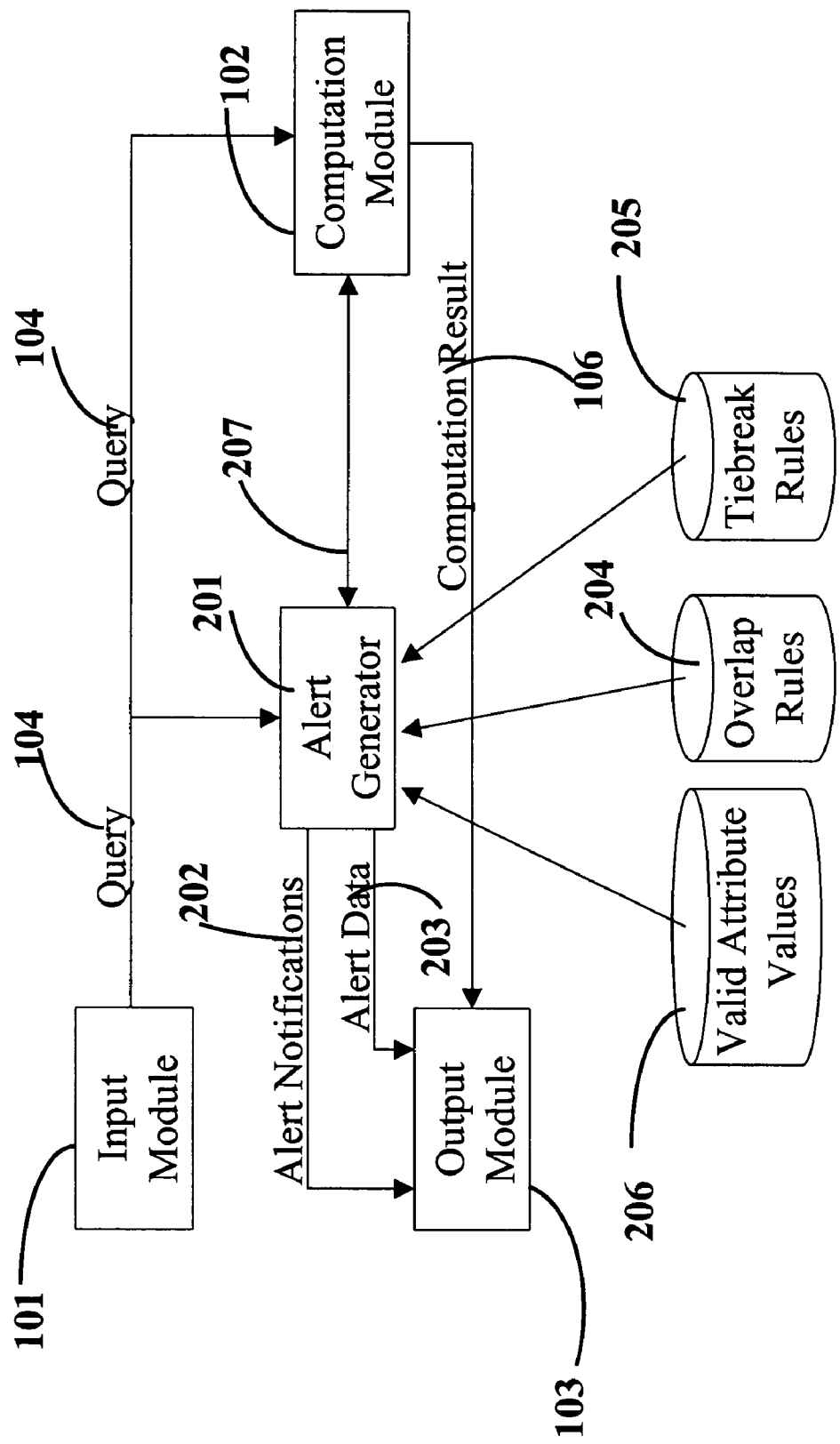
FIG. 2 is a block diagram of a querying application utilizing an alert generator in accordance with the present invention.

Turning now to FIG. 2, there is illustrated a block diagram of a querying application which incorporates the present invention. Essentially, the system of FIG. 2 adds an alert generator 201 to the querying application of FIG. 1. For simplicity, elements shown in FIG. 2 corresponding to those shown in FIG. 1 are denoted by the same reference numerals. The Alert Generator alerts the user to greatest-valued and/or least-valued results that overlap with the user's queries (i.e., the first extension described herein), or that lie completely outside the user's line of questioning (i.e., the second extension described herein).

The input module 101 provides the alert generator 201 and the computation module 102 with a query 104 consisting of the user's inputs (e.g., attribute-valued string S and the set of computations C to be performed). Since the possible values for every attribute is known a priori, all valid attribute values can be determined and pre-stored in a valid attribute values database 206. The stored valid attribute values are made available to the alert generator 201. Similarly, since the overlap rules for identifying which queries overlap with the attribute-value string in the user's query and tiebreak rules for resolving ties between queries that have the greatest-valued or least-valued results are known a priori, the overlap and tiebreak rules can be pre-stored in an overlap rules database 204 and a tiebreak rules database 205, respectively. The alert generator 201 generates alerts (e.g., alert notifications 202 and alert data 203) in response to the user's query 104 based on the valid attribute values in the valid attribute values database 206, computations in the computation module 102, the overlap rules in the overlap rules database 204, and the tiebreak rules in the tiebreak rules database 205. The alert data 203 contains information about the alerts generated and presented to the user in response to the user's query 104. The alert generator 201 provides alert notifications 202 and alert data 203, and the computation module 102 provides the computation results 106 to the output module 103. Preferably, the computation module 102 and the alert generator 201 can synchronize their output using a communication path 207.

Those skilled in the art will recognize several variations to the system depicted in FIG. 2. For example, the direct communication path between the input module 101 and the computation module 102, namely, the query 104, can be eliminated. Instead, all communication between input module 101 and the computation module 102 can be routed through the alert generator 201, since the alert generator 201 has direct communication paths with the input module 101 and the computation module 102. Also, different communication paths between the computation module 102 and the alert generator 201 can be used for synchronizing output and executing computations. In FIG. 2, the same communication path 207 can be used for synchronizing output and invoking the execution of computations.

Figure 3:
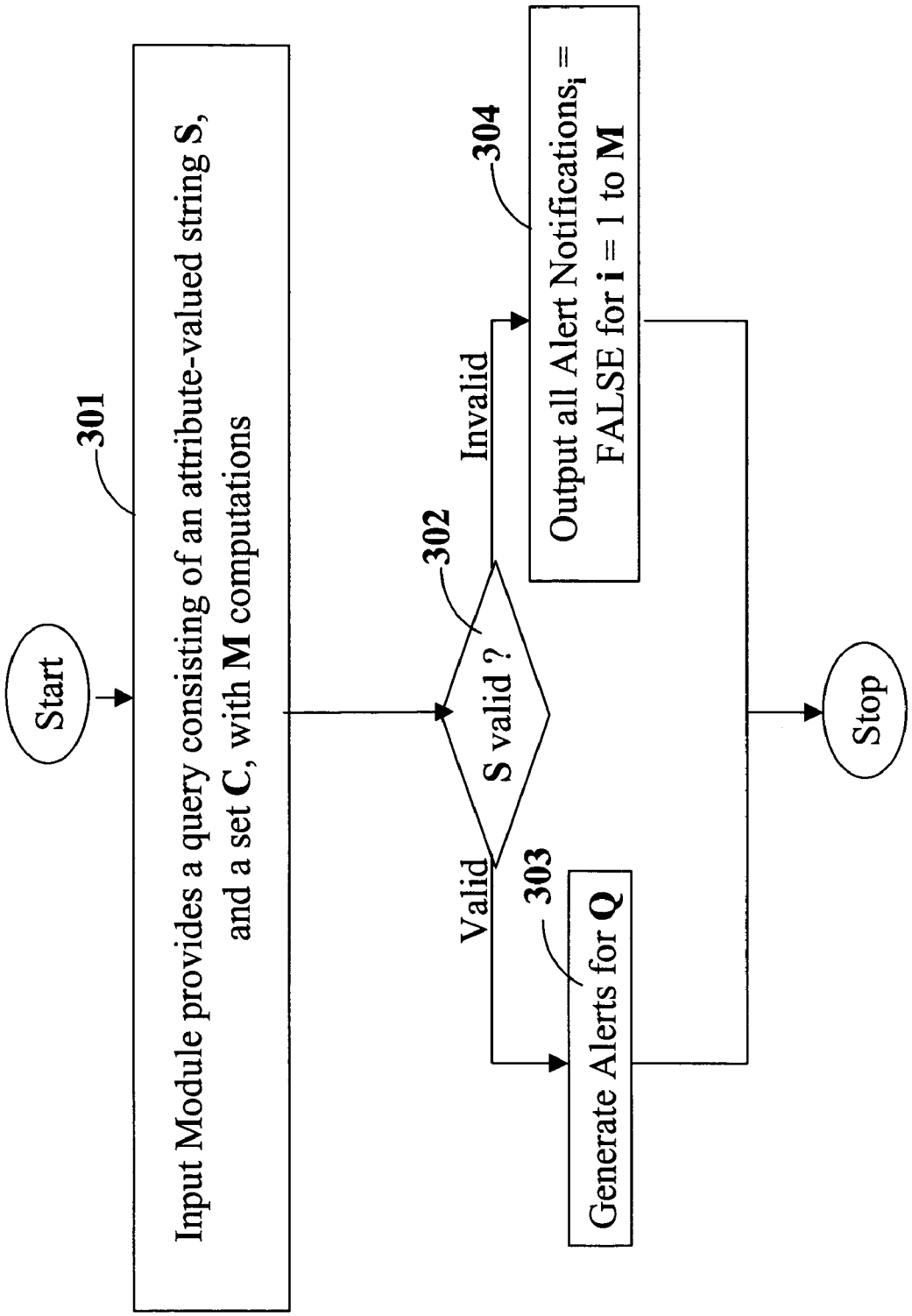
FIG. 3 is a flowchart describing the functioning of the alert generator in the querying application depicted in FIG. 2.

The operation of the querying application of the present invention as shown in FIG. 2 is described in conjunction with the flow chart of FIG. 3. The input module 101 provides the alert generator 201 with the query 104, consisting of an attribute-valued string S, and a set C containing M computations, $\{C_1, C_2 \ldots C_M\}$ at step 301. The alert generator 201 determines if the string S is a valid input using the valid attribute values stored in the valid attribute values database 206 at step 302. The value of each attribute in the string S is verified against the valid attribute values. If the value of any attribute in the string S is determined to be invalid, (i.e., the particular value is not found among the valid attribute values), the string S is declared to be invalid and all alert notifications are set to FALSE for all computations in the set C at step 304. However, if the values for all attributes in the string S are determined to be valid, the string S is declared to be a valid attribute-valued string and alerts are generated for the query 104 at step 303.

Overlap Rule

An overlap rule O is a function that has two attribute-valued strings R and S as inputs, and produces a Boolean result (true or false). If the overlap rule returns a true result, then string R is said to "overlap" string S. In an embodiment of the present invention, the alert generator 201 (FIG. 2) applies three types of overlap rules: substring, superstring and commonality rules. In all three rules, a comparison is true only if the values of attributes being compared are not the "*" value.

The substring rule, O(R, S), returns a true result if and only if ("iff") every attribute in string R also occurs (or exists) in string S, and has the same value. String R is a substring of string S if the substring rule returns a true result. It is appreciated that the substring rule will always return a true result for O(R, R).

The superstring rule, O(R, S), returns a true result if and only if every attribute in string S also occurs (or exists) in string R, and has the same value. String R is a superstring of string S if the superstring rule returns a true result. It is appreciated that the superstring will always return a true result for O(R, R).

The commonality rule, O(R, S), returns a true result if and only if strings R and S satisfy the following constraints: i) there is at least one attribute A having the same value in both strings R and S; ii) there is at least one attribute B in string R, but not necessarily in string S and the value of the attribute B differs in strings R and S; and iii) there is at least one attribute C in string S, but not necessarily in string R and the value of the attribute C differs in strings R and S. Strings R and S have certain values in common if the commonality rule returns a true result. It is appreciated that the commonality rule will always return a false result for O(R, R).

An attribute-valued string R overlaps another attribute-valued string S if and only if at least one overlap rule returns a true result. It is appreciated that the overlap rules are not limited to the three specified herein and other overlap rules may be utilized by the alert generator 201. For example, instead of determining if one or more values of attributes are common to two strings, the overlap rules can determine if one or more attributes are common to two strings.

Tiebreak Rule

A tiebreak rule selects one or neither of two attribute-valued strings R and S, which produce the same result for a computation C (i.e., C(R)=C(S)). A Tiebreak Rule can be expressed as a function T(R, S)=P, where P=R if the tiebreak rule selects R over S, P=S if the tiebreak rule selects S over R, and P=null or any special value different from any valid attribute-valued string if the tiebreak rule is unable to decide between R and S.

In an embodiment of the present invention, the alert generator 201 (FIG. 2) applies two types of tiebreak rules: longest string and shortest string rules. The longest string rule selects the string with the largest number of attributes selected by the user. The length of an attribute-valued string S, denoted as L(S), is defined as the number of attributes in S which have valid values other than "*". In other words, the alert generator 201 (FIG. 2) selects string R (or T(R, S)=R) if L(R)>L(S), string S (or T(R, S)=S) if L(R)<L(S), and neither string (or T(R, S)=null) if L(R)=L(S).

The shortest string rule selects the string with the smallest number of attributes selected by the user. In other words, the alert generator 201 (FIG. 2) selects string R if L(R)<L(S), string S if L(R)>L(S), and neither string if L(R)=L(S). It is appreciated that the tiebreak rules are not limited to the two specified herein and other tiebreak rules may be utilized by the alert generator 201 (FIG. 2).

Alerts

In an embodiment of the present invention, the alert generator 201 (FIG. 2) generates six types of alerts: LOQMAX, LOQMIN, MAXINT, MININT, MAXTRACE and MINTRACE alerts. Each of the alerts will be described in detail herein. A query Q consisting of an attribute-valued string S, and a set C containing M computations, $\{C_1, C_2 \ldots C_M\}$ is provided as input to the alert generator 201. Based on the input query Q, the alert generator 201 generates the LOQMAX, LOQMIN, MAXINT, MININT, MAXTRACE, and MINTRACE alerts when strings are found satisfying the LOQMAX, LOQMIN, MAXINT, MININT, MAXTRACE, and MINTRACE conditions, respectively. Preferably, the alert generator 201 generates the alerts in the following order for the query Q: MAXINT, MININT, LOQMAX, LOQMIN, MAXTRACE, and MINTRACE alerts.

Each alert notification 202 (FIG. 2) contains a field for identifying (or describing) the computation associated with the notification. The alert notification also includes six other fields, one for each type of alert. Each of the alert fields can be set to true or false, indicating whether the corresponding alert is being generated, respectively, for the particular computation.

The alert data 203 (FIG. 2) contains a field specifying the type of alert data (i.e., MAXINT Alert Data, MININT Alert Data, LOQMAX Alert Data, LOQMIN Alert Data, MAXTRACE Alert Data or MINTRACE Alert Data), another field that contains the actual Alert Data itself and preferably, a third field containing alert data error information. The content of the third field depends on the alert type (i.e., the content of the first field): the third field contains "MAXINT Alert Data Error! Reference source not found" for the MAXINT alert, "MININT Alert Data Error! Reference source not found" for the MININT alert and so on. Those skilled in the art will recognize that it is possible to represent the above alert information differently by using a different logical partitioning.

LOQMAX Condition

The LOQMAX condition is used to find (or unearth) an attribute-valued string having the greatest-valued result that overlaps with the string in the user's query. The term "string" and "attribute-valued string" are used interchangeably herein. A string $S_{iLOQMAX}$ satisfies the LOQMAX (S, $C_i$) condition if and only if the following constraints are satisfied (for some pre-specified overlap and tiebreak rules): $S_{iLOQMAX}$ overlaps S and $C_i(S_{iLOQMAX}) >= C_i(P)$ for all strings P overlapping S. It is appreciated that the LOQMAX condition can be mathematically characterized as the local maximum condition, i.e., finding a local maximum string.

Figure 6:
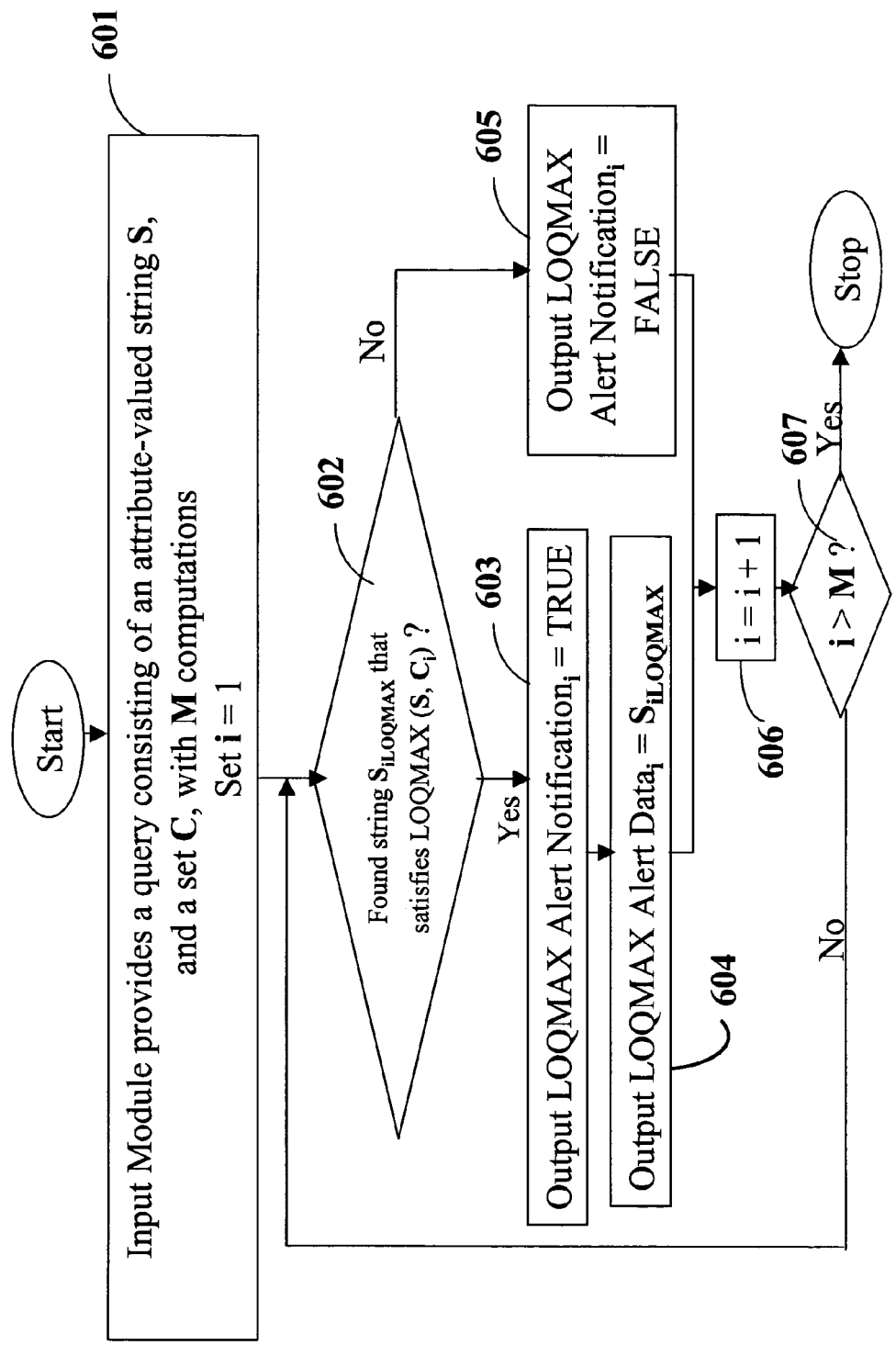
FIG. 6 is a flowchart that describes the method by which the alert generator generates LOQMAX alerts.

The manner in which the alert generator 201 generates LOQMAX alerts is described in conjunction with the flow chart of FIG. 6. The input module 101 provides the alert generator 201 with the query 104, consisting of an attribute-valued string S, and a set C containing M computations, $\{C_1, C_2 \ldots C_M\}$ at step 601. For each computation $C_i$ in C (1<=i<=M), the alert generator attempts to find a string $S_{iLOQMAX}$ that satisfies the LOQMAX condition for the string S and the computation $C_i$, utilizing the overlap rules and the tiebreak rules stored in the overlap rules database 204 and the tiebreak rules database 205, respectively, at step 602. If the alert generator 201 finds the $S_{iLOQMAX}$ for the computation $C_i$, the LOQMAX alert notification for $C_i$ is set to "true" at step 603 and the string $S_{iLOQMAX}$ is output as the LOQMAX alert data for computation $C_i$ at step 604. However, if the alert generator 201 does not find the string $S_{iLOQMAX}$ for the computation $C_i$, the LOQMAX alert notification for $C_i$ is set to "false" at step 605. The steps 602–605 are repeated for each computation $C_i$ in C (1<=i<=M). The variable "i" is incremented by one at step 606 until all of the computations in C have been dealt with (i.e., i>M) at step 607.

The LOQMAX alert data itself consists of three sub-fields of data for each computation $C_i$. The first field contains the description of the computation $C_i$, the second field contains the attribute-valued string $S_{iLOQMAX}$ that satisfies the LOQMAX condition for the input query 104, and the third field contains the computation result $C_i(S_{iLOQMAX})$.

LOQMIN Condition

The LOQMIN condition is used to find (or unearth) an attribute-valued string having the least-valued result that overlaps with the string in the user's query. A string $S_{iLOQMIN}$ satisfies the LOQMIN (S, $C_i$) condition if and only if the following constraints are satisfied (for some pre-specified overlap and tiebreak rules): $S_{iLOQMIN}$ overlaps S and $C_i(S_{iLOQMIN}) <= C_i(P)$ for all strings P overlapping S. It is appreciated that the LOQMIN condition can be mathematically characterized as the local minimum condition, i.e., finding a local minimum string.

Figure 7:
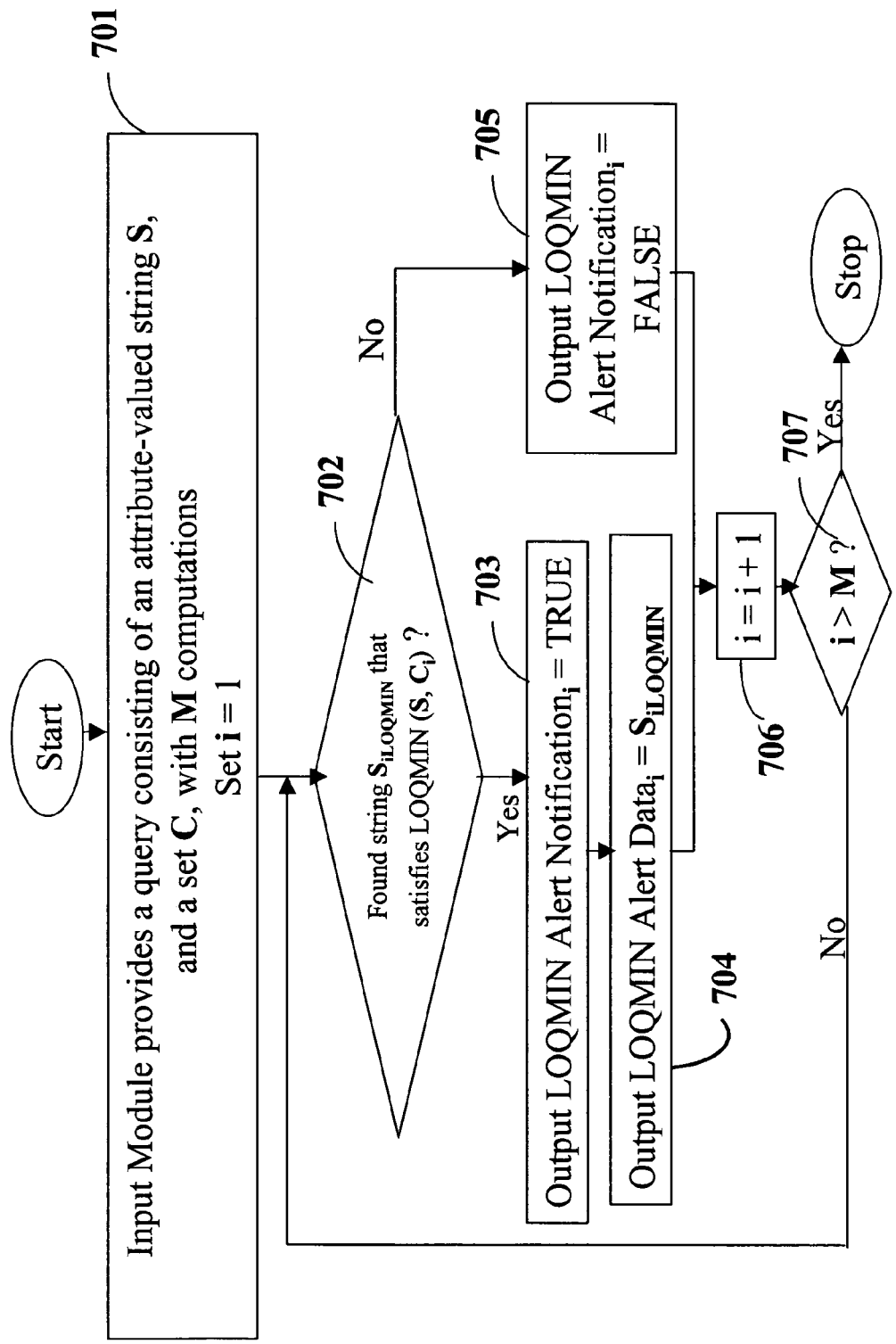
FIG. 7 is a flowchart that describes the method by which the alert generator generates LOQMIN alerts.

The manner in which the alert generator 201 of FIG. 2 generates LOQMIN alerts is described in conjunction with the flow chart of FIG. 7. The input module 101 provides the alert generator 201 with the query 104, consisting of an attribute-valued string S, and a set C containing M computations, $\{C_1, C_2 \ldots C_M\}$ at step 701. For each computation $C_i$ in C (1<=i<=M), the alert generator attempts to find a string $S_{iLOQMIN}$ that satisfies the LOQMIN condition for the string S and the computation $C_i$, utilizing the overlap rules and the tiebreak rules stored in the overlap rules database 204 and the tiebreak rules database 205, respectively, at step 702. If the alert generator 201 finds the $S_{iLOQMIN}$ for the computation $C_i$, the LOQMIN alert notification for $C_i$ is set to "true" at step 703 and the string $S_{iLOQMIN}$ is output as the LOQMIN alert data for computation $C_i$ at step 704. However, if the alert generator 201 does not find the string $S_{iLOQMIN}$ for the computation $C_i$, the LOQMIN alert notification for $C_i$ is set to "false" at step 705. The steps 702–705 are repeated for each computation $C_i$ in C (1<=i<=M). The variable "i" is incremented by one at step 706 until all of the computations in C have been dealt with (i.e., i>M) at step 707.

The LOQMIN alert data itself consists of three-sub-fields of data for each computation $C_i$. The first field contains the description of the computation $C_i$, the second field contains the attribute-valued string $S_{iLOQMIN}$ that satisfies the LOQMIN condition for the input query 104, and the third field contains the computation result $C_i(S_{iLOQMIN})$.

MAXINT Condition

The MAXINT condition is used to locate a string q having greatest-valued result $r_{max}$ that overlaps with the string in the user's query, and there is no query with a string having a result greater than $r_{max}$ that overlaps the string q. A string $S_{iMAXINT}$ satisfies the MAXINT (S, $C_i$) condition if and only if the following constraints are satisfied (for some pre-specified overlap and tiebreak rules): $S_{iMAXINT} = S_{iLOQMAX}$ and $C_i(S_{iMAXINT}) >= C_i(P)$ for all strings P overlapping the string $S_{iMAXINT}$. Preferably, the MAXINT condition can be generalized to the following: The string $S_{iMAXINT}$ overlaps the string S and $C_i(S_{iMAXINT}) \geq C_i(P)$ for all strings P overlapping the string $S_{iMAXINT}$. It is appreciated that the MAXINT condition can be mathematically characterized as the global maximum condition, i.e., finding one global maximum string. The more general MAXINT condition may find more than one global maximum string.

Figure 4:
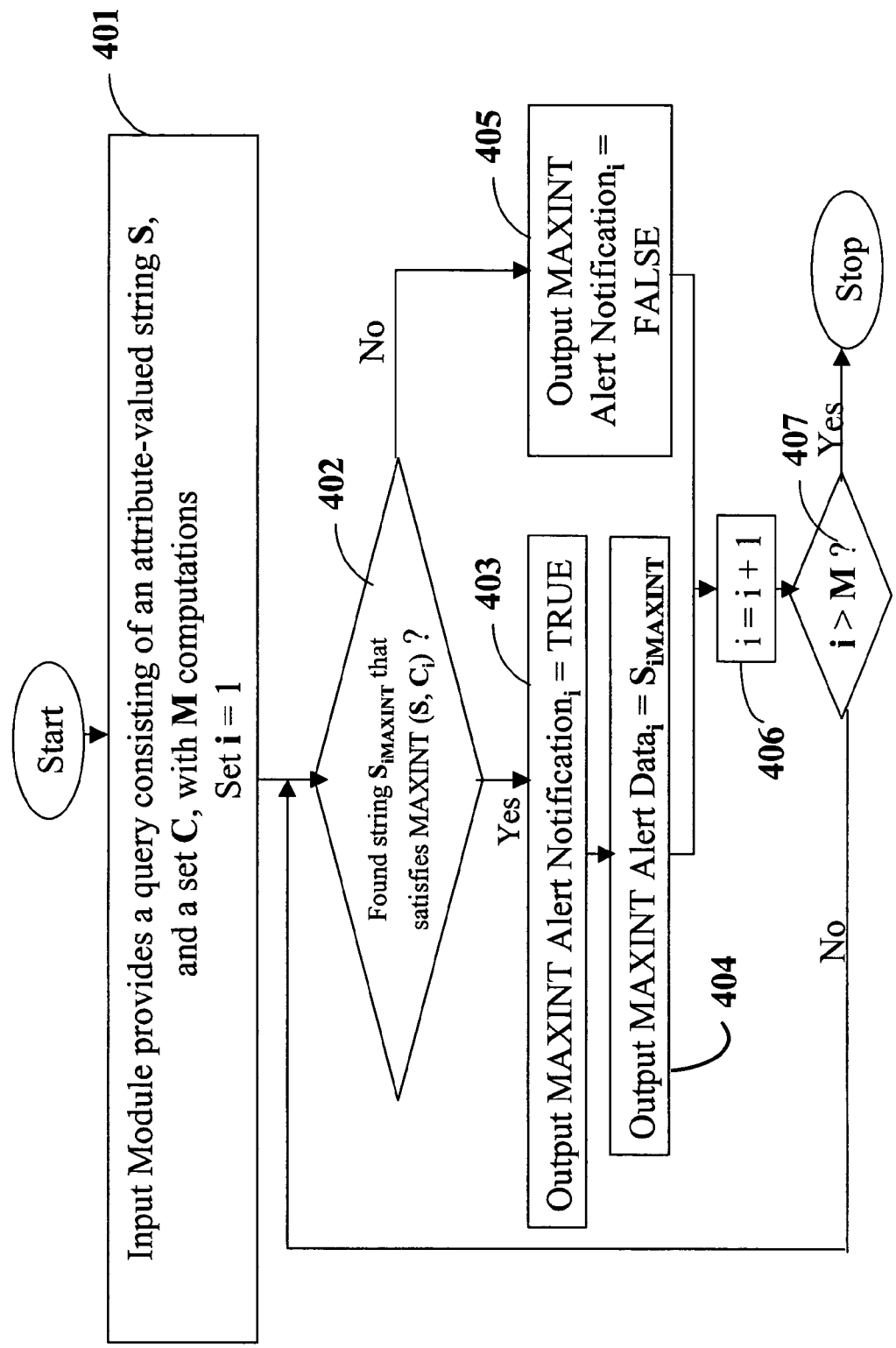
FIG. 4 is a flowchart describing the method by which the Alert Generator generates MAXINT alerts.

The manner in which the alert generator 201 of FIG. 2 generates MAXINT alerts is described in conjunction with the flow chart of FIG. 4. The input module 101 provides the alert generator 201 with the query 104, consisting of an attribute-valued string S, and a set C containing M computations, $\{C_1, C_2 \ldots C_M\}$ at step 401. For each computation $C_i$ in C ($1 \leq i \leq M$), the alert generator 201 attempts to find a string $S_{iMAXINT}$ that satisfies the MAXINT condition for the string S and the computation $C_i$, utilizing the overlap rules and the tiebreak rules stored in the overlap rules database 204 and the tiebreak rules database 205, respectively, at step 402. If the alert generator 201 finds the string $S_{iMAXINT}$ for the computation $C_i$, the MAXINT alert notification for $C_i$ is set to "true" at step 403 and the string $S_{iMAXINT}$ is output as the MAXINT alert data for computation $C_i$ at step 404. However, if the alert generator 201 does not find the string $S_{iMAXINT}$ for the computation $C_i$, the MAXINT alert notification for $C_i$ set to "false" at step 405. The steps 402–405 are repeated for each computation $C_i$ in C ($1 \leq i \leq M$). The variable "i" is incremented by one at step 406 until all of the computations in C have been dealt with (i.e., i>M) at step 407.

The MAXINT alert data itself consists of three sub-fields of data for each computation $C_i$. The first field contains the description of the computation $C_i$, the second field contains the attribute-valued string $S_{iMAXINT}$ that satisfies the MAXINT condition for the input query 104, and the third field contains the computation result $C_i(S_{iMAXINT})$.

MININT Condition

The MININT condition is used to locate a string q having least-valued result $r_{min}$ that overlaps with the string in the user's query, and there is no query with a string having a result less than $r_{min}$ that overlaps the string q. A string $S_{iMININT}$ satisfies the MININT (S, $C_i$) condition if and only if the following constraints are satisfied (for some pre-specified overlap and tiebreak rules): $S_{iMININT} = S_{iLOQMIN}$ and $C_i(S_{iMININT}) \leq C_i(P)$ for all strings P overlapping the string $S_{iMININT}$. Preferably, the MININT condition can be generalized to the following: the string $S_{iMININT}$ overlaps the string S and $C_i(S_{iMININT}) \leq C_i(P)$ for all strings P overlapping the string $S_{iMININT}$. It is appreciated that the MININT condition can be mathematically characterized as the global minimum condition, i.e., finding one global minimum string. The general MININT condition may find more than one global minimum string.

Figure 5:
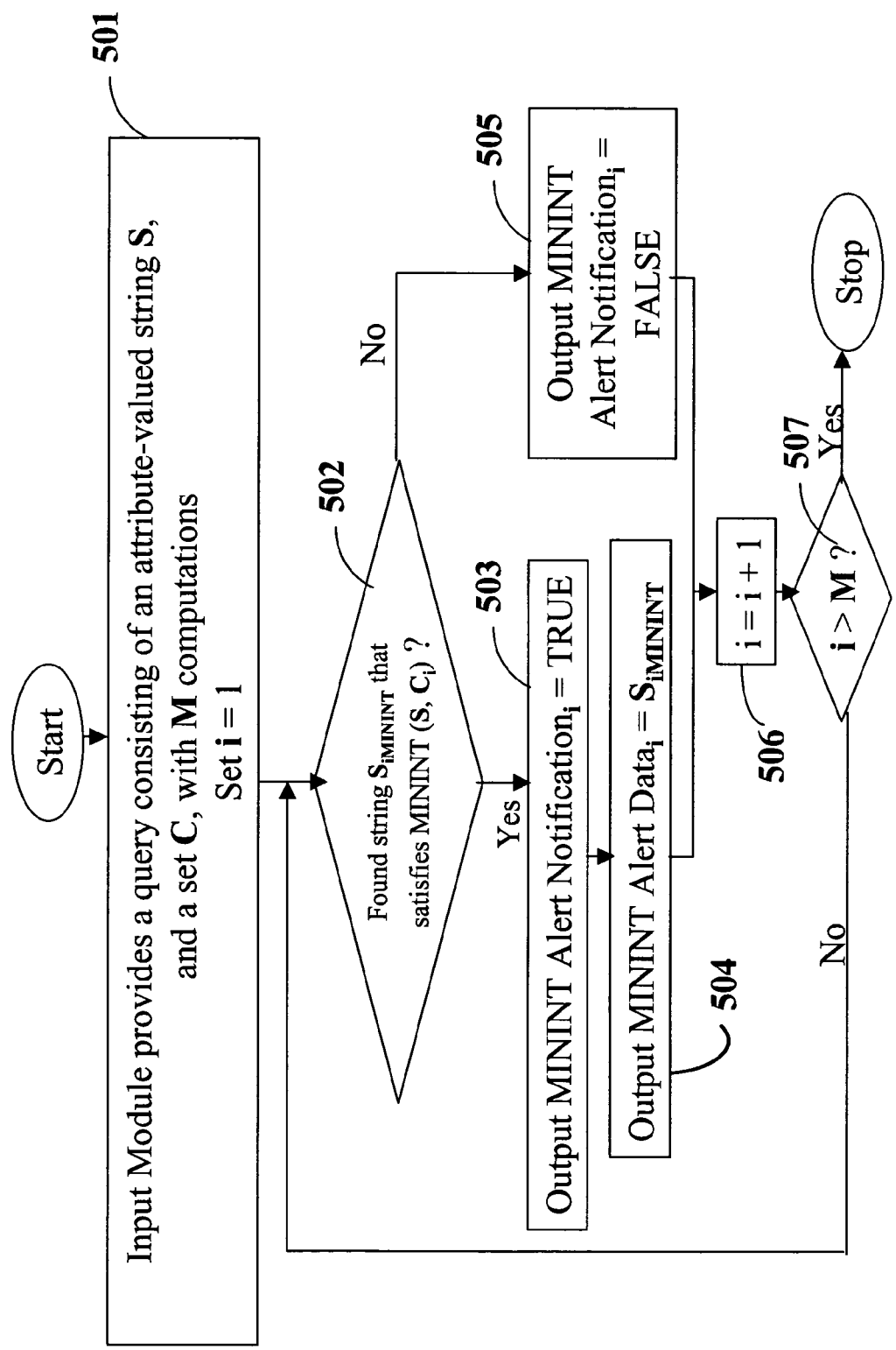
FIG. 5 is a flowchart describing the method by which the alert generator generates MININT alerts.

The manner in which the alert generator 201 of FIG. 2 generates MININT alerts is described in conjunction with the flow chart of FIG. 5. The input module 101 provides the alert generator 201 with the query 104, consisting of an attribute-valued string S, and a set C containing M computations, $\{C_1, C_2 \ldots C_M\}$ at step 501. For each computation $C_i$ in C ($1 \leq i \leq M$), the alert generator 201 attempts to find a string $S_{iMININT}$ that satisfies the MININT condition for the string S and the computation $C_i$, utilizing the overlap rules and the tiebreak rules stored in the overlap rules database 204 and the tiebreak rules database 205, respectively, at step 502. If the alert generator 201 finds the string $S_{iMININT}$ for the computation $C_i$, the MININT alert notification for $C_i$ is set to "true" at step 503 and the string $S_{iMININT}$ is output as the MININT alert data for computation $C_i$ at step 504. However, if the alert generator 201 does not find the string $S_{iMININT}$ for the computation $C_i$, the MININT alert notification for $C_i$ is set to "false" at step 505. The steps 502–505 are repeated for each computation $C_i$ in C ($1 \leq i \leq M$). The variable "i" is incremented by one at step 506 until all of the computations in C have been dealt with (i.e., i>M) at step 507.

The MININT alert data itself consists of three sub-fields of data for each computation $C_i$. The first field contains the description of the computation $C_i$, the second field contains the attribute-valued string $S_{iMININT}$ that satisfies the MININT condition for the input query 104, and the third field contains the computation result $C_i(S_{iMININT})$.

MAXTRACE

MAXTRACE (S, $C_i$) defines an ordered set of strings $T_0$, $T_1, \ldots T_N$, where $T_0$ satisfies LOQMAX (S, $C_i$), $T_j$ satisfies LOQMAX ($T_{j-1}$, $C_i$) for $1 \leq j \leq N-1$, and $T_N$ satisfies MAXINT ($T_{N-1}$, $C_i$). Alternatively, $T_0 = S$, $T_j$ overlaps $T_{j-1}$ for $1 \leq j \leq N-1$, and $T_N$ satisfies MAXINT ($T_{N-1}$, $C_i$). The MAXTRACE function enables the user to trace through all overlapping queries to find a maximally-valued query. The maximally-valued query has the greatest-valued result of all overlapping queries.

Figure 8:
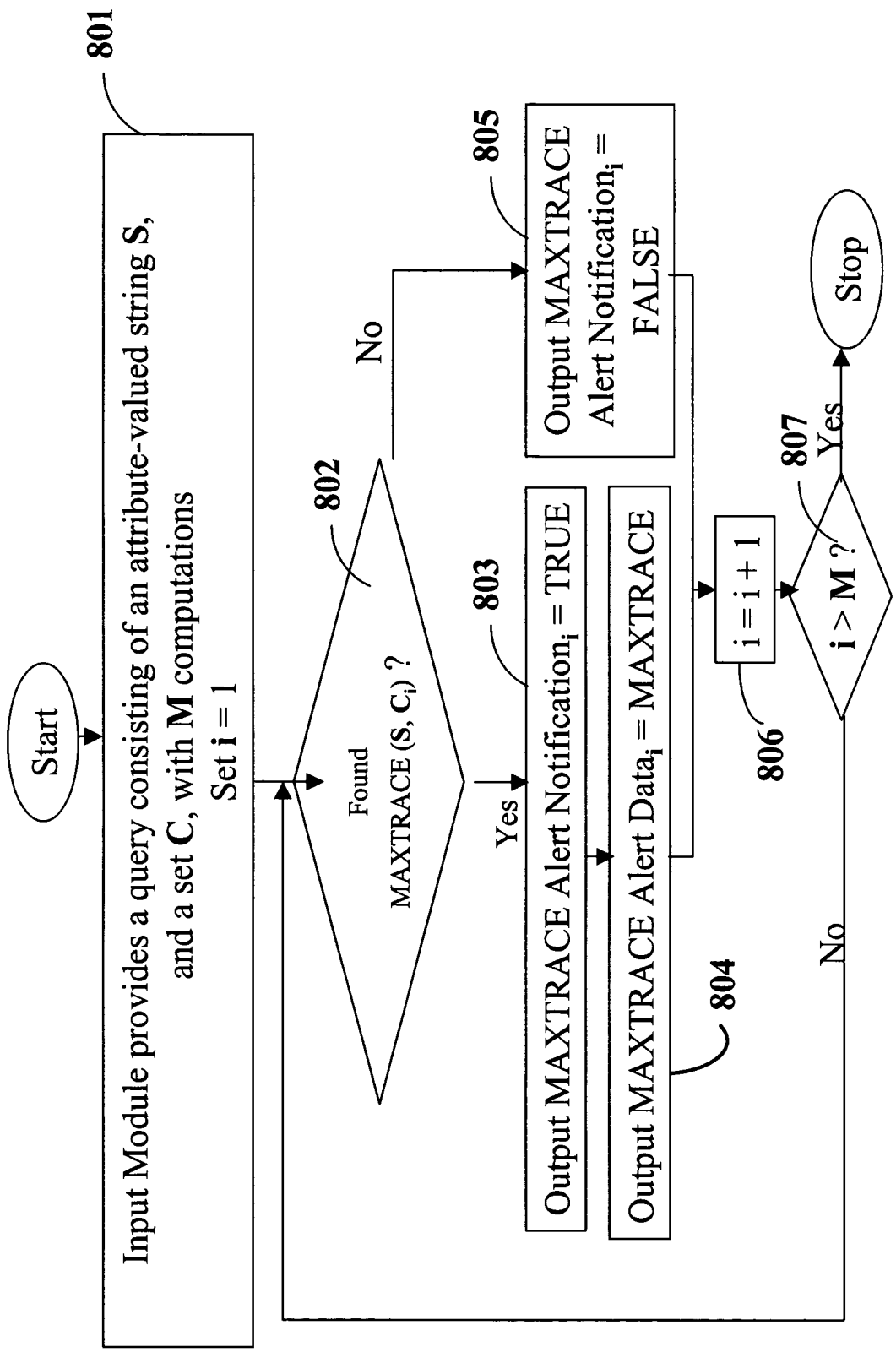
FIG. 8 is a flowchart describing the method by which the alert generator generates MAXTRACE alerts.

The manner in which the alert generator generates MAXTRACE alerts is described in conjunction with the flow chart of FIG. 8. The input module 101 provides the alert generator 201 with the query 104, consisting of an attribute-valued string S, and a set C of M computations, $\{C_1, C_2 \ldots C_M\}$ at step 801. For each computation $C_i$ in C ($1 \leq i \leq M$), the alert generator attempts to find a MAXTRACE for the string S and the computation $C_i$, utilizing the overlap rules and the tiebreak rules stored in the overlap rules database 204 and the tiebreak rules database 205, respectively, at step 802. If the alert generator 201 finds the MAXTRACE for the computation $C_i$, the MAXTRACE alert notification for $C_i$ is set to "true" at step 803 and the MAXTRACE is output as the MAXTRACE alert data for computation $C_i$ at step 804. However, if the alert generator 201 does not find the MAXTRACE for the computation $C_i$, the MAXTRACE alert notification for $C_i$ is set to "false" at step 805. The steps 802–805 are repeated for each computation $C_i$ in C ($1 \leq i \leq M$). The variable "i" is incremented by one at step 806 until all of the computations in C have been dealt with (i.e., i>M) at step 807.

The MAXTRACE alert data itself consists of two sub-fields of data for each computation $C_i$ and a varying number of additional data fields depending on the number of strings T in the MAXTRACE. For each computation $C_i$, the first field contains the description of the computation $C_i$ and the second field contains the number of strings T in the MAXTRACE. For each string $T_j$, the MAXTRACE alert data additionally contains one data field for identifying the string $T_j$ and a second data field for the computation result $C_i(T_j)$.

MINTRACE

MINTRACE (S, $C_i$) defines an ordered set of strings $T_0$, $T_1, \ldots T_N$, where $T_0$ satisfies LOQMIN (S, $C_i$), $T_j$ satisfies LOQMIN ($T_{j-1}$, $C_i$) for $1 \leq j \leq N-1$, and $T_N$ satisfies MININT ($T_{N-1}$, $C_i$). Alternatively, $T_0 = S$, $T_j$ overlaps $T_{j-1}$ for $1 \leq j \leq N-1$, and $T_N$ satisfies MININT ($T_{N-1}$, $C_i$). The MINTRACE function enables the user to trace through all overlapping queries to find a minimally-valued query. The minimally-valued query has the least-valued result of all overlapping queries.

Figure 9:
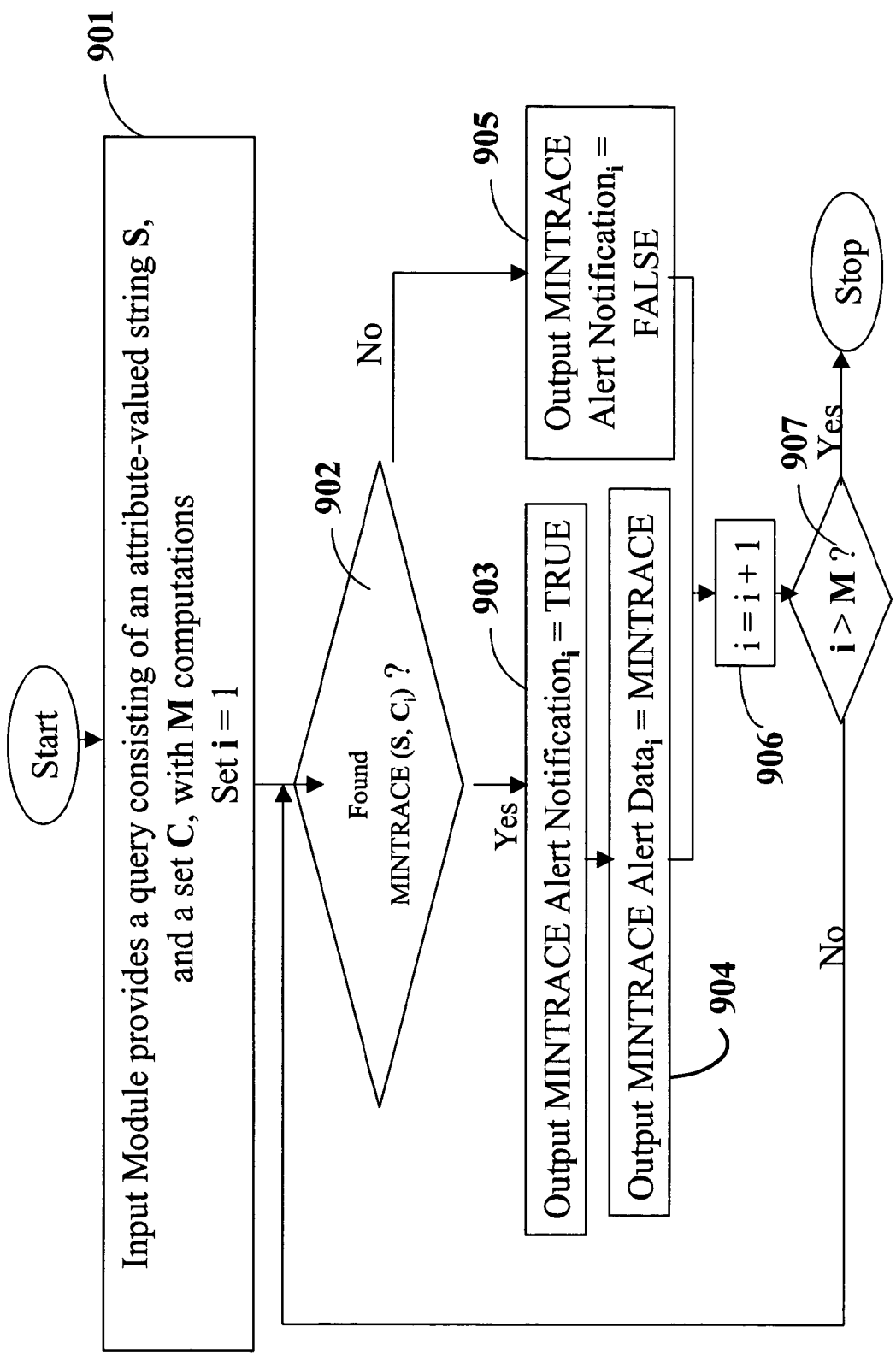
FIG. 9 is a flowchart describing the method by which the alert generator generates MINTRACE alerts.

The manner in which the alert generator generates MINTRACE alerts is described in conjunction with the flow chart of FIG. 9. The input module 101 provides the alert generator 201 with the query 104, consisting of an attribute-valued string S, and a set C of M computations, $\{C_1, C_2 \ldots C_M\}$ at step 901. For each computation $C_i$ in C ($1<=i<=M$), the alert generator attempts to find a MINTRACE for the string S and the computation $C_i$, utilizing the overlap rules and the tiebreak rules stored in the overlap rules database 204 and the tiebreak rules database 205, respectively, at step 902. If the alert generator 201 finds the MINTRACE for the computation $C_i$, the MINTRACE alert notification for $C_i$ is set to "true" at step 903 and the MINTRACE is output as the MINTRACE alert data for computation $C_i$ at step 904. However, if the alert generator 201 does not find the MINTRACE for the computation $C_i$, the MINTRACE alert notification for $C_i$ is set to "false" at step 905. The steps 902–905 are repeated for each computation $C_i$ in C ($1<=i<=M$). The variable "i" is incremented by one at step 906 until all of the computations in C have been dealt with (i.e., i>M) at step 907.

The MINTRACE alert data itself consists of two subfields of data for each computation $C_i$ and a varying number of additional data fields depending on the number of strings T in the MINTRACE. For each computation $C_i$, the first field contains the description of the computation $C_i$ and the second field contains the number of strings T in the MINTRACE. For each string $T_j$, the MINTRACE alert data additionally contains one data field for identifying the string $T_j$ and a second data field for the computation result $C_i(T_j)$.

Pre-Computation of Results

As discussed herein, the alert generator primarily performs the tasks of searching for attribute-valued strings that satisfy one or more of the six types of alerts, for a particular input query. In another embodiment of the present invention, the querying application can compute and list all the attribute-valued strings satisfying the alert conditions for all potential user queries in advance, i.e., offline and prior to accepting user queries. After receiving a specific user query, the alert generator searches for attribute-valued strings satisfying the alert conditions for the specific user query from the stored pre-computed results, thereby improving the efficiency of the alert generator.

Figure 10:
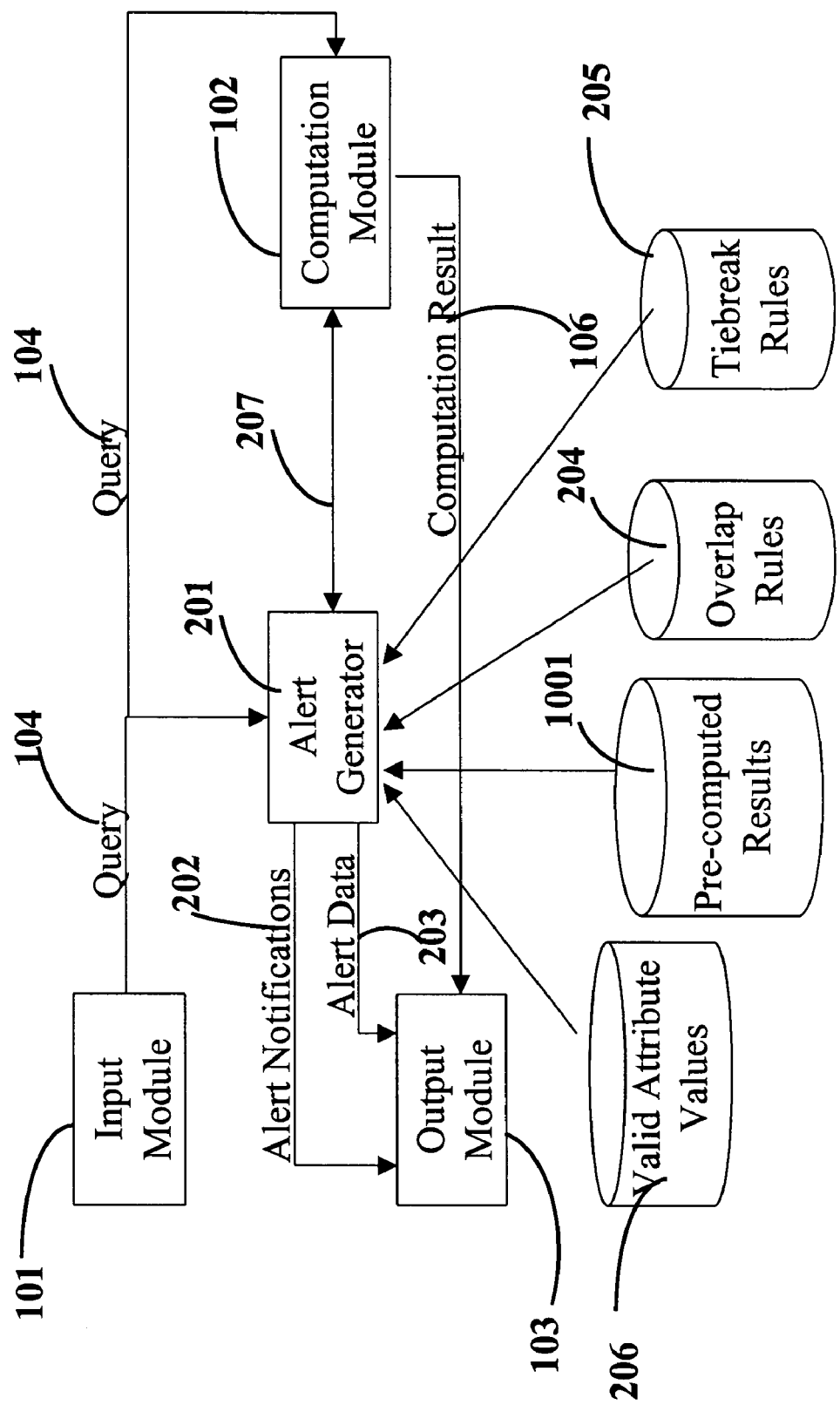
FIG. 10 describes a specific implementation of the alert generator, in which alert results are pre-computed.

Turning now to FIG. 10, there is illustrated a querying application of the present invention which pre-computes the alert conditions for all possible user queries in advance. Essentially, the querying application of FIG. 10 adds a pre-computed results database 1001 to the querying application of FIG. 2. For simplicity, elements shown in FIG. 10 corresponding to those shown in FIG. 2 are denoted by the same reference numerals and their descriptions are omitted. The alert generator 201 now has access to the pre-computed results stored in the pre-computed results database 1001. When the input module 101 issues (or provides) a user query 104, the alert generator 201 searches the pre-computed results database 1001 to check if any of the stored results satisfies any of the six alert criteria for the user query 104. As in FIG. 2, the alert generator 201 outputs (or provides) the alert notifications 202 and alert data 203 to the output module 103. In contrast to FIG. 2, the link 207 of FIG. 10 is used only for synchronizing the transmission of the output from the computation module 102 and the alert generator 201 to the output module 103. That is, the link 207 is no longer necessary to invoke the execution of computations.

Alternatively, the pre-computed results database 1001 may not contain the alert conditions for all possible user queries. That is, the pre-computed results in the pre-computed results database 1001 is incomplete. This may occur if a data mining program or statistical analysis package is used to obtain the pre-computed results, as such programs generally do not provide an exhaustive, time-consuming and complete list of the alert conditions for all possible user queries. Persons skilled in the art will recognize that there are many data mining programs and statistical analysis packages that can be used in conjunction with the querying application of the present invention.

Fundamentally, there is no difference in the operation of the alert generator 201 whether the pre-computed results are partial or complete. The alert generator 201 searches for the attribute-valued strings satisfying the alert conditions for a specific user query from the stored pre-computed results, thus resulting in a faster response. In the partial pre-computed results case, since the alert generator 201 generates the alert notifications 202 and the alert data 203 based on the incomplete pre-computed results stored in the pre-computed results database 1001, some of the alerts obtained with the complete pre-computed results may not be found in the alert notifications 202 and the alert data 203. Alternatively, the alert generator 201 may utilize both the pre-computed results database 1001 and the computation module 102 to generate the alert notifications 202 and the alert data 203. The alert generator 201 utilizes the computation module 103 if the attribute-valued strings satisfying the alert conditions for a specific user query is not found in the pre-computed results database 1001.

The alert generator 201 utilizes the knowledge of the computations in the computation module 102 by executing these computations to discover the maximally-valued results in real-time or executing these computations in advance to discover the maximally-valued results by searching the pre-computed results database 1001. Also, the Alert Generator 201 uses the valid attribute values known a priori and pre-stored in the valid attribute values database 206. As discussed herein, the computation module 102 represents (or implements) a computation as a mathematical function, F: $\{v_1, \ldots, v_k\} \rightarrow R$, where k is an integer greater than 1; $v_i$ is either an element of the finite set of distinct values of an attribute or $v_i$ is the special element *; $1<=i<=k$; and R is the set of real numbers. It is appreciated that this definition subsumes the knowledge utilized by the alert generator 201. Therefore, the alert generator 201 utilizes the knowledge of the relationships (or correspondences) between the strings and numbers that are defined by the computations of a querying application.

Alerting the User to Unseen MAXINT and MININT Results

Those skilled in the art will appreciate from the definitions of the alert conditions that the MAXINT and MININT conditions are the strongest of the six alert conditions. That is, the MAXINT and MININT conditions yield results that are maximally valued for the entire data, along the user's line of questioning. However, it is entirely possible that the user does not get to see some strings satisfying the MAXINT or MININT conditions because the user fails to issue a query which may lead to the discovery of these unseen strings. Accordingly, in a preferred embodiment of the present invention, the alert generator 201 alerts the user to the existence of these unseen strings at the end of his or her current session (i.e., before the user exits the querying application).

Figure 11:
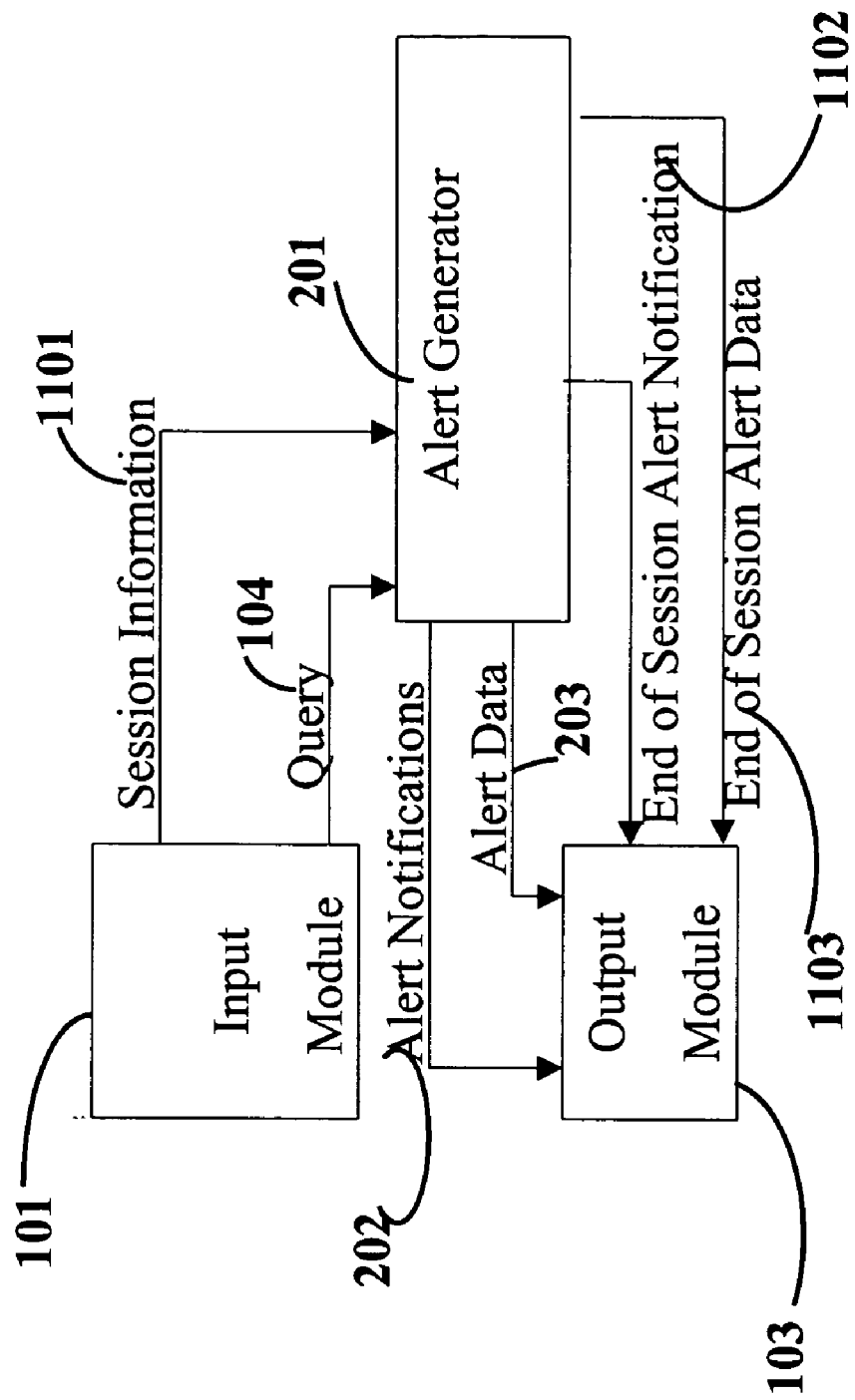
FIG. 11 describes a specific implementation showing how the user could be alerted to unseen MAXINT and MININT strings at the end of a session.

FIG. 11 illustrates the querying application of the present invention incorporating the "end-of-session" alert feature. It is appreciated that the "end-of-session" alert feature can be incorporated into the querying applications of FIGS. 2 and 10. For simplicity, elements shown in FIG. 11 corresponding to those shown in FIGS. 2 and 10 are denoted by the same reference numerals and their descriptions are omitted. The input module 101 now, in addition to the user query 104, also provides session information 1101 to the alert generator 201. The session information 1101 indicates the status of the user's interaction with the querying application (or simply, the status of the user's session). The session information 1101 consists of three Boolean fields (i.e., the content of the field is either "true" or "false"). The first field indicates whether a new session has started, the second field indicates whether the current session has ended, and the third field indicates whether the user has issued a query. It is appreciated that only one of the three fields may be set to "true" for any given time.

In addition to providing the alert notifications 202 and the alert data 203, the alert generator 201 provides an end-of-session alert notification 1102 to the output module 103. Preferably, the alert generator 201 also provides an end-of-session alert data 1103 to the output module 103. The end-of-session alert data 1103 consist of a field specifying the number of MAXINT alerts (or $N_{MAX}$) that have not been alerted to the user and another field specifying the number of MININT alerts (or $N_{MIN}$) that have not been alerted to the user. Preferably, the end-of-session alert data 1103 contains additional ($N_{MAX}+N_{MIN}$) fields identifying each MAXINT and MININT alert data (or attribute-valued string) that has not been alerted to the user. The alert generator 201 alerts the user via the output module 103 of strings satisfying the MAXINT or MININT criteria that have not been alerted to the user in the current session by setting the end-of-session alert notification 1102 to "true".

At the start of each new session, the alert generator 201 maintains a list of MAXINT and MININT strings provided (or alerted) to the user and a second list containing all MAXINT and MININT strings. It is appreciated that the list of alerted MAXINT and MININT strings can grow with each issuance of the user query. When the input module 101 notifies the alert generator 201 that the current session has ended, the alert generator 201 compares the list of alerted MAXINT and MININT strings with the list containing all MAXINT or MININT strings. If there is at least one MAXINT or MININT string that has not been alerted to the user, the alert generator 201 sets the end-of-session alert notification 1102 to "true," and outputs an appropriate end-of-session alert data 1103 to the output module 103. Alternatively, the alert generator 201 may alert the user of the unseen MAXINT and MININT strings during the session (i.e., presented with the user's query results) instead of waiting till the session is over.

Alerting the User to a Range of Greatest and Least Values

In another embodiment of the present invention, the querying application of the present invention can vary the number of alerts that are generated by the alert generator 201. For example, instead of alerting the user to only the strings that overlap the user's query and produce the greatest-valued and least-valued results, the alert generator 201 can also alert the user to the strings that produce the next greatest-valued and least-valued results; or the top five greatest-valued and bottom two least-valued results that overlap the user's query.

Optimizing the Alert Generation

In another embodiment of the present invention, the querying application of the present invention can optimize the manner in which the alert generator 201 generates the alerts to take advantage of the various relationship between the alerts. This is illustrated below for the case when the MAXINT and MININT conditions are applied. Similar relationships can be obtained for the case when the general MAXINT and general MININT conditions are applied.

The following relationships exist between the alerts when the MAXINT and MININT conditions are applied:

i) for the same string S and computation C, an LOQMAX alert always occurs (or exists) along with a MAXTRACE alert, and vice versa;

ii) for the same string S and computation C, a MAXINT alert cannot occur along with the LOQMAX and MAXTRACE alerts;

iii) for the same string S and computation C, an LOQMIN alert always occurs along with a MINTRACE alert, and vice versa; and iv) for the same string S and computation C, a MININT alert cannot occur along with the LOQMIN and MINTRACE alerts.

For each computation $C_i$ in C, the alert generator 201 first generates MAX alerts (e.g., LOQMAX, MAXINT and MAXTRACE) and then generates MIN alerts (e.g., LOQMIN, MININT and MINTRACE) for the string S and the computation $C_i$.

Figure 12:
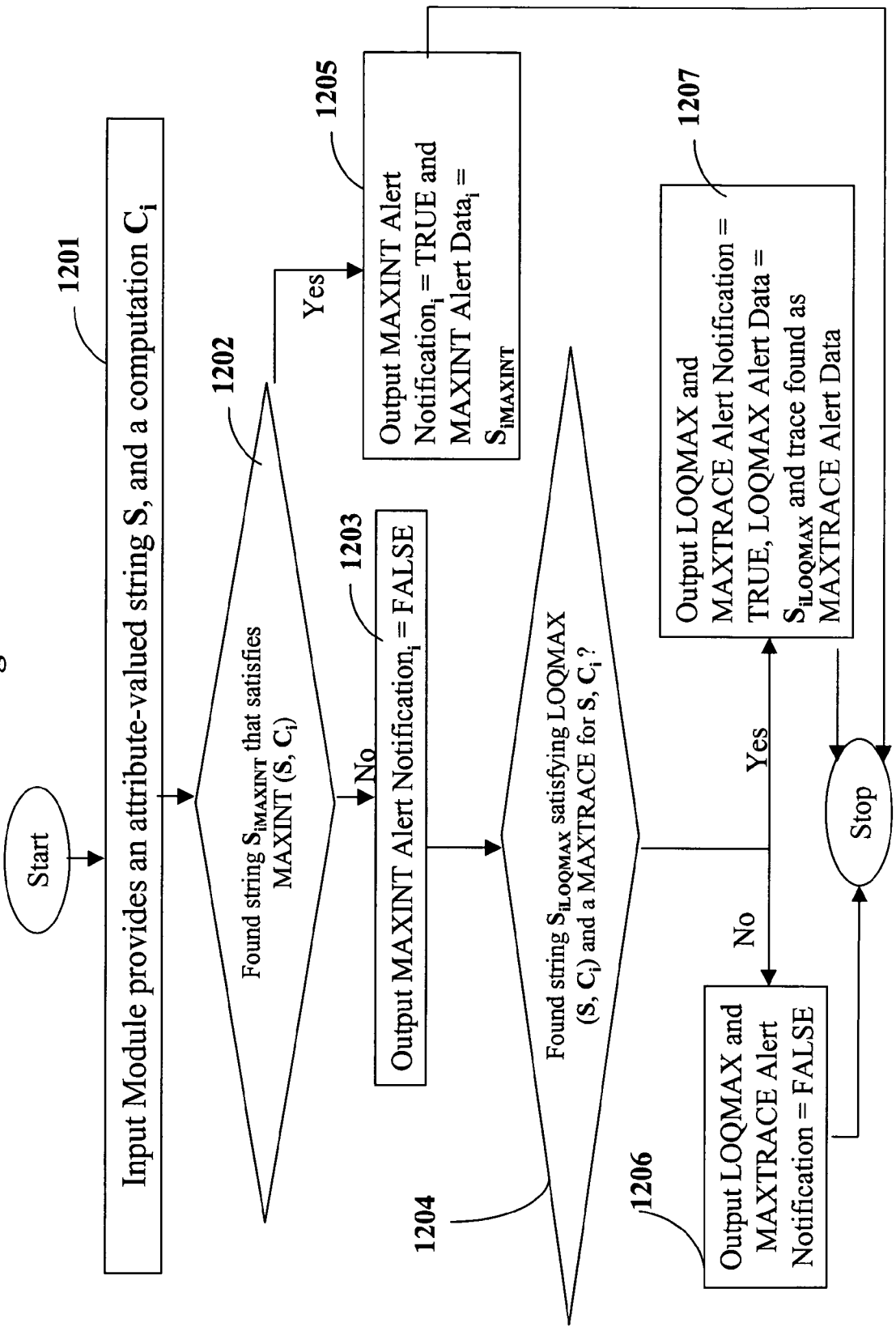
FIG. 12 displays the flowchart for generating MAXINT, LOQMAX and MAXTRACE alerts using the optimized operation of the alert generator.

The manner in which the alert generator generates the MAX alerts is described in conjunction with the flow chart of FIG. 12. The input module 101 provides the attribute-valued string S and the computation $C_i$ to the alert generator 201 at step 1201. The alert generator 201 first attempts to find a string $S_{iMAXINT}$ that satisfies the MAXINT condition for the string S and the computation $C_i$, utilizing the overlap rules and the tiebreak rules stored in the overlap rules database 204 and the tiebreak rules database 205, respectively, at step 1202. If the string $S_{iMAXINT}$ is found, the alert generator 201 sets the MAXINT alert notification for $C_i$ to "true," and outputs the string $S_{iMAXINT}$ as the MAXINT alert data for computation $C_i$ at step 1205.

However, if the string $S_{iMAXINT}$ is not found, the alert generator 201 sets the MAXINT alert notification for $C_i$ to "false" at step 1203. The alert generator 201 then attempts to find a string $S_{iLOQMAX}$ that satisfies the LOQMAX condition and the corresponding MAXTRACE for the string S and the computation $C_i$ at step 1204. If the string $S_{iLOQMAX}$ is found, the alert generator 201 sets the LOQMAX and MAXTRACE alert notifications for $C_i$ to "true," and outputs the string $S_{iLOQMAX}$ as the LOQMAX alert data and the MAXTRACE as the MAXTRACE alert data at step 1207. However, if the string $S_{iLOQMAX}$ is not found, the alert generator 201 sets the LOQMAX and MAXTRACE alert notifications to "false" at step 1206.

Figure 13:
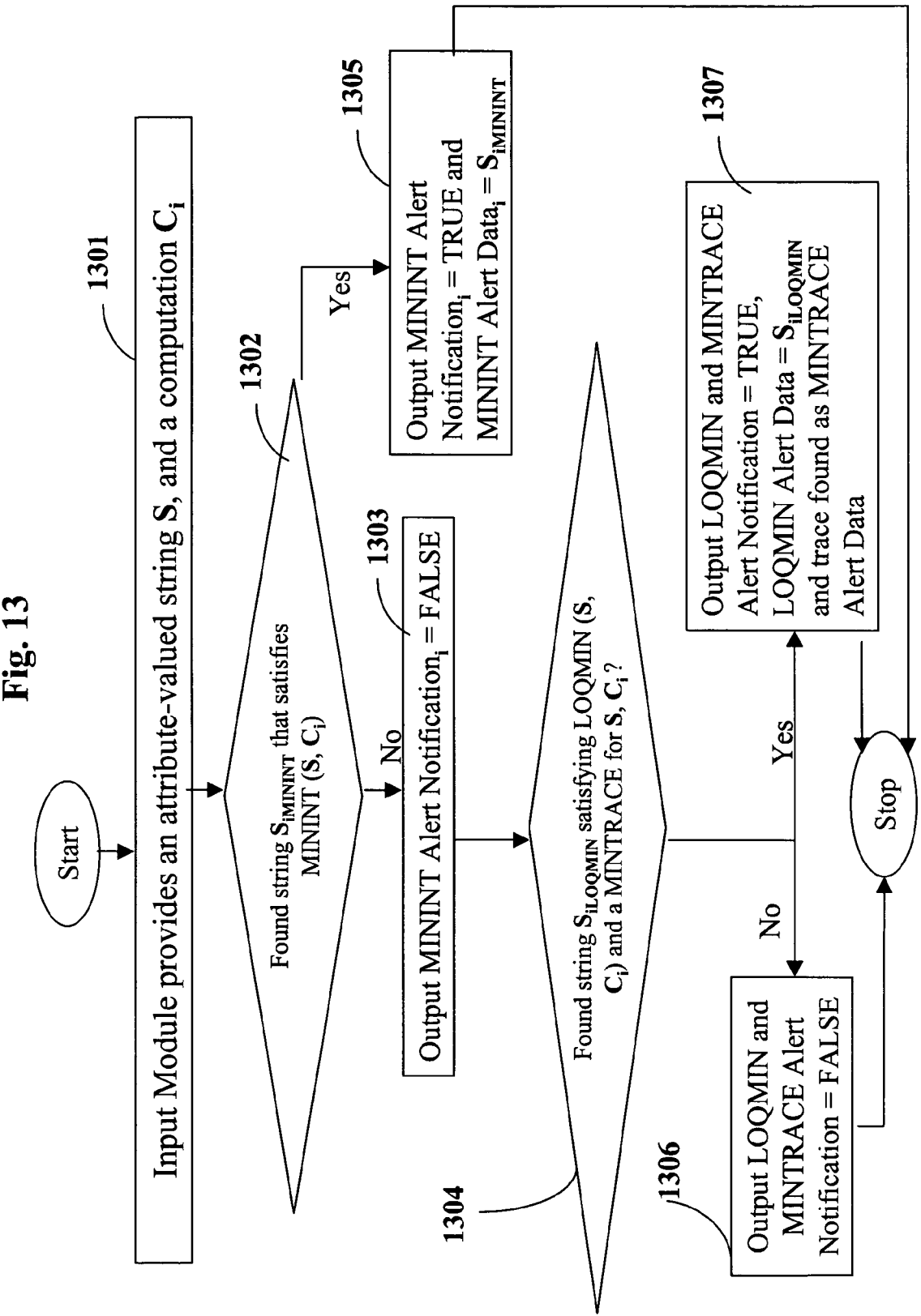
FIG. 13 displays the flowchart for generating MININT, LOQMIN and MINTRACE alerts using the optimized operation of the alert generator.

The manner in which the alert generator 201 generates MIN alerts is described in conjunction with the flow chart of FIG. 13. The input module 101 provides the attribute-valued string S and the computation $C_i$ to the alert generator 201 at step 1301. The alert generator 201 first attempts to find a string $S_{iMININT}$ that satisfies the MININT condition for the string S and the computation $C_i$, utilizing the overlap rules and the tiebreak rules stored in the overlap rules database 204 and the tiebreak rules database 205, respectively, at step 1302. If the string $S_{iMININT}$ is found, the alert generator 201 sets the MININT alert notification for $C_i$ to "true," and outputs the string $S_{iMININT}$ as the MININT alert data for computation $C_i$ at step 1305.

However, if the string $S_{iMININT}$ is not found, the alert generator 201 sets the MININT alert notification for $C_i$ to "false" at step 1303. The alert generator 201 then attempts to find a string $S_{iLOQMIN}$ that satisfies the LOQMIN condition and the corresponding MINTRACE for the string S and the computation $C_i$ at step 1304. If the string $S_{iLOQMIN}$ is found, the alert generator 201 sets the LOQMIN and MINTRACE alert notifications for $C_i$ to "true," and outputs the string $S_{iLOQMIN}$ as the LOQMIN alert data and the MINTRACE as the MINTRACE alert data at step 1307. However, if the string $S_{iLOQMIN}$ is not found, the alert generator 201 sets the LOQMIN and MINTRACE alert notifications to "false" at step 1306.

Graphical User Interface for Output Module

Figure 14:
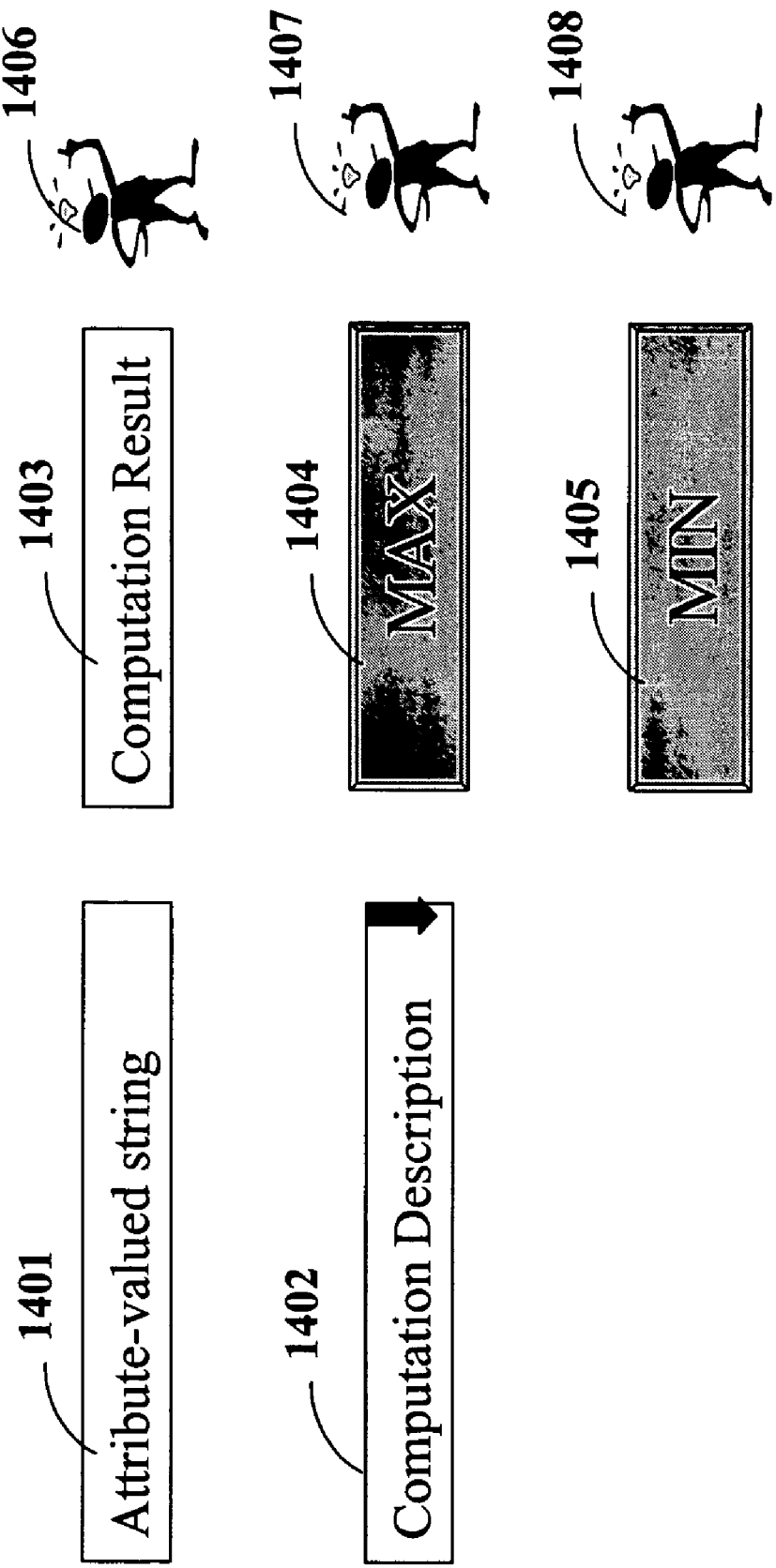
FIG. 14 describes a specific implementation of the output module, namely, a graphical user interface for displaying the alerts.

In another embodiment of the present invention, the input and output modules include user interfaces for displaying the alerts, as shown in FIG. 14. It is appreciated that the input and output modules fundamentally represent computer storage locations. Consequently, there are many ways of incorporating the user interfaces into the input and output modules, and FIG. 14 depicts one such possible incorporation or implementation for the case when the MAXINT and MININT conditions are applied. Similar interfaces can be obtained for the case when the general MAXINT and general MININT conditions are applied.

The input module 101 (FIG. 2) displays the attribute-valued string S contained in the user query in a text box 1401 and a list of computation descriptions for the user query in a drop-down list 1402. In the text box 1403, the output module 103 (FIG. 2) displays the results of the computation $C_i$ selected from the drop-down list 1402 by the user. That is, the output module 103 displays the computation result $C_i(S)$ in the text box 1403.

Preferably, the output module 103 provides the user with "clickable" buttons (i.e., a "MAX" button 1404 that provides the MAXTRACE when clicked and a "MIN" button 1405 that provides the MINTRACE when clicked) and "clickable" pictorial (image) alerts 1406 (if enabled, indicates that the user query is a MAXINT or MININT string) 1407 (when clicked, provides the MAXINT string at the end of a MAXTRACE) and 1408 (when clicked, provides the MININT string at the end of a MINTRACE) to easily access the alerts generated by the alert generator 201. Thus, when the alert generator 201 issues a MAXINT alert notification, the output module 103 determines if the MAXINT alert data is same as the attribute-valued string S in the user query (indicating that the user query is the maximally (or most) interesting string in the data). If it is determined that the MAXINT alert data is equivalent to the string S in the user query, the output module 103 activates the pictorial alert 1406 that indicates that a MAXINT or MININT string has been found, disables the "MAX" button 1404 and disables the pictorial alert 1407 that provides the MAXINT string at the end of the MAXTRACE, indicating that the user query is the maximally-valued query. In other words, no other query related to the user's query has a result that is greater than the result to the user query. Consequently, there is no need to trace to the MAXINT.

However, if it is determined that the MAXINT alert data is not equivalent to the string S in the user query, the output module 103 de-activates the pictorial alert 1406 (since the user query is not a MAXINT string), and enables or activates the "MAX" button 1404 and the pictorial alert 1407 (since it is possible to trace to a MAXINT string).

If the alert generator 201 does not issue any MAXINT alert notification, the alert generator 201 de-activates the pictorial alerts 1406 and 1407, and enables the "MAX" button 1404.

The output module 103 displays the details of the string $S_{iLOQMAX}$ satisfying the LOQMAX condition for (S, $C_i$) when the user clicks on the "MAX" button 1404. In other words, the user can issue a query for the string $S_{iLOQMAX}$ by simply using the "MAX" button feature. Also, the output module 103 displays the corresponding MAXTRACE for the string S.

The output module 103 displays the computation result $C_i(S_{iMAXINT})$ for the maximally valued string $S_{iMAXINT}$ satisfying the MAXINT condition for (S, $C_i$) when the user clicks on either pictorial alert 1406 or 1407. In addition, the output module 103 presents the computation results of the maximally valued string $S_{iMAXINT}$ along with the attribute-valued string S in the user query, thereby advantageously allowing the user to examine both strings together and, hence, to appreciate the relevance of the maximally-valued string to his query.

When the alert generator 201 issues a MININT alert notification, the output module 103 determines if the MININT alert data is the same as the attribute-valued string S in the user query (indicating that the user query is the most interesting string in the data). If it is determined that MININT alert data is equivalent to the string S in the user query, the output module 103 activates the pictorial alert 1406, and disables the "MIN" button 1405 and the pictorial alert 1408. However, if it is determined that the MININT alert data is not equivalent to the string S in the user query, the output module 103 de-activates the pictorial alert 1406, enables or activates the "MIN" button 1405 and the pictorial alert 1408.

If the alert generator 201 does not issue any MININT alert notification, the alert generator de-activates the pictorial alerts 1406 and 1408, and enables the "MIN" button 1405.

The output module 103 displays the details of the string $S_{iLOQMIN}$ satisfying the LOQMIN condition for (S, $C_i$) when the user clicks on the "MIN" button 1405. In other words, the user can issue a query for the string $S_{iLOQMIN}$ by simply using the "MIN" button feature. Also, the output module 103 displays the corresponding MINTRACE for the string S.

The output module 103 displays the computation result $C_i(S_{iMININT})$ for the minimally valued string $S_{iMININT}$ satisfying the MININT condition for (S, $C_i$) when the user clicks on either pictorial alert 1406 or 1408. In addition, the output module 103 presents the computation results of the minimally valued string $S_{iMININT}$ and the attribute-valued string S in the user query, thereby advantageously allowing the user to examine both strings together and, hence, to appreciate the relevance of the minimally-valued string to his query.

Computations and User Interface for Different Applications

In another embodiment, the querying application of the present invention can be used to query and obtain information about maximally valued strings in various kinds of data, including sports data. The graphical user interfaces specifically incorporated in the input and output modules to handle sports data are described herein. Also, certain computations designed specifically to process various sports data are described herein.

Soccer Application

The querying application of the present invention can provide professional or amateur soccer players, coaching personnel, fans and the like with the means to ask questions and obtain insightful information about soccer games. Accordingly, a logical model of the data collected for the soccer games (hereinafter referred to as the soccer data) is generated by treating the soccer data as a collection of touches and possessions and specifying attributes to describe these touches and possessions.

A possession is defined as the activity occurring on the field between the time that a particular team gets the ball to the time that it loses the ball to the other team. Thus, the entire game is divided into a set of possessions, with one of the two teams controlling the ball during a possession.

The attributes and their values for the various touches may include: "team-1-name" being the name of team 1; "team-2-name" being the name of team 2; "location-of-game" being the site of the soccer game; "match-score" having values such as 0-0, 0-1, 1-0, 2-0, 2-2, etc.; "player-who-has-ball" being the name of the player who has the ball; "game-period" having values such as first-half, second-half or overtime; "team-ahead" being the name of the team that is currently leading (or winning) in the game; "team-ahead-by" having values such as 1, 2, etc.; "how-player-receives-ball" having values such as pass, interception, steal, free-kick, throw-in, corner-kick, goal-kick, etc.; "first-touch-with" having values such as left-foot, right-foot, head, chest, etc.; "location-ball-received-vertical" having values such as defensive-zone, defensive-midfield, attacking-midfield or attacking-zone; "location-ball-received-horizontal" having values such as right, middle or left; "location-ball-given-up-vertical" having values such as defensive-zone, defensive-midfield, attacking-midfield or attacking-zone; "location-ball-given-up-horizontal" having values such as right, middle or left; "total-number-of-dribbles-with-left-foot" having values such as 0, 1, 2, etc.; "total-number-of-dribbles-with-right-foot" having values such as 0, 1, 2, etc.; "total-number-of-defenders-tackled" having values such as 0, 1, 2, etc.; "last-touch-with" having values such as left-foot, right-foot, head, chest, etc.; "touch-outcome" having values such as ball-turned-over-to-opponent, ball-passed-to-teammate, goal attempted, goal scored, etc.; "pass-intended-for" being the name of the player receiving the pass; "scoring-opportunity-created" having a yes or no value; and so on.

The attributes and their values for possessions may include: "team-1-name" being the name of team 1; "team-2-name" being the name of team 2; "location-of-game" being the site of the soccer game; "match-score" having values such as 0-0, 0-1, 1-0, 2-0, 2-2, etc.; "players-who-touched-ball-at-least-once-in-possession" being the names of the players who touched the ball at least once in the possession; "game-period" having values such as first-half, second-half or overtime; "goal-difference" indicating whether the team is currently ahead, behind or tied in the game; "team-ahead-by" having values such as 1, 2, etc.; "how-team-began-possession" having values such as pass, interception, steal, free-kick, throw-in, corner-kick, goal-kick, etc.; "player-who-began-possession" being the name of the player that began the possession; "location-posses-sion-began-vertical" having values such as defensive-zone, defensive-midfield, attacking-midfield or attacking-zone; "location-possession-began-horizontal" having values such as right, middle or left; "location-possession-ended-vertical" having values such as defensive-zone, defensive-midfield, attacking-midfield or attacking-zone; "location-possession-ended-horizontal" having values such as right, middle or left; "touches-by-team" having values such as 1–2, 3–6, or 7+; "dribbles-by-team" having values such as 0, 1–4, or 5+; "passes-by-team" having values such as 0–1, 2–5, or 6+; "pass-back-by-team" having a yes or no value; "total-number-of-defenders-tackled-in-possession" having values such as 0, 1, 2, etc.; "last-touch-by" being the name of the player that touched the ball last in the possession; "possession-outcome" having values such as ball-turned-over-to-opponent, team-retained-possession, goal attempted, goal scored, etc.; "scoring-opportunity-created" having a yes or no value; and so on.

Various computations now must be defined to enable the computation module 102 to efficiently process the soccer data using the soccer-specific attributes defined herein. Computations specifically designed for the soccer application may include: "number-of-touches", "number-of-touches-where-ball-turned-over", "number-of-touches-where-scoring-opportunity-created", "percentage-of-touches-where-ball-turned-over", "percentage-of-touches-where-scoring-opportunity-created", "number-of-touches-where-pass-completed", "number-of-touches-where-pass-attempted", "percentage-of-touches-where-pass-completed", "number-of-possessions", "number-of-possessions-where-ball-turned-over", "number-of-possessions-where-scoring-opportunities-created", "percentage-of-possessions-where-ball-turned-over", "percentage-of-possessions-where-scoring-opportunity-created", "average-yards-gained-in-possession (average of the difference between the yards gained on offense and the yards given up in counter attack), standard-soccer-performance-metrics for players and the team (e.g., "number-of-goals-scored", "number-of-fouls-committed", "number-of-assists", etc.), and the like.

Figure 15:
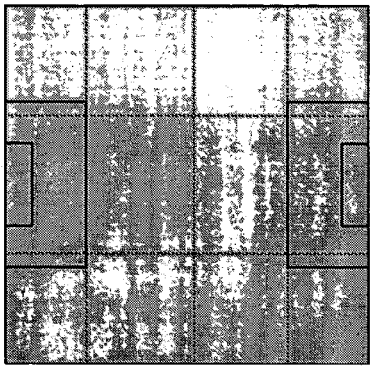
FIG. 15 describes a specific implementation of the input module, for use in a soccer data querying application utilizing an alert generator and a computation module, in accordance with the present invention.

The users are now able to use the querying application of the present invention to find hidden patterns in the soccer data by employing various soccer-specific computations defined herein. For example, a user can issue a query to determine the percentage of possessions that led to scoring opportunities when Player 1 began the possession after an interception. For such a percentage-of-possessions-where-scoring-opportunity-created query, the user can use the graphical user interfaces of the input module 101, as shown in FIG. 15, to select the computation percentage-of-possessions-where-scoring-opportunity-created, and the values player 1 for the attribute player-who-began-possession, interception for the attribute how-team-began-possession. The input module 101 then translates the user's selection into the following query (computation=percentage-of-possessions-where-scoring-opportunity-created, player-who-began-possession=Player 1, how-team-began-possession=interception) and provides the user query to the computation module 102 (FIG. 2) for computation.

The computation module 102 (FIG. 2) computes a result such as 25% (9 scoring opportunities created out of 36 possessions) for the user query based on the soccer data. As indicated herein, since the input module 101 also provides the user query to the alert generator 201 (FIG. 2), the user is alerted to a set of circumstances related to the user query having the greatest-valued and/or least-valued results for the computation percentage-of-possessions-where-scoring-opportunity-created. In other words, the querying application of the present invention alerts the user to related scenarios where the team had most (greatest-valued result) and/or least (least-valued result) scoring opportunities, thereby providing the user with a better understanding of team's performance. For example, the user would be alerted to the result of the following related query:

i) Least-valued result: 5.5% (1 scoring opportunity created out of 18 possessions) for the modified query (computation=percentage-of-possessions-where-scoring-opportunity-created, player-who-began-possession=Player 1, how-team-began-possession=interception, touches-by-team=3–6, players-who-touched-ball-at-least-once-in-possession=player 1, player 5, player 8, player 9).

Figure 16:
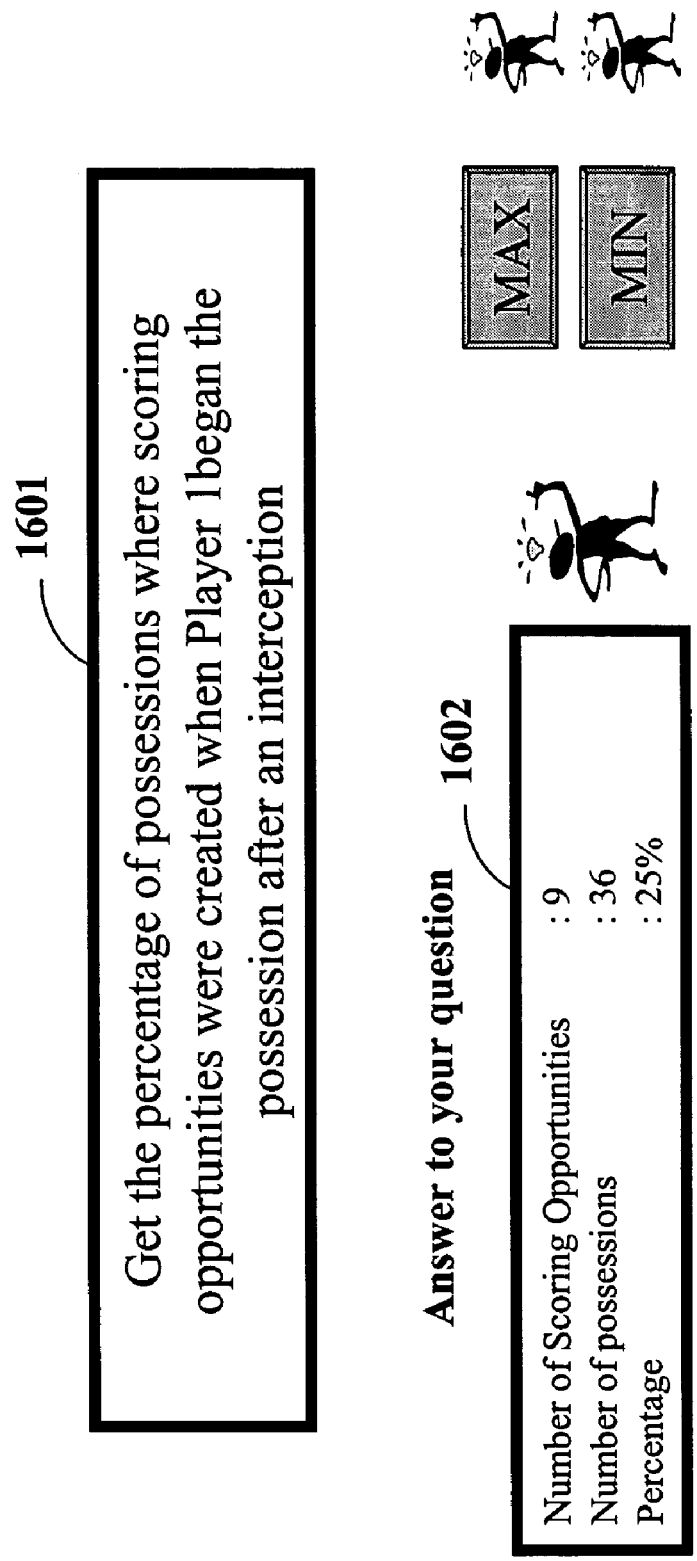
FIG. 16 describes a specific implementation of the output module, for use in a soccer data querying application utilizing an alert generator and a computation module, in accordance with the present invention.

In an embodiment of the present invention, the output module 103 may incorporate the graphical user interfaces, as shown in FIG. 16, for the soccer application. The output module 103 displays the query in a textual form in a text box 1601, and computation result in text box 1602. For each computation, the output module 103 alerts the user to the hidden patterns in the soccer data using the "clickable" MAX and MIN buttons and "clickable" pictorial alerts as discussed herein with FIG. 14.

Tennis Application

The query application of the present invention can provide professional or amateur tennis players, coaching personnel, fans and the like with the means to ask questions and obtain insightful information about the game of tennis. Accordingly, a logical model of the data collected for tennis games (hereinafter referred to as the tennis data) is generated by treating the tennis data as a collection of shots and specifying attributes to describe these various shots.

The attributes and their values for the various shots may include: "player-1-name" being the name of player 1; "player-2-name" being the name of player 2; "location-of-game" being the site of the match; "set-number" having values such as 1, 2, 3, 4 or 5; "game-number-in-set" having values such as 1, 2, 3, 4, 5, 6, etc.; "match-score" having values such as 0-0, 1-0, 0-1, 2-0, 0-2, 1-1, 1-2, 1-3, 2-2, etc.; "set-score" having values such as 0-0, 1-0, 3-2, 5-5, etc.; "game-score" having values such as 0-0, 15-0, 30-30, 40-15, etc.; "server" being the name of the player who is serving in the point; "serve-from" having a left-side or right-side value; "serve-number" having a 1 or 2 value; "breaks" having values such as up, down or even; "number-of-breaks-up" having values such as 0, 1 or 2; "number-of-shots-in point" having values such as 1, 2, 5, 18, etc.; "horizontal-location-of-player-1" having values such as left, center, or right; "horizontal-location-of-player-2" having values such as left, center right; "vertical-location-of-player-1" having values such as behind-baseline, between-baseline-and-serveline, or at-the-net; "vertical-location-of-player-2" having values such as behind-baseline, between-baseline-and-serveline, or at-the-net; "vertical-motion-player-1" having values such as forward, backward, or no-motion; "vertical-motion-player-2" having values such as forward, backward, or no-motion; "horizontal-motion-player-1" having values such as left, right, or no-motion; "horizontal-motion-player-2" having values like left, right, or no-motion; "no-of-shots-in-point" having values such as 1–3 shots, 3–8 shots, Over 8 shots; "type-of-shot" having values such as ground-stroke, overhead, slice, lob, drop shot, serve, etc.; "forehand-backhand" having a forehand or backhand value; "who-won-point" being the name of the player who won the point; and so on.

Various computations now must be defined to enable the computation module 102 (FIG. 2) to efficiently process the tennis data using the tennis-specific attributes defined herein. Computations specially designed for the tennis application may include: "number-of-winners", "number-of-unforced-errors", "number-of-shots", "percentage-of-winners", "percentage-of-unforced-errors", "number-of-winning-shots", "number-of-losing-shots", "percentage-of-winning-shots", "percentage-of-losing-shots", "difference-in-contributions-to-points-won-and-lost" (assumed that each shot in a point contributes equally to the outcome of the point).

Figure 17:
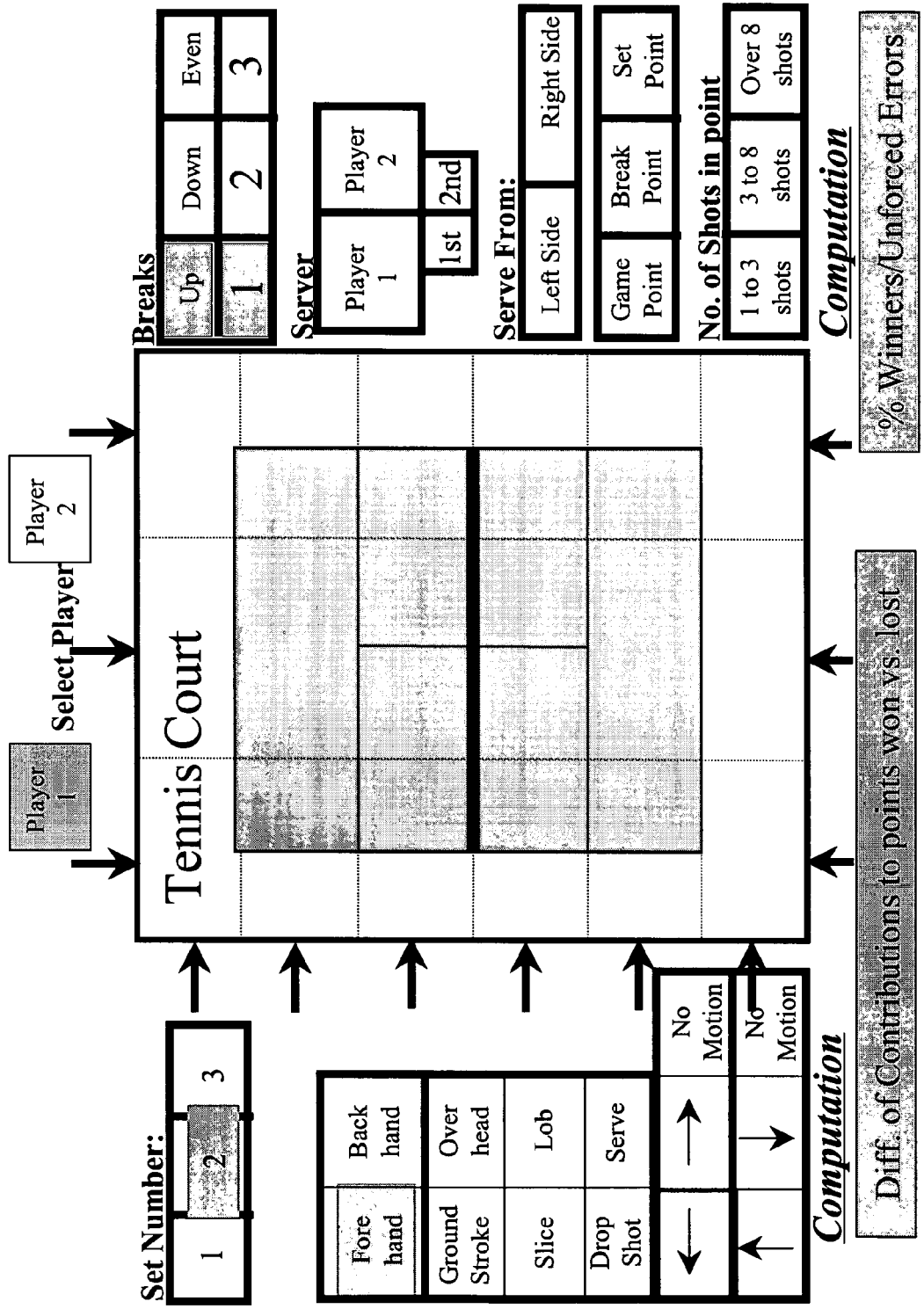
FIG. 17 describes a specific implementation of the input module, for use in a tennis data querying application utilizing an alert generator and a computation module, in accordance with the present invention.

The users are now able to use the querying application of the present invention to find hidden patterns in the tennis data by employing various tennis-specific computations defined herein. For example, a user can issue a query to determine how player 1 performed against player 2 while hitting forehand shots in the second set when player 1 was up 1 break. For such a performance query, the user can use the graphical user interfaces of the input module 101, as shown in FIG. 17, to select the computation difference-in-contributions-to-points-won-and-lost, and values player 1 for the attribute player-1-name, forehand for the attribute forehand-backhand, 2 for the attribute set-number, up for the attribute breaks, 1 for the attribute number-of-breaks-up. The input module 101 (FIG. 2) then translates the user's selection into the following query (computation=difference-in-contributions-to-points-won-and-lost, player-1-name=player 1, forehand-backhand=forehand, set-number=2, breaks=up, number-of-breaks-up=1) and provides the user query to the computation module 102 (FIG. 2) for computation.

The computation module 102 (FIG. 2) computes a result, such as −7.9 (contributions to points won=11.0 and contributions to point lost=18.9) for the user query based on the tennis data. As indicated herein, since the input module 101 also provides the user query to the alert generator 201 (FIG. 2), the user is alerted to a set of circumstances related to the user query having the greatest-valued and/or least-valued result for the computation difference-in-contributions-to-points-won-and-lost and. In other words, the querying application of the present invention alerts the user to related scenarios where player 1 had the best (greatest-valued) and/or worst (least-valued) performance, thereby providing the user with a better understanding of player 1's performance. For example, the user may be alerted to the result of the following query:

i) Least-valued result: −14.6 (contributions to points won=21.0 and contributions to point lost=35.6) for the modified query (computation=difference-in-contributions-to-points-won-and-lost, player-1-name=player 1, set-number=2).

In an embodiment of the present invention, the output module 103 may incorporate the graphical user interfaces, as shown in FIG. 18, for the tennis application. The output module 103 displays the query in a textual form in a text box 1801, and computation results in text box 1802. The output module 103 alerts the user to the hidden patterns in the tennis data using the "clickable" MAX and MIN buttons and "clickable" pictorial alerts as discussed herein with FIG. 14.

Golf Application

The querying application of the present invention can provide professional or amateur golfers, coaching personnel, fans, and the like with the means to ask questions and obtain insightful information about golf games. Accordingly, a logical model of the data collected for golf games (hereinafter referred to as the golf data) is generated by treating the golf data as a collection of shots on different holes on various golf courses and specifying attributes to describe these various shots and holes.

The attributes and their values for the various shots may include: "type-of-shot" having values such as putts, chips, drives, shots-from-fringe, long-iron-shots, etc.; "club-selection" having values such as driver, woods, long irons, short irons, pitching wedge, putter, etc.; "distance-from-hole" having values such as 5–10 feet, 20–25 feet, 100–150 yards, 300–350 yards, etc.; "location-of-shot" having values such as green, light rough, heavy rough, fringe, tee, fairway, etc.; "location-of-pin-horizontal" having values such as left, right, or center; "location-of-pin-vertical" having values such as top, bottom, or middle; "quality-of-previous-shot" having values such as good, moderate, or bad; "previous-hole-performance" having values such as eagle, birdie, par, bogie, double-bogie, etc.; "club-off-tee" having values such as driver, long iron, short iron, pitching wedge, etc.; and so on.

The attributes and their values for the various holes on a course may include: "par" having values such as 3, 4, or 5; "length-of-hole" having values such as 148 yards, 208 yards, 409 yards, etc.; "dog-leg-in-hole" having a yes or no value; "width-of-fairway" having a narrow or wide value; "side-of-hole-with-trouble" having values such as left, right, or both; "number-of-bunkers-around-green" having values such as 0, 1, 2, etc.; "speed-of-green" having values such as 9, 10, 11, 12, etc.; "number-of-bunkers-around-green" having values such as 0, 1, 2, etc.; "number-of-fairway-bunkers" having values such as 0, 1, 2, etc.; "tiered-green" having a yes or no value; "side-with-out-of-bounds" having values such as left, right, both, or none; "elevated-tee" having a yes or no value; "elevated-green" having a yes or no value; "size-of-green" having values such as small, medium, large, etc.; "type-of-grass" having a value such as rye, bent, Bermuda, etc.; and so on.

Various computations now must be defined to enable the computation module 102 (FIG. 2) to efficiently process the golf data using the golf-specific attributes defined herein. Computations specifically designed for the golf application may include: "number-of-shots-made", "number-of-shots-attempted", "percentage-of-shots-made", "average-score-for-one-round-of-golf", "quality-of-shot", "location-of-next-shot", "lie-of-next-shot" (this determines the quality of the current shot), standard-golf-performance-metrics for players (e.g., putting average, driving distance, par breakers, birdie average, driving accuracy percentage, scoring average, putts/round, greens in regulation, sand save percentage, scrambling, etc.), and the like.

The users are now able to use the querying application of the present invention to find hidden patterns in the golf data by employing various golf-specific computations defined herein. For example, a user can issue a query to determine a particular player's putting performance in the first round of a specific tournament when the player was 5–10 feet away from the pin and the speed of the green was 10. For such putting performance query, the user can select the computation percentage-of-shots-made, and values 5–10 feet for the attribute distance-from-hole, putts for the attribute type-of-shot and 10 for the attribute speed-of-green. The input module 101 (FIG. 2) then translates the user's selection into the following query (computation=percentage-of-shots-made, distance-from-hole=5–10 feet, type-of-shot=putts, speed-of-green=10) and provides the user query to the computation module 102 (FIG. 2) for computation.

The computation module 102 (FIG. 2) computes a result, such as 50% (4 shots made out of 8 shots attempted) for the user query based on the golf data. As indicated herein, since the input module 101 also provides the user query to the alert generator 201 (FIG. 2), the user is alerted to a set of circumstances related to the user query having the greatest-valued and/or least-valued result for the computation percentage-of-shots-made. In other words, the querying application of the present invention alerts the user to related scenarios where the player had the best (greatest-valued result) and/or worst (least-valued result) putting performance, thereby providing the user with a better understanding of the player's putting performance. For example, the user may be alerted to the results of the following related queries:

i) Least-valued result: 0% (0 shots out of 4 shots attempted) for the modified query (computation=percentage-of-shots-made, distance-from-hole=5–10 feet, type-of-shot=putts, speed-of-green=10, previous-hole-performance=par, club-off-tee=driver); and ii) Greatest-valued result: 100% (4 shots out of 4 shots attempted) for the modified query (computation=percentage-of-shots-made, distance-from-hole=5–10 feet, type-of-shot=putts, speed-of-green=10, tiered-green=no, location-of-pin-horizontal=right).

Basketball Application

The querying application of the present invention can provide professional or amateur basketball players, coaching personnel, fans, and the like with the means to ask questions and obtain insightful information about basketball games. Accordingly, a logical model of the data collected for basketball games (hereinafter referred to as the basketball data) is generated by treating the basketball data as a collection of possessions and specifying attributes to describe these various possessions. A possession for a particular team (i.e., team 1) is defined from the time team 1 gets the ball to the time that team 1 loses the ball to team 2.

The attributes and their values for various possessions may include: "home-team-name" being the name of home team or team 1; "away-team-name" being the name of the visiting team or team 2; "location-of-game" being the site of the game; "team-1-point-guard" being the name of the player playing the point guard position for team 1; "team-1-shooting-guard" being the name of the player playing the shooting guard position for team 1; "team-1-small-forward" being the name of the player playing the small forward position for team 1; "team-1-power-forward" being the name of the player playing the power forward position for team 1; "team-1-center" being the name of the player playing the center position for team 1; "team-2-point-guard" being the name of the player playing the point guard position for team 2; "team-2-shooting-guard" being the name of the player playing the shooting guard position for team 2; "team-2-small-forward" being the name of the player playing the small forward position for team 2; "team-2-power-forward" being the name of the player playing the power forward position for team 2; "team-2-center" being the name of the player playing the center position for team 2; "possession-team" being the name of the team having the possession of the ball; "how-possession-got" having values such as after-basket, opponent-turnover, offensive-rebound, defensive rebound, opponent-fouled, etc.; "team-leading" being the name of the team currently leading the game; "period-of game" having values such as first-quarter, second-quarter, third-quarter, fourth-quarter, first overtime, second overtime, etc.; "time-left-in-quarter" having values such as 04:03 minutes, 02:12 minutes, etc.; "field-goal-attempt" having a yes or no value; "field-goal-attempt-by" being the name of the player attempting the field goal; "type-of-shot" having a 2-pointer or 3-pointer value; "type-of-field-goal-attempt" having values such as lay-up, jump-shot, running-lay-up, etc.; "field-goal-outcome" having values such as made, missed or fouled; "assist" having a yes or no value; "assist-by" being the name of the player who assisted the field goal; "rebound" having a yes or no value; "rebound-by" being the name of the player who rebounded the missed field goal attempt; "turnover" having a yes or no value; "turnover-by" being the name of the player who turned the ball over; "steal" having a yes or no value; "steal-by" being the name of the player who stole the ball; "free-throws" having a yes or no value; "free-throws-by" being the name of the player who attempted the free throws; "point-scored-in-possession" having values such as 0, 1, 2, 3, 4, etc.; and so on.

Various computations now must be defined to enable the computation module 102 (FIG. 2) to efficiently process the basketball data using the basketball-specific attributes defined herein. Computations specifically designed for the basketball application may include: "number-of-shots-made", "number-of-shots-attempted", "percentage-of-shots-made", "points-plus-minus" (the difference between the points scored by the two teams), "rebounding-plus-minus" (the difference between the rebounds collected by the two teams), standard-basketball-performance-metrics for players (e.g., number-of-minutes-played, number-of-offensive-rebounds, number-of-defensive-rebounds, total-number-of-rebounds, number-of-steals, number-of-turnovers, number-of assists, number-of-free-throw-attempts, number-of-free-throw-made, free-throw-shooting-percentage, etc.), and the like.

The users are now able to use the querying application of the present invention to find hidden patterns in the basketball data by employing various basketball-specific computations defined herein. For example, a user can issue a query to determine how team 1 with player 1 as the shooting guard performed against team 2 at home in the fourth quarter. For such a team performance query, the user can select the computation points-plus-minus, and values team 1 for the attribute home-team-name, team 2 for the attribute away-team-name, fourth quarter for the attribute period-of-game and player 1 for the attribute team-1-shooting-guard. The input module 101 then translates the user's selection into the following query (computation=points-plus-minus, home-team-name=team 1, away-team-name=team 2, period-of game=fourth-quarter, team-1-shooting-guard=player 1) and provides the user query to the computation module 102 (FIG. 2) for computation.

The computation module 102 (FIG. 2) computes a result, such as −1 (team 1 scored 21 points and team 2 scored 22 points) for the user query based on the basketball data. As indicated herein, since the input module 101 also provides the user query to the alert generator 201 (FIG. 2), the user is alerted to a set of circumstances related to the user query having the greatest-valued and/or least-valued result for the computation points-plus-minus. In other words, the querying application of the present invention alerts the user to related scenarios where team 1 had the best (greatest-valued result) and/or worst (least-valued result) point plus minus, thereby providing the user with a better understanding of the team's performance. For example, the user may be alerted to the results of the following related queries:

i) Least-valued result: −9 (team 1 scored 9 points and team 2 scored 18 points) for the modified query (computation=points-plus-minus, home-team-name=team 1, away-team-name=team 2, period-of game=fourth-quarter, team-1-shooting-guard=player 1, team-1-point-guard=player 2); and ii) Greatest-valued result: +8 (team 1 scored 12 points and team 2 scored 4 points) for the modified query (computation=points-plus-minus, home-team-name=team 1, away-team-name=team 2, period-of game=fourth-quarter, team-1-small-forward.=player 1).

Baseball Application

The querying application of the present invention can provide professional or amateur baseball players, coaching personnel, fans, and the like with the means to ask questions and obtain insightful information about baseball games. Accordingly, a logical model of the data collected for the baseball games (hereinafter referred to as the baseball data) is generated by treating the baseball data as a collection of pitches and specifying attributes to describe these various pitches.

The attributes and their values for the various pitches may include: "team-1-name" being the name of team 1; "team-2-name" being the name of team 2; "location-of-game" being the site of the match; "side-batting" being the name of the team that is batting; "team-ahead" being the name of the team that is currently leading the game; "pitcher-name" being the name of the player pitching, i.e., the pitcher; "batter-name" being the name of the player batting during this pitch; "game-score" having values such as 0-0, 1-0, 0-1, 2-0, 0-2, 1-1, 1-2, 1-3, 2-2, 7-3, etc.; innings having values such as 1, 2, 3, 8, 9, etc.; "pitching-side" having a left-handed or right-handed value; "batter-side" having a left-handed or right-handed value; "number-of-outs" having values such as 0, 1, 2 or 3; "number-of-strikes" having values such as 0, 1, 2 or 3; "number-of-balls" having values such as 0, 1, 2, 3, or 4; "pitcher-count" having values such as ahead, even, or behind; "pitch-speed" having values such as 85 miles per hour, 89 miles per hour, 93 miles per hour, etc.; "pitch-type" having values such as fastball, curveball, slider, changeup, etc.; "pitch-location-height" having values such as low, middle, or high; "pitch-location-inside-outside" having values such as inside, middle, or outside; "pitch-in-strike-zone" having a yes or no value; "runners-on-base" having a yes or no value; "runners-on-scoring-position" having a yes or no value; "previous-pitch-type" having values such as fastball, curveball, slider, changeup, etc.; "previous-pitch-location-height" having values such as low, middle, or high; "previous-pitch-location-inside-outside" having values such as inside, middle, or outside; "previous-pitch-in-strike-zone" having a yes or no value; "impact-of-pitch" having values such as positive, negative, or neutral; "pitch-outcome" having values such as strike, ball, hit or fouled; and so on.

Various computations now must be defined to enable the computation module 102 (FIG. 2) to efficiently process the baseball data using the baseball-specific attributes defined herein. Computations specifically designed for the baseball application may include: "number-of-pitches", "number-of-strikes", "number-of-balls", "number-of-hits", "percentage-of-strikes", "percentage-of-balls", "percentage-of-hits", "impact-of-pitch", "type-of-pitch", standard-baseball-performance-metrics for batters (e.g., runs, hits, runs batted in, walks, strikeouts, stolen bases, home runs, etc.), standard-baseball-performance-metrics for pitchers (e.g., innings pitched, runs, earned runs, walks, strikeouts, home runs allowed, pitches, ground balls/fly balls ratio, strikes/pitches ratio, etc.) and standard-baseball-performance-metrics for the team (e.g., runs scored, runs allowed, hits, hits allowed, errors, base runners left on bases, double plays made, number of pitchers used in the game, etc.), and the like.

The users are now able to use the query application of the present invention to find hidden patterns in the baseball data by employing various baseball-specific computations defined herein. For example, a user can issue a query to determine the different types of pitches that pitcher 1 throws when he is behind in the count while his team is leading. For such pitching query, the user can select the computation type-of-pitch and values pitcher 1 for the attribute pitcher-name, behind for the attribute pitcher-count, and team 1 for the attribute team-ahead. The input module 101 (FIG. 2) then translates the user's selection into the following query (computation=type-of-pitch, pitcher-name=pitcher 1, pitcher-count=behind, team-ahead=team 1) and provides the user query to the computation module for computation.

The computation module 102 (FIG. 2) computes a result, such as a set of numbers (one for each type of pitch that the pitcher 1 has thrown): fastballs-75% (60 fastballs out of a total of 80 pitches), curveballs—10% (8 out of 80), sliders—5% (4 out of 80) and changeups—10% (8 out of 80) for the user query based on the baseball data. As indicated herein, since the input module 101 also provides the user query to the alert generator 201 (FIG. 2), the user is alerted to a set of circumstances related to the user query having the greatest-valued and/or least-valued result for the computation type-of-pitch. In other words, the querying application of the present invention alerts the user to related scenarios where the pitcher 1 has relied more (greatest-valued result) and/or less (least-valued result) on different types of pitches, thereby providing the user with a better understanding of the pitcher's pitching performance, i.e., pitch selection. For example, the user may be alerted to the result of the following related query:

i) Greatest-valued result: fastballs—89% (8 out of 9) and changeup—11% (1 out of 9) for the modified query (computation=type-of-pitch, pitcher-name=pitcher 1, pitcher-count=behind, team-ahead=team 1, runners-on-base=yes, number-of-strikes=1).

Football Application

The querying application of the present invention can provide professional or amateur football players, coaching personnel, fans, and the like with the means to ask questions and to obtain insightful information about football games. Accordingly, a logical model of the data collected for football games (hereinafter referred to as football data) is generated by treating the football data as a collection of plays and specifying attributes to describe these various plays.

The attributes and their values for the various plays may include: "team-1-name" being the name of team 1; "team-2-name" being the name of-team 2; "location-of-game" being the site of the match; "day-of-week" having values such as sunday, monday, etc.; "type-of-surface" having values such as grass, turf, etc.; "game-period" having values such as first-quarter, second-quarter, third-quarter, fourth-quarter or overtime; "side-with-possession" being the name of the team having possession of the ball for a particular play; "game-score" having values such as 0-3, 14-7, 21-3, 21-14, etc.; "team-ahead" being the name of the team that is currently leading in the game; "team-ahead-by" having values such as 3, 7, 10, etc.; "quarterback-name" being the name of the quarterback; "running-back-name" being the name of the running back for this game; "down" having values such as 1, 2, 3, or 4; "yards-to-go-for-first-down" having values such as 3, 8, 11, 18, etc.; "yards-to-go-to-red-zone" having values such as 19, 25, 87, etc.; "yards-to-go-for-touch-down" having values such as 19, 25, 87, etc.; "in-red-zone" having a yes or no value; "type-of-formation" having values such as 3 receivers, 2 receivers, I-formation, etc.; "shotgun" having a yes or no value; "play-type" having values such as pass or rush; "ball-carrier" being the name of the player carrying the ball; "direction-of-rush" having values such as left, right, or middle; "passer" being the name of the player passing the ball; "intended-receiver" being the name of the intended receiver of the pass; "direction-of-pass" having values such as left, right, behind, or middle; "tackle-by" being the name(s) of the player(s) who tackled and brought the play to an end; "interception-by" being the name of the player who intercepted the ball; "sack-by" being the name(s) of the player(s) who sacked the quarterback; "pass-play-outcome" having values such as pass-completed, intercepted, fumbled, touch-down, pass-incomplete, etc.; "penalty-in-play" having a yes or no value; "yards-penalized" having values such as 5, 10, 15, 26, etc.; "yards-gained-in-play" having values such as 1, −5, 9, 29, etc.; and so on.

Various computations now must be defined to enable the computation module 102 (FIG. 2) to efficiently process the football data using the football-specific attributes defined herein. Computations specifically designed for the football application may include: "number-of-plays", "average-yards-gained-per-play", "average-yards-gained-per-passing-play", "average-yards-gained-per-running-play", "number-of-carries", "percentage-of-first-down-completion", "percentage-of-third-down-conversion", "percentage-of-plays-turned-over", pass-play-outcome", standard-football-performance-metrics (e.g., number-of-touch-downs, number-of-fumbles, number-of-interceptions, number-of-carries, number-of-sacks, number-of-yards-in-offense, etc.), and the like.

The users are now able to use the querying application of the present invention to find hidden patterns in the football data by employing various football-specific computations defined herein. For example, a user can issue a query to determine the average yards gained on passing plays from the shotgun formation by team 1 playing on turf. For such passing performance, the user can select the computation average-yards-gained-per-passing-play, and values team 1 for the attribute team-1-name, yes for the attribute shotgun, pass for the attribute play-type, and turf for the attribute type-of-surface. The input module 101 (FIG. 2) then translates the user's selection into the following query (computation=average-yards-gained-per-passing-play, team-1-name=team 1, shotgun=yes, play-type=pass, type-of-surface=turf) and provides the user query to the computation module 102 (FIG. 2) for computation.

The computation module 102 (FIG. 2) computes a result, such as 7.2 (144 yards gained on 20 passing plays) for the user query based on the football data. As indicated herein, since the input module 102 also provides the user query to the alert generator 201 (FIG. 2), the user is alerted to a set of circumstances related to the user query having the greatest-valued or least-valued result for the computation average-yards-gained-per-passing-play. In other words, the querying application of the present invention alerts the user to related scenarios where the team had the best (greatest-valued) and/or worst (least-valued) passing performance. For example, the user may be alerted to the result of the following related query:

i) Greatest-valued result: 18 (90 yards gained on 5 passing plays) for the modified query (computation=average-yards-gained-per-passing-play, team-1-name=team 1, shotgun=yes, play-type=pass, type-of-surface=turf, yards-to-go-for-first-down =<5, in-red-zone=yes, intended-receiver=player 2).

Cricket Application

The querying application of the present invention can provide professional or amateur cricket players, coaching personnel, fans, and the like with the means to ask questions and obtain insightful information about cricket games. Accordingly, a logical model of the data collected for cricket games (hereinafter referred to as the cricket data) is generated by treating the cricket data as a collection of matches and balls, and specifying attributes to describe these various matches and balls.

The attributes and their values for the various matches may include: "team-1-name" being the name of team 1; "team-2-name" being the name of team 2; "location-of-match" (site of the match) having values such as home, away or neutral; "month-of-match" having values such as January, February, etc.; "tournament-match" having a yes or no value; "name-of-tournament" being the name of the tournament if the match was played as part of a tournament, if any; "pitch-conditions" (nature of the pitch) having values such as slow, fast, wet, dry, etc.; "weather-conditions having values such as windy, wet, sunny, etc.; "team-winning-toss" being the name of the team that won the toss; "team-batting-first" being the name of the team that batted first; "team1-runs-made" indicating the number of runs made by the first team; "team1-wickets-lost" indicating the number of wickets lost by the team batting first; "team2-runs-made" indicating the number of runs made by the team batting second; "team2-wickets-lost" indicating the number of wickets lost by the second team; "winning-team" indicating the name of the team that won the match; and so on.

The attributes and their values for the various balls may include: "batsman-name" being the name of the batsman; "batsman-hand" (hand used to bat) having a right or left value; "type-of-batsman" having values such as opener, middle-order, or tail-ender; "non-striker-name" being the name of the non-striker; "non-striker-hand" (hand used to bat) having a right or left value; "type-of-non-striker" having values such as opener, middle-order, or tail-ender; "runner-name" being the name of the runner, if any; "runner-hand" (hand used to bat) having a right or left value; "bowler-name" being the name of the bowler; "bowler-hand" (hand used to bowl) having a right or left value; "type-of-bowler" having values such as fast, fast-medium, medium, spin, etc.; "number-of-fielders-on-offside" having values such as 1–2, 3–4, 5–6, etc.; "number-of-close-in-fielders" having values such as 1–2, 3–4, 5–6, etc.; "round-or-over" (way the bowler bowled) having an over or round value; "type-of-ball" having values such as yorker, out-swinger, legcutter, etc.; "line-of-ball" having values such as off, leg, etc.; "length-of-ball" having values such as short-pitched, over-pitched, etc.; "direction-of-ball" (direction of the ball after being pitched) having values such as incoming, outgoing, etc.; "shot-attempted" having values such as hook, sweep, etc.; "zone" indicating the location of the ball after being hit by the batsman and having values such as 1, 2, etc.; "result" indicating the result of the shot and having values such as runs, no runs, out, etc.; "number-of-runs" indicating the number of runs scored off the ball and having values such as 1, 4, etc.; "how-out" indicating how the batsman got out and having values such as bowled, caught, etc.; "contributing-fielder-name" being the name of the fielder who contributed to the batsman getting out; "contributing-fielder-position" indicating the position of the contributing fielder and having values such as mid-off, wicketkeeper, etc.; "four-scored" indicating whether a "four" was scored off the ball and having a yes or no value; "six-scored" indicating whether a "six" was scored off the ball and having a yes or no value; "runs-per-over-required" indicating the required runs per over and having values such as <3, 3–4, 4–5, etc.; "runs-per-wicket-required" indicating the required runs per wicket left and having values such as <10, 10–20, etc.; and so on.

Various computations now must be defined to enable the computation module 102 (FIG. 2) to efficiently process the cricket data using the cricket-specific attributes defined herein. Computations specifically designed for the cricket application may include: "number-of-matches", "win-percentage", "required-runs-per-over-at-start", "required-runs-per-over-at-end", "required-runs-per-wicket-at-start", "required-runs-per-wicket-at-end", "contribution-to-required-runs-per-over", "contribution-to-required-runs-per-wicket", standard-cricket-performance-metrics for batsmen (e.g., number-of-balls-faced, number-of-minutes-played, number-of-runs-scored, number-of-fours-scored, number-of-sixes-scored, distribution-of-runs-scored-by-zone, distribution-of-runs-scored-by-bowler) and the standard-cricket-performance-metrics for bowlers (e.g. number-of-balls-bowled, number-of-maiden-overs-bowled, number-of-wickets-taken, number-of-runs-given, number-of-fours-given, number-of-sixes-given, distribution-of-runs-given-by-zone, distribution-of-runs-given-by-batsman, etc.), and the like.

The users are now able to use the querying application of the present invention to find hidden patterns in the cricket data by employing various cricket-specific computations defined herein. For example, a user can issue a query to determine the winning percentage of team 1 against team 2. For such winning percentage query, the user can select the computation win-percentage, and values team 1 for the attribute team-1-name and team 2 for the attribute team-2-name. The input module 101 (FIG. 2) then translates the user's selection into the following query (computation=win-percentage, team-1-name=team 1, team-2-name=team 2) and provides the user query to the computation module 102 (FIG. 2) for computation.

The computation module 102 (FIG. 2) computes a result, such as 25.0 (50 wins out of 200 matches) for the user query based on the cricket data. As indicated herein, since the input module 101 also provides the user query to the alert generator 201 (FIG. 2), the user is alerted to a set of circumstances related to the user query having greatest-valued or least-valued result for the computation win-percentage. In other words, the querying application of the present invention alerts the user to related scenarios where the team 1 had the highest (greatest-valued result) and lowest (least-valued result) winning percentage against team 2, thereby providing the user with a better understanding of the team 1's performance against team 2. For example, the user may be alerted to the result of the following related query:

i) 100% (3 wins out of 3 matches) for the modified query (computation=win-percentage, team-1-name=team 1, team-2-name=team 2, tournament=yes, name-of-tournament=World Cup).

Similarly, a user can issue a query to determine player 1's contribution to the required runs per over when ball type is a yorker. For such contribution query, the user can select the computation contribution-to-required-runs-per-over, and values player1 for the attribute batsman-name and yorker for the attribute type-of-ball. The input module 101 (FIG. 2) then translates the user's selection into the following query (computation=contribution-to-required-runs-per-over, batsman-name=player1, type-of-ball=yorker) and provides the user query to the computation module for computation.

The computation module 102 (FIG. 2) computes a result, such as −0.23 for the user query based on the cricket data. Since the input module 101 (FIG. 2) also provides the user query to the alert generator 201, the user is alerted to a set of circumstances related to the user query having the greatest-valued or least-valued result for the computation contribution-to-required-runs-per-over. In other words, the querying application of the present invention alerts the user to related scenarios where player 1 contributed most (greatest-valued result) and least (least-valued result) to the required number of runs per over, thereby providing the user with a better understanding of player 1's performance. For example, the user would be alerted to the result of the following related query:

i) Least-valued result: −1.2 for the modified query (computation=contribution-to-required-runs-per-over, batsman-name=player1).

Banking Application

In another embodiment, the querying application of the present invention can be used in numerous banking applications to query and obtain insightful information from the banking data. As a representative example, the querying application of the present invention can provide investment bankers with the means to ask questions and obtain insightful information about companies raising money in the market though various instruments such as bonds, private placements, etc. Accordingly, a logical model of the data collected for the banking application (hereinafter referred to as the banking data) is generated by treating the banking data as a collection of deals and specifying attributes to describe these various deals.

The attributes and their values for the various deals may include: "product" indicating the type of instrument being used, and having values such as private placement, non-convertible bond, etc.; "sales-segment" indicating the relative performance of the issuing company in terms of sales, and having values such as excellent, good, etc.; "growth-in-sales" indicating the relative performance of the issuing company in terms of growth in sales, and having values such as excellent, good, etc.; "industry" indicating the industry to which the issuing company belongs to, and having values such as electronics, construction, etc.; "captive-finance-company" indicating whether the issuing company is a financial arm of a larger company, and having a yes or no value; "customer-status" indicating whether the issuing company is an existing customer of the bank, and having a yes or no value; "customer-priority" indicating the priority of the issuing company as a customer of the bank, and having values not-a-customer, high, low, etc.; "multinational-presence" indicating the extent to which the issuing company is a multinational, and having values such as high, medium, etc.; "industry-complexity" indicating the complexity of the industry to which the issuing company belongs, and having values such as high, medium, etc.; "geographical-coverage" indicating the issuing company's presence within its main country of operations, and having values such as national, regional, local, etc.; "debt-to-size-ratio" indicating the extent of the issuing company's debts in relation to its size, and having values such as high, medium, etc.; "leases-to-size-ratio" indicating the extent of the issuing company's leases in relation to its size, and having values such as high, medium, etc.; "cash-flow" indicating the relative performance of the issuing company in terms of cash flow, and having values such as excellent, good, etc.; "eps-growth" indicating the relative performance of the issuing company in terms of growth in EPS (earnings per share), and having values such as excellent, good, etc.; "historical-pe-ratio" indicating the relative performance of the issuing company in terms of its historical P/E (price to earnings) ratio, and having values such as excellent, good, etc.; "gross-margin" indicating the relative performance of the issuing company in terms of its gross margins, and having values such as excellent, good, etc.; "net-income" indicating the relative performance of the issuing company in terms of its net income, and having values such as excellent, good, etc.; "market-capitalization" indicating the relative performance of the issuing company in terms of market capitalization, and having values such as excellent, good, etc.; "roe-average" indicating the relative performance of the issuing company in terms of its ROE (return on equity) average, and having values such as excellent, good, etc.; "insider-shares-percentage" indicating the relative performance of the issuing company in terms of the percentage of shares held by insiders, and having values such as excellent, good, etc.; "growth-segment" indicating the relative performance of the issuing company in terms of its growth, and having values such as excellent, good, etc.; "public-company" indicating whether or not the issuing company is publicly traded, and having a yes or no value; "lead-manager" being the name of the lead manager for the issue; "lead-manager-type" indicating the type of lead manager, and having values such as commercial bank, top tier investment bank, etc.; and so on.

Various computations now must be defined to enable the computation module 102 (FIG. 2) to efficiently process the banking data using banking-specific attributes defined herein. Computations specifically designed for the banking application may include: "number-of-deals", "amount-raised", "percentage-of-deals", "percentage-of-amount-raised", and the like.

The users are now able to use the querying application of the present invention to find hidden patterns in the banking data by employing various banking-specific-computations defined herein. For example, a user can issue a query to determine the percentage of deals in the electronics industry for which bank1 was the lead manager. For such deal percentage query, the user can select the computation percentage-of-deals and values bank1 for the attribute lead-manager and electronics for the attribute industry. The input module 101 (FIG. 2) then translates the user's selection into the following query (computation=percentage-of-deals, lead-manager=bank1, industry=electronics) and provides the user query to the computation module for computation.

The computation module 102 (FIG. 2) computes a result, such as 5.8% (58 deals from a total of 1000) for the user query based on the banking data. As indicated herein, since the input module 101 also provides the user query to the alert generator 201 (FIG. 2), the user is alerted to a set of circumstances related to the user query having the greatest-valued or least-valued result for the computation percentage-of-deals. In other words, the querying application of the present invention alerts the user to related scenarios where bank1 had the highest (greatest-valued result) and/or the lowest (least-valued result) percentage of deals, thereby providing the user with a better understanding of the bank's performance in winning the deals. For example, the user would be alerted to the result of the following related query:

i) Greatest-valued result: 25.0% (50 deals from a total of 200) for the modified query (computation=percentage-of-deals, lead-manager=bank1, industry=electronics, multinational-presence=high, growth-segment=excellent).

Call Center Management Application

A call center is a place where customers of a company call in to get support and information about products, report problems and get solutions for their problems. Call centers are also used for direct marketing to end-users.

Over the past few years, call centers have been automated by integrating the telephony systems with computer hardware and software to assist in managing the call center effectively and efficiently. Typically, data is collected about the customers, agents, nature of the call, and outcome of the calls.

In another embodiment, the querying application of the present invention can be used in numerous call center management applications to query and obtain insightful information from the call center data. As a representative example, the querying application of the present invention can provide call center managers and personnel with the means to ask questions and obtain insightful information about the call center calls. Accordingly, a logical model of the data collected for the call center management application (hereinafter referred to as the call center data) is generated by treating the call center data as a collection of calls between agents and customers and specifying attributes to describe these various calls, agents and customers.

The attributes and their values for the various calls may include: "customer-telephone-number" having values such as 910-761-2380, 715-656-2278, etc.; "id-of-first-agent-on-call" indicating an uniquely assigned id number for the first agent on the call; "incoming-outgoing" having an outgoing or incoming value; "time-of-call" having values such as 12:30 AM, 4:30 PM, etc.; "call-about-which-product-or-service" having values such as product X, product Y, service X, etc.; "how-product-or-service-advertised" having values such as TV, Internet, newspaper, etc.; "switch-that-call-went-through" having values such as switch 12, switch 35, etc.; "agent-ids-of-all-agents-on-call" indicating the agent ids of all the agents on the call; "number-of-transfer-in-call" having values such as 0, 1, 2, etc.; "number-of-conferences-in-call" having values such as 0, 1, 2, etc.; "number-of-agents-in-call" having values such as 0, 1, 2, etc.; "number-of-holds-on-call" having values such as 0, 1, 2, etc.; "total-call-duration" having values such as 12.9 seconds, 140.8 seconds, etc.; "customer-satisfaction-on-call" having values such as satisfied, very satisfied, dissatisfied, very dissatisfied, etc.; "sale-outcome" having values such as yes, no, more follow-up-later, call-not-for-sale, etc.; and so on.

The attributes and their values for the various agents may include: "agent-id-number" having values such as 016657, 200765, etc.; "agent-skill" indicating the skill of the agent; "agent-experience" indicating the experience of the agent; "agent-training" indicating the level of agent's experience; "agent-gender" indicating the gender of the agent; "agent-age" having values such as 45, 28, etc.; and so on.

The attributes and their values for the various customers may include: "customer-gender" having values such as male or female; "customer-age" having have values such as 45, 28, etc.; "customer-income" having values such as $35,000–$45,000 per year, >$100,000 per year., etc.; customer-duration" having values such as 1 year, 2 years, etc.; and so on.

Various computations now must be defined to enable the computation module 102 (FIG. 2) to efficiently process the call center management data using the call center attributes defined herein. Computations specifically designed for the call center management application may include: "number-of-calls", "average-call-duration", "difference-in-average-call-duration-from-overall-average", "average-number-of-transfers", "average-number-of-holds", "average-number-of-agents-on-call", "number-of-satisfied-customers", "number-of-successful-sale-calls", "average-number-of-calls-taken-by-an-agent", "average-duration-of-calls-taken-by-an-agent", "number-of-calls-transferred-by-an-agent", and the like.

The users are now able to use the querying application of the present invention to find hidden patterns in the call center data by employing various call center-specific computations defined herein. For example, a user can issue a query to determine the average call duration for all incoming calls occurring early in the morning. For such average call duration query, the user can select the computation average-call-duration, and values incoming for the attribute incoming-outgoing and early-morning for the attribute time-of-call. The input module 101 (FIG. 2) then translates the user's selection into the following query (computation=average-call-duration, incoming-outgoing=incoming, time-of-call=early-morning) and provides the user query to the computation module 102 (FIG. 2) for computation.

The computation module 102 (FIG. 2) computes a result, such as 844 seconds for the user query based on the call center data. As indicated herein, since the input module 101 also provides the user query to the alert generator 201 (FIG. 2), the user is alerted to a set of circumstances related to the user query having the greatest-valued and/or least-valued result for the computation average-call-duration. In other words, the querying application of the present invention alerts the user to related scenarios having the longest (greatest-valued result) and/or the shortest (least-valued result) average call duration, thereby providing the user with a better understanding of the average call duration. For example, the user may be alerted to the result of the following related query:

i) Greatest-valued result: 1289 seconds for the modified query (computation=average-call-duration, incoming-outgoing=incoming, time-of-call=early-morning, customer-gender=male, customer-income=>$100,000, average-agent-skill=low).

Also, a user can issue a query to determine the difference between the average call duration for calls about product X to all agents, and those only to agent with id 016657. For such difference query, the user can select the computation difference-in-average-call-duration-from-overall-average, and values 016657 for the attribute agent-id-number and product X for the attribute call-about-which-product-or-service. The input module 101 (FIG. 2) then translates the user's selection into the following query (computation=difference-in-average-call-duration-from-overall-average, agent-id-number=016657, call-about-which-product-or-service=product X) and provides the user query to the computation module 102 (FIG. 2) for computation.

The computation module 102 (FIG. 2) computes a result, such as 200.1 seconds (the average call duration to agent 016657 being 1209.6 seconds and the average call duration for all agents being 1009.5 seconds) for the user query based on the call center data. Since the input module 101 also provides the user query to the alert generator 201, the user is alerted to a set of circumstances related to the user query having the greatest-valued and/or least-valued result for the computation difference-in-average-call-duration-from-overall-average. In other words, the querying application of the present invention alerts the user to related scenarios where the agent had the largest (greatest-valued result) and/or the smallest (least-valued result) difference in the average call duration from the overall average for all agents, thereby providing the user with a better understanding of the agent's performance. For example, the user may be alerted to the result of the following related query:

i) Greatest-valued result: 543.8 seconds (the average call duration for calls to the agent 016557 being 1553.3 seconds and the average call duration for all agents being 1009.5 seconds) for the modified query (computation=difference-in-average-call-duration-from-overall-average agent-id-number=016657, call-about-which-product-or-service=product X, how-product-or-service-advertised=Internet, customer-age =>55).

Customer Relationship Management Application

Customer relationship management is very critical to the operation of any business. An important area of customer relationship management is understanding and managing customer churn.

In another embodiment, the querying application of the present invention can be used in numerous customer relationship management applications to query and obtain insightful information from customer relationship management data. As a representative example, the querying application of the present invention can provide customer relationship managers and personnel with the means to ask questions and obtain insightful information about customer relationships. Accordingly, a logical model of the data collected for customer relationship management-application (hereinafter referred to as the customer relationship management data) is generated by treating the data as a collection of customers and by specifying attributes to describe the customers.

The attributes and their values for customers may include: "customer-gender" having a male or female value; "customer-age" having values such as 45, 28, etc.; "customer-income" having values such as $35,000–$45,000 per year, >$100,000 per year, etc.; "customer-duration" having values such as <1 year, 2 years, etc.; "customer-marital-status" having values such as single, married, divorced, etc.; "customer-of-which-product-or-service" having values such as Product X, Product Y, Service X, etc.; "how-product-or-service-advertised" having values such as TV, Internet, newspaper, etc.; "customer-satisfaction-at-time-of-sale" having values such as satisfied, very satisfied, dissatisfied, very dissatisfied, etc.; "customer-satisfaction-at-time-of-churn" having values such as satisfied, very satisfied, dissatisfied, very dissatisfied, etc.; "duration-of-customer" having values such as <1 year, 1–2 years, 2–5 years, etc.; "churn-date" having values such as Dec. $19^{th}$ 1998, etc.; "reason-of-churn" having values such as unhappy-with-product, unhappy-with-service, found-better-product, etc.; "cross-selling-at-time-of-churn" having values such as successful, no attempt, unsuccessful, etc.; "activity-just-before-churn" having values such as very little, almost nothing, a lot of activity, etc.; "high-risk-customer" having a yes or no value; and so on Various computations now must be defined to enable the computation module 102 (FIG. 2) to efficiently process the customer relationship management data using the customer attributes defined herein. Computations specially designed for the customer relationship management application may include: "number-of-customers", "number-of-customers-that-churn", "number-of-customers-that-are-retained", "number-of-high-risk-customers", "churn-percentage", and the like.

The users are now able to use the querying application of the present invention to find hidden patterns in the customer relationship management data by employing various customer relationship management-specific computations defined herein. For example, a user can issue a query to determine the percentage of customers that churned in the fourth quarter of 1998. For such churn percentage query, the user can select the computation churn-percentage, and values 4Q 1998 for the attribute churn-date. The input module 101 (FIG. 2) then translates the user's selection into the following query (computation=churn-percentage, churn-date=4Q 1998) and provides the user query to the computation module 102 (FIG. 2) for computation.

The computation module 102 (FIG. 2) computes a result such as 9% for the user query based on the customer relationship management data. As indicated herein, since the input module 101 (FIG. 2) also provides the user query to the alert generator 201 (FIG. 2), the user is alerted to a set of circumstances related to the user query having the greatest-values and/or least-valued result for the computation churn-percentage. In other words, the querying application of the present invention alerts the user to related scenarios having the highest (greatest-valued result) and/or lowest (least-values result) churn-percentage, thereby providing the user with a better understanding of the customer churn. For example, the user may be alerted to the result of the following related query:

i) Greatest-valued result: 18% for the modified query (computation=churn-percentage, churn-date=4Q 1998, customer-duration=<1, year customer-income=>$100,000, customer-of-which-product-or-service=Product Y, customer-satisfaction-at-time-of-sale=very satisfied).

Generating Alerts in a Multi-User Environment

In an embodiment of the present invention, the querying application of the present invention can be incorporated into a multi-user environment, such as a communication network of computers, an intranet, or the Internet (world-wide-web).

Figure 19:
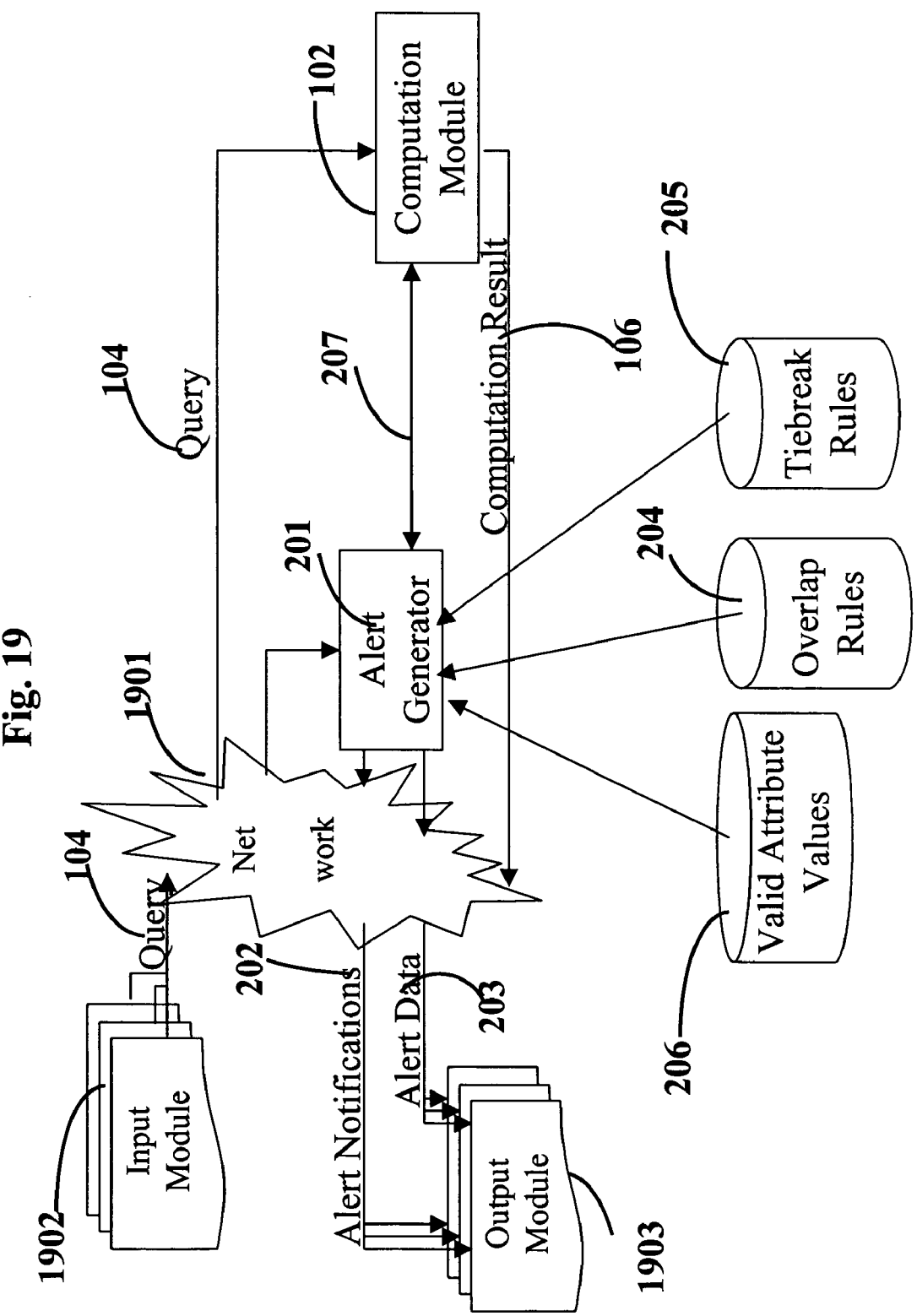
FIG. 19 describes a specific implementation of a querying application utilizing an alert generator in accordance with the present invention, functioning within a multi-user environment.

Turning now to FIG. 19, there is illustrated a multi-user environment incorporating the querying application of the present invention. For simplicity, elements shown in FIG. 19 corresponding to those shown in FIG. 2 are denoted by the same reference numerals and their descriptions are omitted. Essentially, the querying application of FIG. 19 replaces the input module 101 and the output module 103 of the querying application of FIG. 2 with multiple input modules 1902 and multiple output modules 1903. Also, the alert generator 201 is now connected to the input and output modules via a communications network 1901, such as a computer network.

Accordingly, the alert generator 201 of FIG. 19 receives a plurality of different queries from the multiple input modules 1902 (i.e.; multiple users) via the communications network 1901. The alert generator 201 accesses the computation module 102, and generates alert notifications 202 and alert data 203 for each output module 1903. The alert generator 201 transmits (or sends) the appropriate alert notifications 202 and the alert data 203 to each output module 1903 over the communications network 1901.

Alternatively, web browsers can serve as the input and output modules, and the alert generator 201 and the computation module 102 can reside on a server (i.e., an Internet server). The communications network 1901 connecting the web browsers to the server can be the Internet, a company intranet, a local-area network, a wide-area network and the like.

Generating Alerts for a Multimedia Querying Application

In another embodiment, the querying application of the present invention can be used as a multimedia querying application. Instead of retrieving numerical results, the multimedia querying application retrieves multimedia objects, such as images, video clips, and audio clips. The multimedia objects are generally annotated and stored in a multimedia data repository.

Generally, the annotation can be done in one of two ways. In the first approach, a list of pre-specified attributes, each having a finite set of pre-specified values, can be used to classify the multimedia objects. In the second approach, a textual description is used to label the object. The conventional multimedia database generally supports both types of annotations. The annotations can be manually generated, e.g., a person looks at an image that is a picture of a mountain and types in the annotation: mountain or selects the value mountain for a suitable attribute such as topography. Alternatively the annotations can be automatically generated, e.g., an image analysis algorithm processes the image and classifies the image as a mountain.

Once a multimedia object has been annotated, a multimedia querying application can be used to retrieve the multimedia object. Such a querying application allows the user to specify the objects in one of two ways. In the first approach, the user selects the values of attributes of interest and the querying application searches the annotations of the multimedia objects in its repository to retrieve all objects that have an annotation matching the user's requirements. This is equivalent to a user issuing a query in the traditional (non-multimedia) querying application in FIG. 1. In the second approach, the user types in keywords of interest and the querying application searches the annotations, including textual descriptions, and retrieves the multimedia objects having the keywords contained in their annotations. The manner in which the textual annotations can be represented by an attribute-value classification scheme is described herein.

The first step is to remove the common, non-informational words that occur frequently in a textual description in a natural language such as English. Examples include such words as a, the, is, that, etc. Those skilled in the art appreciate that exhaustive lists of such words have already been compiled and are available. Once these words have been removed, the remaining words are added to a list of unique words for every annotation in the multimedia repository. Finally, every unique word in this list is made into an attribute that can have two possible values, present or absent. All attributes are used to classify a textual description, the value for a given attribute being present, if the corresponding word is present in the textual description, else the value is absent. One skilled in the art will be able to implement such a method for textual descriptions. Note that method could also be applied to a collection of documents, each document corresponding to a textual description.

It follows that the search initiated by a user of a multimedia querying application is fundamentally the same as the query issued by the user of the querying application of FIG. 1, i.e., the input module 101 can support the user interface for both traditional and multimedia querying application.

There is a major difference in the operation of the querying application of FIG. 1 and the multimedia querying application. The former outputs a numeric result, while the multimedia querying application retrieves a multimedia object. However, in both cases, a common starting point is the attribute-value string that is selected by the user. Accordingly, at least one computation must be defined for the multimedia application such that the computation maps the strings to a numeric result that will be useful to the user. The multimedia querying application can be modified to execute that computation for the user's query string and to output the numeric result (with associated alerts) to the user along with the multimedia objects that are retrieved.

Those skilled in the art will be able to easily define such useful computations that compute statistics for the classes of multimedia objects. For example, the count or percentage of multimedia objects that have a particular value. Or, the difference in count between a particular value and all other values of the same attribute, when such a difference is computed for the subset of objects that have the user's query string. The latter scheme will be particularly useful when specific attributes are known to represent outcomes of interest. Clearly, once such computations have been defined, our invention can be used to generate alerts in the manner described in the present invention. Consequently, our invention can be embedded easily in a multimedia querying application. The apparatus of FIG. 2 is simply added to the apparatus of the multimedia querying application. The two apparatus can share the same Input Module 101 and the Output Module 103 is incorporated within the output mechanisms of the multimedia querying application.

Generating Alerts in a Real-Time Environment

The present invention can also be used as is within a real-time environment. In such an environment, the underlying data change, but that does not change the fundamentals of our invention. All that is happening is that the computations in the Computation Module 102 change over time. At any given point in time, the situation can be frozen, i.e., the state of the Computation Module 102 at that point in time is used. One skilled in the art will easily be able to define such a point in time in the context of the querying application in FIG. 1, e.g., the point in time when the user issues a query. It follows that our invention can easily be applied in a real-time environment.

It is easy to embed our present invention in an real-time environment. In fact, one particular set of alerts that can occur in the context of our invention will be particularly useful in a real-time environment, e.g, a military intelligence environment in which threats are being evaluated by inputting the latest information received in the form of a user's query to a querying application. The querying application outputs a number between 0 and 1, with 0 representing a definite threat and 1 representing a non-threat.

Consider the case when the MAXINT string and/or MININT string do not overlap directly with the attribute-value string of the query but instead can be traced from the user's query. Note that those strings, having the greatest-valued and least-valued results respectively, can reflect the strongest measures in the data that underlie the querying application. Consequently, if the user's query does not overlap directly with those strings, it could indicate that the user may have hit upon a weakness in the underlying data to respond to the current query, a fact that may be relevant when evaluating threats.

We have provided several implementations of systems that make use of our invention. We re-iterate that those skilled in the art can easily produce variations that fall within the scope and spirit of our invention. We also re-iterate that our invention will find usage in many different areas. We list some of those areas below, along with a brief description of how our invention can be used. Our list is meant to be an illustrative and not an exhaustive list of possible usage.

Database Systems and Applications

This invention can be used to introduce data mining functionality in database systems and database applications such as data marts and data warehousing systems. In this case, any querying mechanism (such as a Graphical User Interface, HTML forms on a web browser, etc.) specific to the database system or application could be used to pass inputs to the Alert Generator. Similarly, any reporting mechanism (HTML pages, Graphical interface, textual reports, etc.) could be used as the Output Module to receive alerts. Computations required could either be performed by the database system or application on the fly, or the results could be looked up from previously computed results.

OLAP and Data Mining Suites

There are various commercial products currently available that provide users with the means to run Online Analytical Processing queries on data, as well as a means of unearthing interesting patterns from the data, based on proprietary Data Mining algorithms. This invention provides a method for linking the two classes of products together by enabling the output of OLAP query tools to be fed into data mining suites to extract meaningful information along the user's line of questioning. Thus, the interface provided by the OLAP Query tool could function as the Input Module. The OLAP tool could itself provide the Computation Module. The Data Mining suite provides the search space for the Alert Generator. The OLAP reporting tools provide the Output Module for receiving the alerts.

Data Mining Tools—Another Usage

Several commercial data mining products enable users to pose queries on the results obtained by running data mining algorithms on the data. However, these queries are limited to the results obtained from data mining, and do not link those results to the unprocessed data. This invention provides a means of enabling these links.

Agent

An agent is a computer program that monitors the activity of another computer program. This invention can be used in the context of an agent provided that the inputs received by the computer program that is being monitored can be represented in terms of attribute-valued strings and the outputs of that program can be represented as real numbers. In this case, the monitored program is the querying application and the user is not a human but instead a user process represented by the agent.

While the present invention has been particularly described with respect to the illustrated embodiment, it will be appreciated that various alterations, modifications and adaptations may be made based on the present disclosure, and are intended to be within the scope of the present invention. For example, contents of the databases may be stored in a single database or stored in memory or the like. It is intended that the appended claims be interpreted as including the embodiments discussed above, those various alternatives which have been described and all equivalents thereto.

What is claimed is:

1. A computer-implemented method of finding queries having the greatest-valued or least-valued results, comprising the steps of:
   receiving at the computer a user query consisting of at least one computation and an attribute-value list having one or more elements, each element being associated with an attribute having a value assigned by a user or a user process;
   determining queries in a plurality of queries having said at least one computation and sharing one or more elements in common with the user query to provide a set of related queries;
   computing a result of said at least one computation for the attribute-valued string associated with each query in said set of related queries; and
   comparing the results associated with said set of related queries to determine one or more queries having the greatest-valued result, or one or more queries having the least-valued result.

2. The method of claim 1, wherein the step of receiving comprises the steps of:
   selecting said at least one computation from a plurality of computations in response to a user input or a user input process;
   selecting one or more attributes from a plurality of attributes in response to the user input or user input process; and
   selecting a value for each attribute selected in response to the user input or user input process to form an element.

3. The method of claim 2, wherein said at least one computation defines a relationship between said plurality of queries and a plurality of results.

4. The method of claim 3, wherein the results associated with said set of related queries are numeric results.

5. The method of claim 4, further comprising the step of selecting one query as the query having a maximum result if it is determined that more than one query in said set of related queries has the greatest-valued result.

6. The method of claim 5, further comprising the step of generating a list of queries having said at least one computation, each query being associated with an attribute-valued string having the greatest-valued result of all queries in said plurality of queries sharing one or more elements in common with a preceding query or a succeeding query in said list of queries.

7. The method of claim 6, wherein said list of queries yields a non-decreasing succession of numeric results and wherein the step of generating a list of queries comprises the steps of:
   (a) adding the query in said set of related queries having the greatest-valued result as a last query in said list of queries;
   (b) determining queries in said plurality of queries having said at least one computation and sharing one or more elements in common with said last query to provide a set of queries related to said last query;

(c) computing a result of said at least one computation for the attribute-valued string associated with each query in said set of queries related to said last query;
(d) comparing the results associated with said set of queries related to said last query to determine one or more queries having the greatest-valued result;
(e) selecting one query as the query having a maximum result if it is determined that more than one query in said set of queries related to said last query has the greatest-valued result;
(f) adding the query having the maximum result to the end of said list of queries as a new last query if it is determined that said new last query is not equivalent to said last query; and
(g) repeating steps (b) through (f) until there is no query in said plurality of queries having a result greater than the last query and sharing one or more elements in common with the last query.

8. The method of claim 7, further comprising the step of displaying the user query and the result of the user query along with each query and the corresponding greatest-valued result in said list.

9. The method of claim 4, further comprising the step of selecting one query as the query having a minimum result if it is determined that more than one query in said set of related queries has the least-valued result.

10. The method of claim 9, further comprising the step of generating a list of queries having said at least one computation, each query being associated with an attribute-valued string having the least-valued result of all queries in said plurality of queries sharing one or more elements in common with a preceding query or a succeeding query in said list of queries.

11. The method of claim 10, wherein said list of queries yields a non-increasing succession of numeric results and wherein the step of generating a list comprises the steps of:
(a) adding the query in said set of related queries having the least-valued result as a last query in said list;
(b) determining queries in said plurality of queries having said at least one computation and sharing one or more elements in common with said last query to provide a set of queries related to said last query;
(c) computing a result of said at least one computation for the attribute-valued string associated with each query in said set of queries related to said last query;
(d) comparing the results associated with said set of queries related to said last query to determine one or more queries having the least-valued result;
(e) selecting one query as the query having a minimum result if it is determined that more than one query in said set of queries related to said last query has the least-valued result;
(f) adding the query having the minimum result to the end of said list as a new last query if it is determined that said new last query is not equivalent to the last query; and
(g) repeating steps (b) through (f) until there is no query in said plurality of queries having a result less than the last query and sharing one or more elements in common with the last query.

12. The method of claim 11, further comprising the step of displaying the user query and the result of the user query along with each query and the corresponding least-valued result in said list.

13. The method of claim 1, further comprising the step of:
(a) assigning one query from said set of related queries as a first query;
(b) determining queries in said plurality of queries having said at least one computation and sharing one or more elements in common with said first query to provide a set of queries related to said first query;
(c) computing a result of said at least one computation for the attribute-valued string associated with each query in said set of queries related to said first query;
(d) comparing the results associated with said set of queries related to said first query to determine one or more queries having the greatest-valued result, or one or more queries having the least-valued result;
(e) assigning another query in said set of related queries as said first query; and
(f) repeating steps (b) through (e) for every query in said set of related queries.

14. The method of claim 12, wherein the step (d) further comprises the steps of determining whether said first query has the greatest-valued result or the least-valued result.

15. The method of claim 14, wherein the step (d) further comprises the step of displaying the user query and the result of the user query along with said first query and the corresponding greatest-valued result if it is determined that said first query has the greatest-valued result.

16. The method of claim 14, wherein the step (d) further comprises the step of displaying the user query and the result the user query along with said first query and the corresponding least-valued result if it determined that said first query has the least-valued result.

17. The method of claim 1, further comprising the step of generating pre-computed greatest-valued and pre-computed least-valued lists by pre-determining for each query in said plurality of queries whether said each query has a greatest-valued result or a least-valued result for all queries in said plurality of queries having said at least one computation and sharing one or more elements in common with said each query.

18. The method of claim 17, further comprising the steps of:
determining whether any query in said set of related queries is in said pre-computed greatest-valued list to provide a set of maxi queries; and
determining whether any query in said set of related queries is in said pre-computed least-valued list to provide a set of minimum queries.

19. The method of claim 18, further comprising the steps of:
determining whether any query in said pre-computed greatest-valued list is not in said set of maximum queries; and
determining whether any query in said pre-computed least-valued list is not in said set of minimum queries.

20. The method of claim 1, further comprising the step of displaying the user query and the result of the user query along with the greatest-valued result and one or more queries having the greatest-valued result.

21. The method of claim 20, wherein the step of displaying further displays the least-valued result and one or more queries having the least-valued result.

22. A computer implemented method of finding queries having the greatest-valued or least-valued results from a plurality of queries, each query having at least one computation and consisting of an attribute-valued string having one or more elements, each element being associated with an attribute having a value, comprising the steps of:
generating pre-computed greatest-valued and pre-computed least-valued lists for each computation in a plurality of computations by:

pre-determining queries in said plurality of queries having said each computation to provide a set of computationally related queries; and pre-determining for each query in said set of computationally related queries whether said each query has the greatest-valued result or the least-valued result for all queries in said set of computationally related queries sharing one or more elements in common with said each query;

receiving at the computer a user query consisting of at least one computation and one or more elements assigned by a user or a user process;

selecting said pre-computed greatest-valued list and said pre-computed least-valued list associated with said at least one computation of the user query;

determining queries in said selected pre-computed greatest-valued list sharing one or more elements in common with the user query to provide one or more queries having corresponding greatest-valued results to provide a set of maximum queries; and determining queries in said selected pre-computed least-valued list sharing one or more elements in common with the user query to provide one or more queries having corresponding least-valued results to provide a set of minimum queries.

23. The method of claim 22, wherein each computation in said plurality of computations defines a relationship between said plurality of queries and a plurality of results.

24. The method of claim 22, further comprising the step of displaying the user query and the result of the user query along with each query and the corresponding greatest-valued result in said set of maximum queries.

25. The method of claim 24, wherein the step of displaying displays each query and the corresponding least-valued result in said set of minimum queries.

26. A computer implemented method of finding queries having the greatest-valued or least-valued results from a plurality of queries, comprising the steps of:

(a) receiving at the computer a user query consisting of a plurality of computations and an attribute-valued string having one or more elements, each element being associated with an attribute having a value assigned by a user;

(b) assigning one computation from said plurality of computations as a first computation;

(c) determining queries in said plurality of queries having said first computation to provide a set of computationally related queries;

(d) determining queries in said set of computationally related queries sharing one or more elements in common with the user query to provide a set of related queries;

(e) computing a result of said first computation for the attribute-valued string associated with each query in said set of related queries;

(f) comparing the results associated with said set of related queries to determine one or more queries having the greatest-valued result or one or more queries having the least-valued result;

(g) assigning another computation from said plurality of computations as said first computation; and (h) repeating steps (f) through (g) for every computation in said plurality of computations.

27. The method of claim 26, wherein the step (d) further comprises the steps of:

(i) assigning one query from said set of related queries as a first query;

(j) determining queries in said set of computationally related queries sharing one or more elements in common with said first query to provide a set of queries related to said first query;

(k) computing a result of said first computation for the attribute valued string associated with each query in said set of queries related to said first query;

(l) comparing the results associated with said set of queries related to said first query to determine one or more queries having the greatest-valued result, or one or more queries having the least-valued result;

(m) assigning another query in said set of related queries as said first query; and (n) repeating steps (j) through (m) for every query in said set of related queries.

28. The method of claim 27, wherein the step (l) further comprises the step of determining whether said first query has the greatest valued-result or the least-valued result.

29. A computer system for finding queries having the greatest-valued or least-valued results, comprising:

an input device for receiving a user query consisting of at least one computation and an attribute-value having one or more elements, each element being associated with an attribute having a value assigned by a user;

a computing device for determining queries in said plurality of queries having said at least one computation and one or more elements in common with the user query to provide a set of related queries, and computing a result of said at least one computation for the attribute-valued string associated with each query in said set of related queries; and a comparator for comparing the results associated with said set of related queries to determine one or more queries having the greatest-valued result or one or more queries having the least-valued result.

30. The system of claim 29, wherein said input device is operable to select said at least one computation from a plurality of computations, one or more attributes from a plurality of attributes, a value for each attribute selected to form an element in response to a user input or a user input process.

31. The system of claim 30, wherein said at least one computation defines the relationship between said plurality of queries and a plurality of results.

32. The system of claim 31, wherein the results associated with said set of related queries are numeric results.

33. The system of claim 32, further comprising a selecting device for selecting one query as the query having a maximum result if it is determined that more than one query in said set of related queries has the greatest-valued result.

34. The system of claim 33, further comprising a generating device for generating a list of queries having said at least one computation, each query being associated with an attribute-valued string having the greatest-valued result of all queries in said plurality of queries sharing one or more elements in common with a preceding query or a succeeding query in said list of queries.

35. The system of claim 34, wherein said list of queries yields a non-decreasing succession of numeric results and wherein said generating device comprises a control device for:

adding the query having the greatest-valued result as a last query in said list of queries;

operating said computing device to provide a set of queries related to said last query; and adding the query having the maximum result to end of said list of queries as a new last query if it is determined that said new last query is not equivalent to said last query.

36. The system of claim 35, further comprising a display device for displaying the user query and the result of the user query along with each query and the corresponding greatest-valued result in said list.

37. The system of claim 32, further comprising a selecting device for selecting one query as the query having a minimum result if it is determined that more than one query in said set of related queries has the least-valued result.

38. The system of claim 37, further comprising a generating device for generating a list of queries having said at least one computation, each query being associated with an attribute-valued string having the least-valued result of all queries in said plurality of queries sharing one or more elements in common with a preceding query or a succeeding query in said list of queries.

39. The system of claim 38, wherein said list of queries yields a non-decreasing succession of numeric results and wherein said generating device comprises a control device for:
   adding the query in said set of related queries having the least-valued result as a last query in said list of queries;
   operating said computing device to provide a set of queries related to said last query; and
   adding the query having the least-valued result to end of said list of queries as a new last query if it is determined that said new last query is not equivalent to said last query.

40. The system of claim 39, further comprising a display device for displaying the user query and the result of the user query along with each query and the corresponding least-valued result in said list.

41. The system of claim 29, further comprising a control device for:
   assigning one query from said set of related queries as a first query;
   operating said computing device to provide a set of queries related to said first query; and
   assigning another query in said set of related queries as said first query.

42. The system of claim 41, wherein said control device is operable to control said device to determine whether said first query has the greatest-valued result or the least-valued result.

43. The system of claim 29, further comprising:
   a pre-computing device for generating pre-computed greatest-valued and pre-computed least-valued lists by pre-determining for each query in said plurality of queries whether said each query has the greatest-valued result or the least-valued result for all queries in said plurality of queries having said at least one computation and sharing one or more elements in common with said each query, and
   a storing device for storing said pre-computed greatest-valued and pre-computed least-valued results.

44. The system of claim 43, wherein said control device is operable to operate said computing device to determine whether any query in said set of related queries is in said pre-computed greatest-valued list to provide a set of maximum queries and to determine whether any query in said set of related queries is in said pre-computed least-valued list to provide a set of minimum queries.

45. The system of claim 44, wherein said control device is operable to operate said computing device to determine whether any query in said pre-computed greatest-valued list is not in said set of maximum queries and to determine whether any query in said pre-computed least-valued list is not in said set of minimum queries.

46. The system of claim 29, further comprising a display device for displaying the user query and the result of the user query along with the greatest-valued result and one or more queries having the greatest-valued result.

47. The system of claim 46, wherein said display device is operable to display the least-valued result and one or more queries having the least-valued result.

48. A computer system for finding queries having the greatest-valued or least-valued results from a plurality of queries, each query having at least one computation and consisting of an attribute-valued string having one or more elements, each element being associated with an attribute having a value, said system comprising:
   a pre-computing device for generating pre-computed greatest-valued and pre-computed least-valued lists for each computation in a plurality of computations to provide a set of computationally related queries;
   a device for receiving a user query consisting of at least one computation and one or more elements assigned by a user or a user process;
   a selector for selecting said pre-computed greatest-valued list and said pre-computed least-valued list associated with said at least one computation of the user query; and
   a computing device for determining queries in said selected pr-computed greatest-valued list sharing one or more elements in common with the user query to provide a set of maximum queries and determining queries in said selected pre-computed least-valued list sharing one or more elements in common with the user query to provide a set of minimum queries.

49. The system of claim 48, wherein each computation in said plurality of computations defines a relationship between said plurality of queries and a plurality of results.

50. The system of claim 48, further comprising a display device for displaying the user query and the result of the user query along with each query and the corresponding greatest-valued result in said set of maximum queries.

51. The system of claim 48, wherein the step of displaying displays each query and the corresponding least-valued result in said set of minimum queries.

52. The system of claim 51, wherein said computing device is operable to compute results for sports data.

53. The system of claim 52, wherein said sports data includes tennis data.

54. The system of claim 52, wherein said sports data includes soccer data.

55. The system of claim 52, wherein said sports data includes golf data.

56. The system of claim 52, wherein said sports data includes football data.

57. The system of claim 52, wherein said sports data includes basketball data.

58. The system of claim 52, wherein said sports data includes baseball data.

59. The system of claim 52, wherein said sports data includes cricket data.

60. The system of claim 51, wherein said computing device is operable to compute results for call center data.

61. The system of claim 51, wherein said computing device is operable to compute results for customer relationship management data.

62. The system of claim 51, wherein said computing device is operable to compute results for banking data.

63. The system of claim 51, wherein said computing device is operable to compute results for multimedia data.

64. The system of claim 51, wherein said computing device is operable to compute results for textual data.

65. A computer system of finding queries having the greatest-valued or least-valued results from a plurality of queries, comprising:
- a device for receiving a user query consisting of a plurality of computations and an attribute-valued string having one or more elements, each element being associated with an attribute having a value assigned by a user;
- an assigning device for assigning one computation from said plurality of computations as a first computation;
- a computing device for determining queries in said plurality of queries having said first computation to provide a set of computationally related queries and determining queries in said set of computationally related queries sharing one or more elements in common with the user query to provide a set of related queries, and computing a result of said first computation for the attribute-valued string associated with each query in said set of related queries;
- a comparator for comparing the results associated with said set of related queries to determine one or more queries having the greatest-valued result or one or more queries having the least-valued result; and
- a control device for controlling said assigning device to assign another computation from said plurality of computations as said first computation.

66. The system of claim 65, wherein said control device is operable to operate:
- said assigning device to assign one query from said set of related queries as a first query;
- said computing device to provide a set of queries related to said first query; and
- said assigning device to assign another query in said set of related queries as said first query.

67. The system of claim 66, wherein said comparator is operable to determining whether said first query has the greatest valued-result or the least-valued result.

68. A computer system of finding queries having the greatest-valued or least-valued results from a plurality of queries, comprising:
- a device for receiving a plurality of user queries, each user query being associated with a different user or user process and consisting of at least one computation and an attribute-valued string having one or more elements, each element being associated with an attribute having a value assigned by the associated user or user process;
- a computing device for determining queries in said plurality of queries having said at least one computation and sharing one or more elements in common with the user query to provide a set of related queries, and computing a result of said at least one computation for the attribute-valued string associated with each query in said set of related queries; and
- a comparator for comparing the results associated with said set of related queries to determine one or more queries having the greatest-valued result or one or more queries having the least-valued result.

\* \* \* \* \*